United States Patent
Ko et al.

(10) Patent No.: US 9,048,904 B2
(45) Date of Patent: *Jun. 2, 2015

(54) METHOD AND APPARATUS FOR EFFICIENT FEEDBACK IN A WIRELESS COMMUNICATION SYSTEM SUPPORTING MULTIPLE ANTENNA

(71) Applicant: LG ELECTRONICS INC., Seoul (KR)

(72) Inventors: Hyunsoo Ko, Anyang-si (KR); Sunam Kim, Anyang-si (KR); Dongguk Lim, Anyang-si (KR); Moonil Lee, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/094,504

(22) Filed: Dec. 2, 2013

(65) Prior Publication Data

US 2014/0086352 A1 Mar. 27, 2014

Related U.S. Application Data

(63) Continuation of application No. 13/244,146, filed on Sep. 23, 2011, now Pat. No. 8,625,698.

(60) Provisional application No. 61/414,372, filed on Nov. 16, 2010, provisional application No. 61/414,374, (Continued)

(30) Foreign Application Priority Data

Sep. 22, 2011 (KR) .................. 10-2011-0095682

(51) Int. Cl.
*H04B 7/02* (2006.01)
*H04B 7/04* (2006.01)
(Continued)

(52) U.S. Cl.
CPC ............ *H04B 7/0486* (2013.01); *H04B 7/0617* (2013.01); *H04B 7/0626* (2013.01);
(Continued)

(58) Field of Classification Search
CPC .. H04B 7/0486; H04B 7/0617; H04B 7/0626; H04B 7/0639
USPC .................................................. 375/267, 296
See application file for complete search history.

(56) References Cited

U.S. PATENT DOCUMENTS

2009/0046569 A1 2/2009 Chen et al.
2009/0059844 A1 3/2009 Ko et al.
(Continued)

FOREIGN PATENT DOCUMENTS

| CN | 1684457 | 10/2005 |
|---|---|---|
| CN | 101615984 | 12/2009 |
| WO | 2010/101431 | 9/2010 |

OTHER PUBLICATIONS

The State Intellectual Property Office of the People's Republic of China Application Serial No. 201180046375.6, Office Action dated Feb. 4, 2015, 6 pages.

*Primary Examiner* — Juan A Torres
(74) *Attorney, Agent, or Firm* — Lee, Hong, Degerman, Kang & Waimey

(57) ABSTRACT

A method for transmitting channel status information (CSI) via uplink in a wireless communication system includes transmitting a first precoding matrix indicator (PMI) and a second PMI at a subframe. A subsampled codebook for each of a precoding codebook for Rank-1 and a precoding codebook for Rank-2 is determined based on at least the first PMI or the second PMI. In case of the Rank-1 or the Rank-2, a number of elements for the first PMI is 8.

20 Claims, 23 Drawing Sheets

Related U.S. Application Data filed on Nov. 16, 2010, provisional application No. 61/413,951, filed on Nov. 15, 2010, provisional application No. 61/411,920, filed on Nov. 10, 2010, provisional application No. 61/390,110, filed on Oct. 5, 2010, provisional application No. 61/386,552, filed on Sep. 26, 2010.

(51) Int. Cl.
 *H04B 7/06* (2006.01)
 *H04L 1/00* (2006.01)
 *H04L 25/03* (2006.01)

(52) U.S. Cl.
 CPC ............ *H04B 7/0639* (2013.01); *H04L 1/0026* (2013.01); *H04L 1/0027* (2013.01); *H04L 25/03343* (2013.01); *H04L 2025/03426* (2013.01); *H04L 2025/03808* (2013.01); *H04B 7/0469* (2013.01)

(56) References Cited

U.S. PATENT DOCUMENTS

| | | |
|---|---|---|
| 2009/0190528 A1 | 7/2009 | Chung et al. |
| 2010/0098012 A1 | 4/2010 | Bala et al. |
| 2012/0069917 A1* | 3/2012 | Liu et al. ............... 375/259 |
| 2012/0218948 A1* | 8/2012 | Onggosanusi et al. ....... 370/329 |

* cited by examiner (a)

$n_{PRB} = N_{RB}^{UL} - 1$

| CQI | CQI |
|---|---|
| CQI+A/N | A/N |
|  | A/N |
|  |  |
| DATA ||
|  |  |

⋮

|  |  |
|---|---|
| DATA ||
|  |  |
| A/N |  |
| A/N | CQI+A/N |
| CQI | CQI |

$n_{PRB} = 0$

|← One subframe →|

METHOD AND APPARATUS FOR EFFICIENT FEEDBACK IN A WIRELESS COMMUNICATION SYSTEM SUPPORTING MULTIPLE ANTENNA

CROSS-REFERENCE TO RELATED APPLICATIONS

This application is a continuation of U.S. patent application Ser. No. 13/244,146 filed on Sep. 23, 2011, now U.S. Pat. No. 8,625,698, which claims the benefit of earlier filing date and right of priority to Korean Patent Application No. 10-2011-0095682, filed on Sep. 22, 2011, and also claims the benefit of U.S. Provisional Application Ser. No. 61/414,372, filed on Nov. 16, 2010, U.S. Provisional Application Ser. No. 61/414,374, filed on Nov. 16, 2010, U.S. Provisional Application Ser. No. 61/413,951, filed on Nov. 15, 2010, U.S. Provisional Application Ser. No. 61/411,920, filed on Nov. 10, 2010, U.S. Provisional Application Ser. No. 61/390,110, filed on Oct. 5, 2010 and U.S. Provisional Application Ser. No. 61/386,552, filed on Sep. 26, 2010, the contents of which are all hereby incorporated by reference herein in their entirety.

BACKGROUND OF THE INVENTION

1. Field of the Invention

The present invention relates to a wireless communication system, and more particularly to a method and apparatus for performing effective feedback in a wireless communication system supporting multiple antennas.

2. Discussion of the Related Art

Generally, Multiple-Input Multiple-Output (MIMO) technology will hereinafter be described in detail. In brief, MIMO is an abbreviation for Multi-Input Multi-Output. MIMO technology uses multiple transmission (Tx) antennas and multiple reception (Rx) antennas to improve the efficiency of transmission/reception (Tx/Rx) data, whereas the conventional art generally uses a single transmission (Tx) antenna and a single reception (Rx) antenna. In other words, MIMO technology allows a transmitting end and a receiving end to use multiple antennas so as to increase capacity or improve performance. If necessary, the MIMO technology may also be called multi-antenna technology. In order to correctly perform multi-antenna transmission, the MIMO system has to receive feedback information regarding channels from a receiving end designed to receive multi-antenna channels.

Various feedback information fed back from the receiving end to the transmitting end in the legacy MIMO wireless communication system may be defined, for example, a rank indicator (RI), a precoding matrix index (PMI), channel quality information (CQI), etc. Such feedback information may be configured as information appropriate for the legacy MIMO transmission.

There is a need for the new system including the extended antenna configuration as compared to the legacy MIMO wireless communication system to be developed and introduced to the market. For example, although the legacy system can support a maximum of 4 transmission antennas, the new system having the extended antenna configuration supports MIMO transmission based on 8 transmission antennas, resulting in increased system capacity.—

SUMMARY OF THE INVENTION

Accordingly, the present invention is directed to a method and apparatus for performing efficient feedback in a wireless communication system supporting multiple antennas that substantially obviate one or more problems due to limitations and disadvantages of the related art. The new system supporting the extended antenna configuration is designed to perform more complicated MIMO transmission than the legacy MIMO transmission operation, such that it is impossible to correctly support the MIMO operation for the new system only using feedback information defined for the legacy MIMO transmission operation.

An object of the present invention is to provide a method and apparatus for configuring and transmitting feedback information used for correctly and efficiently support the MIMO operation based on the extended antenna configuration.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting channel status information (CSI) of downlink transmission via uplink in a wireless communication system includes transmitting a rank indicator (RI) at a first subframe; and transmitting a first precoding matrix indicator (PMI), a second PMI, and a wideband (WB) channel quality indicator (CQI) at a second subframe, wherein a user equipment (UE) preferred precoding matrix is indicated by a combination of the first PMI and the second PMI, and a subsampled codebook for each precoding codebook of ranks from Rank-1 to Rank-4 is applied to the first PMI and the second PMI, and a sum of the first PMI and the second PMI for each of Rank-1 to Rank-4 is comprised of 4 bits.

In another aspect of the present invention, a method for receiving channel status information (CSI) of downlink transmission via uplink in a wireless communication system includes receiving a rank indicator (RI) at a first subframe; and receiving a first precoding matrix indicator (PMI), a second PMI, and a wideband (WB) channel quality indicator (CQI) at a second subframe, wherein a user equipment (UE) preferred precoding matrix is indicated by a combination of the first PMI and the second PMI, and a subsampled codebook for each precoding codebook of ranks from Rank-1 to Rank-4 is applied to the first PMI and the second PMI, and a sum of the first PMI and the second PMI for each of Rank-1 to Rank-4 is comprised of 4 bits.

In another aspect of the present invention, a user equipment (UE) for transmitting channel status information (CSI) of downlink transmission via uplink in a wireless communication system includes a reception module for receiving a downlink signal from a base station (BS); a transmission module for transmitting an uplink signal to the base station (BS); and a processor for controlling the user equipment (UE) including the reception module and the transmission module, wherein the processor, through the transmission module, transmits a rank indicator (RI) at a first subframe, and transmits a first precoding matrix indicator (PMI), a second PMI, and a wideband (WB) channel quality indicator (CQI) at a second subframe, a UE preferred precoding matrix is indicated by a combination of the first PMI and the second PMI, and a subsampled codebook for each precoding codebook of ranks from Rank-1 to Rank-4 is applied to the first PMI and the second PMI, and a sum of the first PMI and the second PMI for each of Rank-1 to Rank-4 is comprised of 4 bits.

In another aspect of the present invention, a base station (BS) for receiving channel status information (CSI) of downlink transmission via uplink in a wireless communication system includes a reception module for receiving an uplink signal from a user equipment (UE); a transmission module for transmitting a downlink signal to the user equipment (UE); and a processor for controlling the base station (BS) including the reception module and the transmission module, wherein the processor, through the reception module, receives a rank indicator (RI) at a first subframe, and receives a first precoding matrix indicator (PMI), a second PMI, and a wideband (WB) channel quality indicator (CQI) at a second subframe, a UE preferred precoding matrix is indicated by a combination of the first PMI and the second PMI, and a subsampled codebook for each precoding codebook of ranks from Rank-1 to Rank-4 is applied to the first PMI and the second PMI, and a sum of the first PMI and the second PMI for each of Rank-1 to Rank-4 is comprised of 4 bits.

The following characteristics can be commonly applied to the above-mentioned embodiments of the present invention.

In association with each of the Rank-1 and the Rank-2, the first PMI may be comprised of 3 bits in the subsampled codebook, and the second PMI may be comprised of 1 bit.

The precoding codebook for the Rank-1 is represented by the following table:

TABLE

| $i_1$ | $i_2$ | | | |
|---|---|---|---|---|
|  | 0 | 1 | 2 | 3 |
| 0-15 | $W^{(1)}_{2i_1,0}$ | $W^{(1)}_{2i_1,1}$ | $W^{(1)}_{2i_1,2}$ | $W^{(1)}_{2i_1,3}$ |
| $i_1$ | 4 | 5 | 6 | 7 |
| 0-15 | $W^{(1)}_{2i_1+1,0}$ | $W^{(1)}_{2i_1+1,1}$ | $W^{(1)}_{2i_1+1,2}$ | $W^{(1)}_{2i_1+1,3}$ |
| $i_1$ | 8 | 9 | 10 | 11 |
| 0-15 | $W^{(1)}_{2i_1+2,0}$ | $W^{(1)}_{2i_1+2,1}$ | $W^{(1)}_{2i_1+2,2}$ | $W^{(1)}_{2i_1+2,3}$ |
| $i_1$ | 12 | 13 | 14 | 15 |
| 0-15 | $W^{(1)}_{2i_1+3,0}$ | $W^{(1)}_{2i_1+3,1}$ | $W^{(1)}_{2i_1+3,2}$ | $W^{(1)}_{2i_1+3,3}$ | where $W^{(1)}_{m,n} = \frac{1}{\sqrt{8}}\begin{bmatrix} v_m \\ \varphi_n v_m \end{bmatrix}$ where $\phi_n$ is denoted by $\phi_n = e^{j\pi n/2}$ and $v_m$ is denoted by $v_m = [1\ e^{j2\pi m/32}\ e^{j4\pi m/32}\ e^{j6\pi m/32}]^T$, and in case of the Rank-1, the first PMI is set to any one of 0, 2, 4, 6, 8, 10, 12 and 14, and the second PMI is set to any one of 0 and 2.

The precoding codebook for the Rank-2 is represented by the following table:

TABLE

| $i_1$ | $i_2$ | | | |
|---|---|---|---|---|
|  | 0 | 1 | 2 | 3 |
| 0-15 | $W^{(2)}_{2i_1,2i_1,0}$ | $W^{(2)}_{2i_1,2i_1,1}$ | $W^{(2)}_{2i_1+1,2i_1+1,0}$ | $W^{(2)}_{2i_1+1,2i_1+1,1}$ |
| $i_1$ | 4 | 5 | 6 | 7 |
| 0-15 | $W^{(2)}_{2i_1+2,2i_1+2,0}$ | $W^{(2)}_{2i_1+2,2i_1+2,1}$ | $W^{(2)}_{2i_1+3,2i_1+3,0}$ | $W^{(2)}_{2i_1+3,2i_1+3,1}$ |
| $i_1$ | 8 | 9 | 10 | 11 |
| 0-15 | $W^{(2)}_{2i_1,2i_1+1,0}$ | $W^{(2)}_{2i_1,2i_1+1,1}$ | $W^{(2)}_{2i_1+1,2i_1+2,0}$ | $W^{(2)}_{2i_1+1,2i_1+2,1}$ |
| $i_1$ | 12 | 13 | 14 | 15 |
| 0-15 | $W^{(2)}_{2i_1,2i_1+3,0}$ | $W^{(2)}_{2i_1,2i_1+3,1}$ | $W^{(2)}_{2i_1+1,2i_1+3,0}$ | $W^{(2)}_{2i_1+1,2i_1+3,1}$ | where $W^{(2)}_{m,m',n} = \frac{1}{4}\begin{bmatrix} v_m & v_{m'} \\ \varphi_n v_m & -\varphi_n v_{m'} \end{bmatrix}$ where $\phi_n$ is denoted by $\phi_n = e^{j\pi n/2}$ and $v_m$ is denoted by $v_m = [1\ e^{j2\pi m/32}\ e^{j4\pi m/32}\ e^{j6\pi m/32}]^T$, and in case of the Rank-2, the first PMI is set to any one of 0, 2, 4, 6, 8, 10, 12 and 14, and the second PMI is set to any one of 0 and 1.

In association with each of the Rank-3 and the Rank-4, the first PMI is comprised of 1 bit in the subsampled codebook, and the second PMI is comprised of 3 bits.

The precoding codebook for the Rank-3 is represented by the following table:

TABLE

| $i_1$ | $i_2$ | | |
|---|---|---|---|
|  | 0 | 1 | 2 |
| 0-3 | $W^{(3)}_{8i_1,8i_1,8i_1+8}$ | $W^{(3)}_{8i_1+8,8i_1,8i_1+8}$ | $\tilde{W}^{(3)}_{8i_1,8i_1+8,8i_1+8}$ |
| $i_1$ | 3 | 4 | 5 |
| 0-3 | $\tilde{W}^{(3)}_{8i_1+8,8i_1,8i_1}$ | $W^{(3)}_{8i_1+2,8i_1+2,4i_1+10}$ | $W^{(3)}_{8i_1+10,8i_1+2,8i_1+10}$ |
| $i_1$ | 6 | 7 | 8 |
| 0-3 | $\tilde{W}^{(3)}_{8i_1+2,8i_1+10,8i_1+10}$ | $\tilde{W}^{(3)}_{8i_1+10,8i_1+2,8i_1+2}$ | $W^{(3)}_{8i_1+4,8i_1+4,8i_1+12}$ |
| $i_1$ | 9 | 10 | 11 |
| 0-3 | $W^{(3)}_{8i_1+12,8i_1+4,8i_1+12}$ | $\tilde{W}^{(3)}_{8i_1+4,8i_1+12,8i_1+2}$ | $\tilde{W}^{(3)}_{8i_1+12,8i_1+4,8i_1+4}$ |

TABLE-continued

| | $i_2$ | | |
|---|---|---|---|
| $i_1$ | 12 | 13 | 14 |
| 0-3 | $W^{(3)}_{8i_1+6,8i_1+6,8i_1+14}$ | $W^{(3)}_{8i_1+14,8i_1+6,8i_1+14}$ | $\tilde{W}^{(3)}_{8i_1+6,8i_1+14,8i_1+14}$ |

| | $i_2$ |
|---|---|
| $i_1$ | 15 |
| 0-3 | $\tilde{W}^{(3)}_{8i_1+14,8i_1+6,8i_1+6}$ | where $W^{(3)}_{m,m',m''} = \frac{1}{\sqrt{24}}\begin{bmatrix} v_m & v_{m'} & v_{m''} \\ v_m & -v_{m'} & -v_{m''} \end{bmatrix}$, $\tilde{W}^{(3)}_{m,m',m''} = \frac{1}{\sqrt{24}}\begin{bmatrix} v_m & v_{m'} & v_{m''} \\ v_m & v_{m'} & -v_{m''} \end{bmatrix}$ where $\phi_n$ is denoted by $\phi_n = e^{j\pi n/2}$ and $v_m$ is denoted by $v_m = [1\ e^{j2\pi m/32}\ e^{j4\pi m/32}\ e^{j6\pi m/32}]^T$, and in case of the Rank-3, the first PMI is set to any one of 0 and 2, and the second PMI is set to any one of 0, 1, 2, 3, 8, 9, 10 and 11.

The precoding codebook for the Rank-4 is represented by the following table:

TABLE

| | $i_2$ | | | |
|---|---|---|---|---|
| $i_1$ | 0 | 1 | 2 | 3 |
| 0-3 | $W^{(4)}_{8i_1,8i_1+8,0}$ | $W^{(4)}_{8i_1,8i_1+8,1}$ | $W^{(4)}_{8i_1+2,8i_1+10,0}$ | $W^{(4)}_{8i_1+2,8i_1+10,1}$ |

| | $i_2$ | | | |
|---|---|---|---|---|
| $i_1$ | 4 | 5 | 6 | 7 |
| 0-3 | $W^{(4)}_{8i_1+4,8i_1+12,0}$ | $W^{(4)}_{8i_1+4,8i_1+12,1}$ | $W^{(4)}_{8i_1+6,8i_1+14,0}$ | $W^{(4)}_{8i_1+6,8i_1+14,1}$ | where $W^{(4)}_{m,m',n} = \frac{1}{\sqrt{32}}\begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$ where $\phi_n$ is denoted by $\phi_n = e^{j\pi n/2}$ and $v_m$ is denoted by $v_m = [1\ e^{j2\pi m/32}\ e^{j4\pi m/32}\ e^{j6\pi m/32}]^T$, and in case of the Rank-4, the first PMI is set to any one of 0 and 2, and the second PMI is set to any one of 0, 1, 2, 3, 4, 5, 6 and 7.

The RI is transmitted over a physical uplink control channel (PUCCH) of the first subframe, and the first PMI, the second PMI, and the CQI are transmitted over a PUCCH of the second subframe.

The RI, the first PMI, the second PMI, and the CQI are contained in channel status information (CSI) of downlink 8 transmission (Tx) antennas.

The RI is transmitted according to a first report cycle, and the first PMI, the second PMI, and the CQI are transmitted according to a second report cycle.

It is to be understood that both the foregoing general description and the following detailed description of the present invention are exemplary and explanatory and are intended to provide further explanation of the invention as claimed.

As apparent from the above description, exemplary embodiments of the present invention have the following effects. The embodiments of the present invention provide a method and apparatus for configuring and transmitting feedback information used for correctly and efficiently support the MIMO operation based on the extended antenna configuration.

It will be appreciated by persons skilled in the art that that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 13 shows a resource mapping structure of PUCCH;

DETAILED DESCRIPTION OF THE INVENTION

Figure 1:
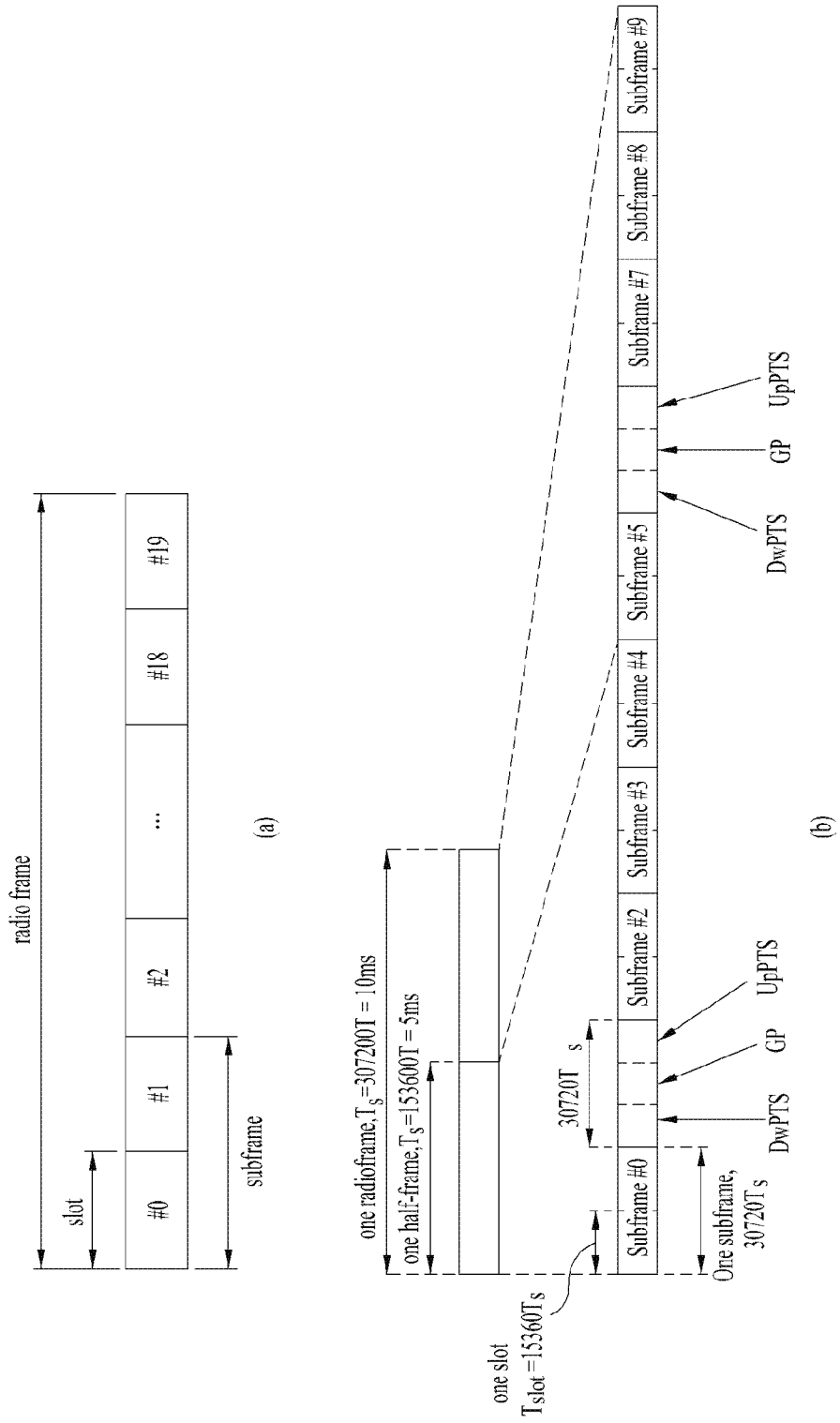
FIG. 1 exemplarily shows a radio frame structure for use in a 3rd Generation Partnership Project Long Term Evolution (3GPP LTE) system.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for the convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, an LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. The CDMA may be embodied with wireless (or radio) technology such as UTRA (Universal Terrestrial Radio Access) or CDMA2000. The TDMA may be embodied with wireless (or radio) technology such as GSM (Global System for Mobile communications)/GPRS (General Packet Radio Service)/EDGE (Enhanced Data Rates for GSM Evolution). The OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The 3GPP LTE employs the OFDMA in downlink and employs the SC-FDMA in uplink. The LTE-Advanced (LTE-A) is an evolved version of the 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and 3GPP LTE-A system. However, technical features of the present invention are not limited thereto.

FIG. 1 exemplarily shows a radio frame structure for use in a 3rd Generation Partnership Project Long Term Evolution (3GPP LTE) system. A downlink (DL) radio frame structure will hereinafter be described with reference to FIG. 1. In a cellular Orthogonal Frequency Division Multiplexing (OFDM) radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 1(*a*) is a diagram showing the structure of the type 1 radio frame. A downlink radio frame includes 10 subframes, and one subframe includes two slots in a time region. A time required for transmitting one subframe is defined in a Transmission Time Interval (TTI). For example, one subframe may have a length of 1 ms and one slot may have a length of 0.5 ms. One slot may include a plurality of OFDM symbols in a time region and include a plurality of Resource Blocks (RBs) in a frequency region. Since the 3GPP LTE system uses OFDMA in downlink, the OFDM symbol indicates one symbol duration. The OFDM symbol may be called an SC-FDMA symbol or a symbol duration. RB is a resource allocation unit and includes a plurality of contiguous carriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, the number of OFDM symbols included in one slot is less than that of the case of the normal CP. In case of the extended CP, for example, the number of OFDM symbols included in one slot may be six. If the channel state is unstable, for example, if a User Equipment (UE) moves at a high speed, the extended CP may be used in order to further reduce interference between symbols.

In case of using the normal CP, since one slot includes seven OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDSCH).

The structure of a type 2 radio frame is shown in FIG. 1(*b*). The type 2 radio frame includes two half-frames, each of which is made up of five subframes, a downlink pilot time slot (DwPTS), a guard period (GP), and an uplink pilot time slot (UpPTS), in which one subframe consists of two slots. That is, one subframe is composed of two slots irrespective of the radio frame type. DwPTS is used to perform initial cell search, synchronization, or channel estimation. UpPTS is used to perform channel estimation of a base station and uplink transmission synchronization of a user equipment (UE). The guard interval (GP) is located between an uplink and a downlink so as to remove interference generated in the uplink due to multi-path delay of a downlink signal. That is, one subframe is composed of two slots irrespective of the radio frame type.

The structure of the radio frame is only exemplary. Accordingly, the number of subframes included in the radio frame, the number of slots included in the subframe or the number of symbols included in the slot may be changed in various manners.

Figure 2:
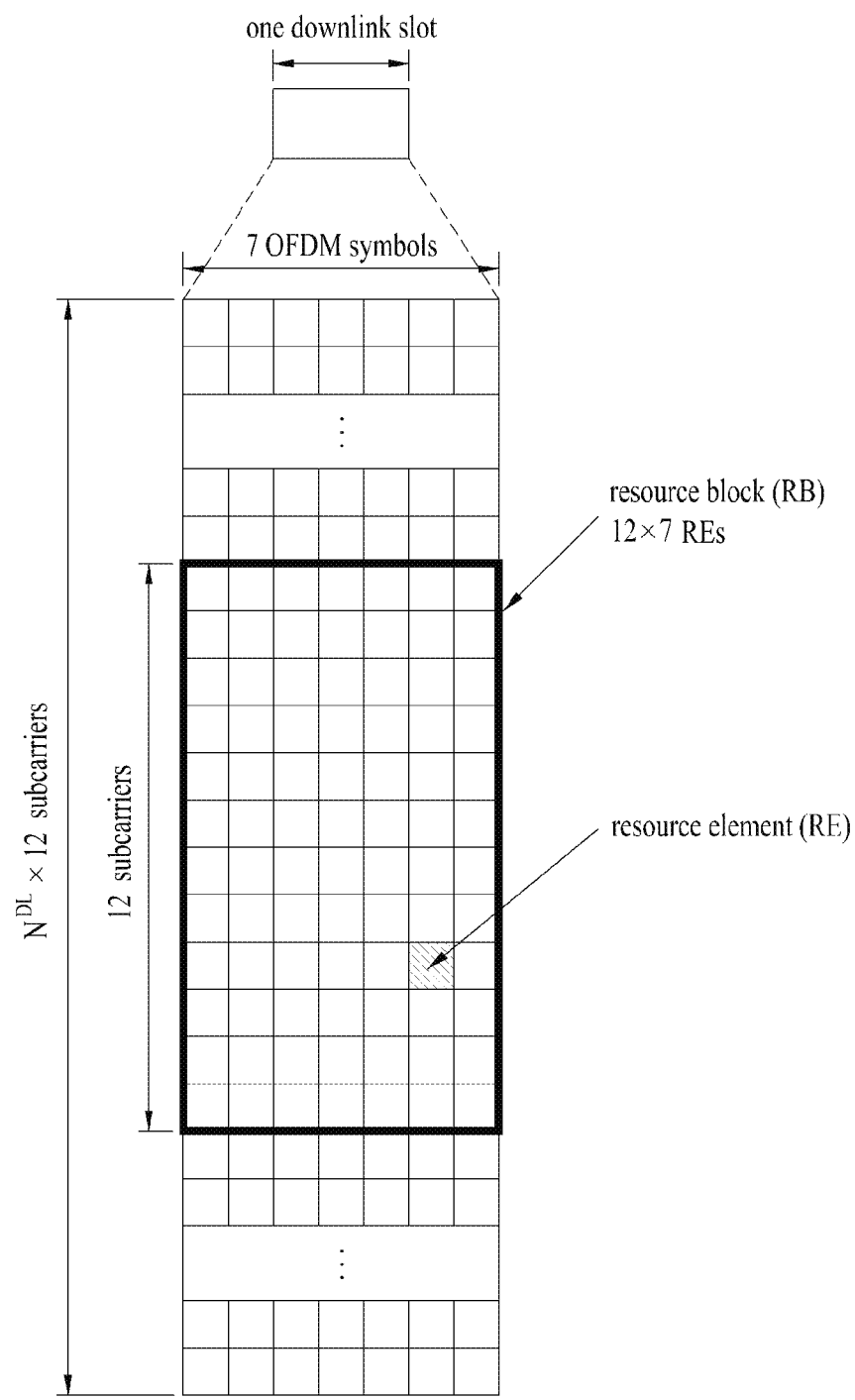
FIG. 2 exemplarily shows a resource grid of a downlink (DL) slot.

FIG. 2 is a diagram showing a resource grid in a downlink slot. Although one downlink slot includes seven OFDM symbols in a time domain and one RB includes 12 subcarriers in a frequency domain in the figure, the scope or spirit of the present invention is not limited thereto. For example, in case of a normal Cyclic Prefix (CP), one slot includes 7 OFDM symbols. However, in case of an extended CP, one slot may include 6 OFDM symbols. Each element on the resource grid is referred to as a resource element. One RB includes 12×7 resource elements. The number $N^{DL}$ of RBs included in the downlink slot is determined based on downlink transmission bandwidth. The structure of the uplink slot may be equal to the structure of the downlink slot.

Figure 3:
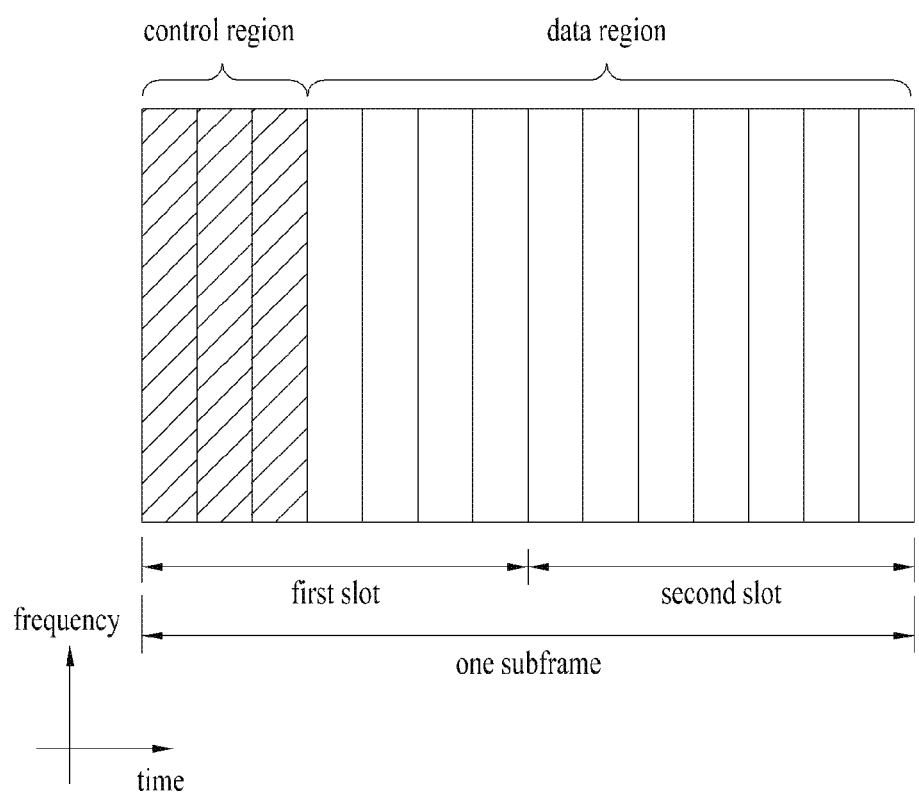
FIG. 3 is a downlink (DL) subframe structure.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. The basic unit of transmission becomes one subframe. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response to uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of a higher layer control message such as a Random Access Response (RAR) transmitted on the PDSCH, a set of transmit power control commands for individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted on an aggregation of one or several contiguous control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The base station determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
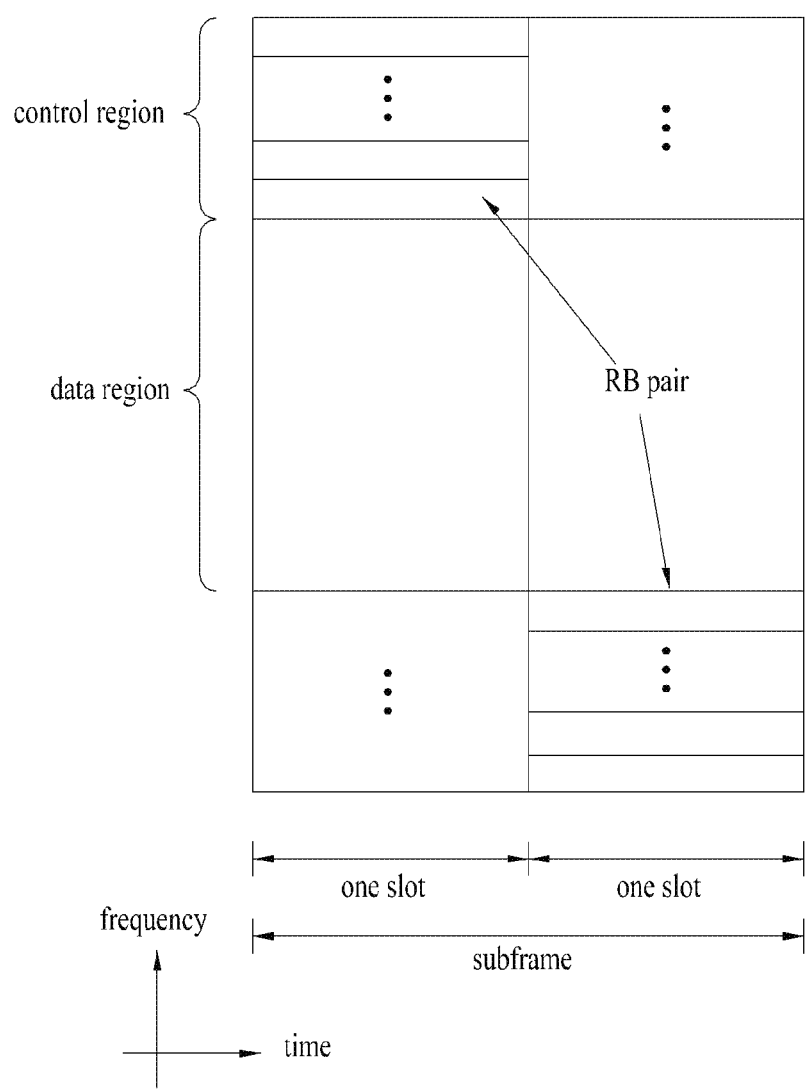
FIG. 4 is an uplink (UL) subframe structure.

FIG. 4 is a diagram showing the structure of an uplink frame. The uplink subframe may be divided into a control region and a data region in a frequency region. A Physical Uplink Control Channel (PUCCH) including uplink control information is allocated to the control region. A Physical uplink Shared Channel (PUSCH) including user data is allocated to the data region. In order to maintain single carrier characteristics, one UE does not simultaneously transmit the PUCCH and the PUSCH. The PUCCH for one UE is allocated to an RB pair in a subframe. RBs belonging to the RB pair occupy different subcarriers with respect to two slots. Thus, the RB pair allocated to the PUCCH is "frequency-hopped" at a slot edge.

Carrier Aggregation

Although downlink and uplink bandwidths are different from each other, a wireless communication system typically uses one carrier. For example, a wireless communication system having one carrier for each of the downlink and the uplink and symmetry between the downlink and uplink bandwidths may be provided based on a single carrier.

The International Telecommunication Union (ITU) requests that IMT-Advanced candidates support wider bandwidths, compared to legacy wireless communication systems. However, allocation of a wide frequency bandwidth is difficult throughout most of the world. Accordingly, a technology for efficiently using small segmented bands, known as carrier aggregation (bandwidth aggregation) or spectrum aggregation, has been developed in order to aggregate a plurality of physical bands to a logical wider band.

Carrier aggregation was introduced to support increased throughput, prevent a cost increase caused by introduction of wideband RF devices, and ensure compatibility with legacy systems. Carrier aggregation enables data exchange between a UE and an eNB through a group of carriers each having a bandwidth unit defined in a legacy wireless communication system (e.g. 3GPP LTE Release-8 or Release-9 in case of 3GPP LTE-A). The carriers each having a bandwidth unit defined in the legacy wireless communication system may be called Component Carriers (CCs). Carrier aggregation using one or more CCs may be applied to each of the downlink and the uplink. Carrier aggregation may support a system bandwidth of up to 100 MHz by aggregating up to five CCs each having a bandwidth of 5, 10 or 20 MHz.

A downlink CC and an uplink CC may be represented as a DL CC and a UL CC, respectively. A carrier or CC may be represented as a cell in terms of function in the 3GPP LTE system. Thus, a DL CC and a UL CC may be referred to as a DL cell and a UL cell, respectively. Hereinbelow, the terms 'carriers', 'component carriers', 'CCs' or 'cells' will be used to signify a plurality of carriers to which carrier aggregation is applied.

While the following description exemplarily uses an eNB (BS) or cell as a downlink transmission entity and exemplarily uses a UE as an uplink transmission entity, the scope or spirit of the present invention is not limited thereto. That is, even when a relay node (RN) may be used as a downlink transmission entity from an eNB to a UE and or be used as an uplink reception entity from a UE to an eNB, or even when the RN may be used an uplink transmission entity for a UE or be used as a downlink reception entity from an eNB, it should be noted that the embodiments of the present invention can be applied without difficulty.

Downlink carrier aggregation may be described as an eNB supporting downlink transmission to a UE in frequency resources (subcarriers or physical resource blocks [PRBs]) of one or more carrier bands in time resources (allocated in units of a subframe). Uplink carrier aggregation may be described as a UE supporting uplink transmission to an eNB in frequency resources (subcarriers or PRBs) of one or more carrier bands in time resources (allocated in units of a subframe).

Figure 5:
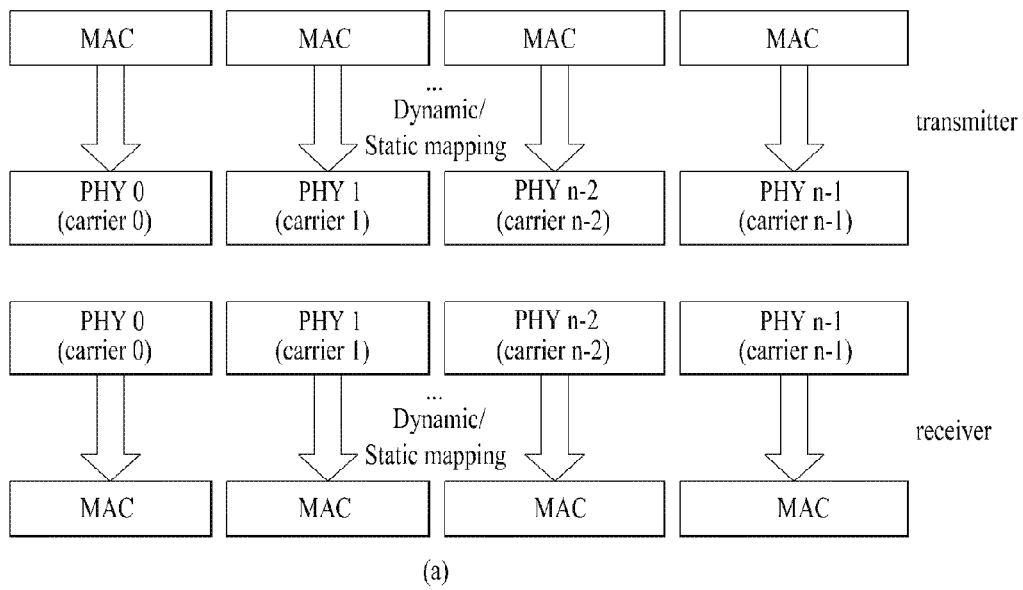
FIG. 5 shows a physical layer (L1) and a MAC layer (L2) of a multi-carrier supported system.
Figure 5:
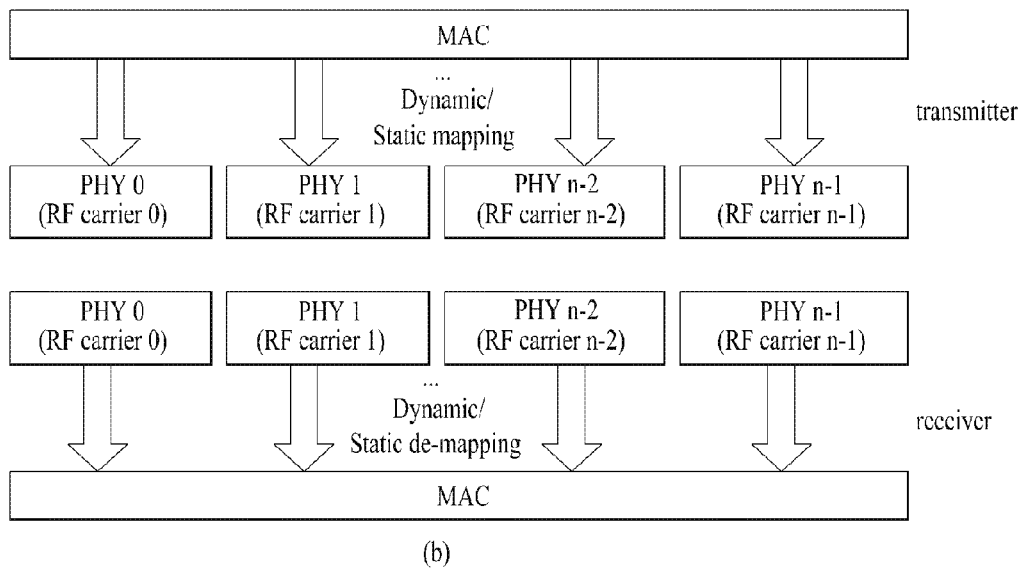

FIG. 5 shows a physical layer (first layer, L1) and a MAC layer (second layer, L2) of a multi-carrier supported system. Referring to FIG. 5, an eNB or BS of the legacy wireless communication system supporting a single carrier includes one physical layer (PHY) entity capable of supporting one carrier, and one medium access control (MAC) entity for controlling one PHY entity may be provided to the eNB. For example, baseband processing may be carried out in the PHY layer. For example, the L1/L2 scheduler operation including not only MAC PDU (Protocol Data Unit) creation of a transmitter but also MAC/RLC sub-layers may be carried out in the MAC layer. The MAC PDU packet block of the MAC layer is converted into a transport block through a logical transport layer, such that the resultant transport block is mapped to a physical layer input information block. In FIG. 5, the MAC layer is represented as the entire L2 layer, and may conceptually cover MAC/RLC/PDCP sub-layers. For convenience of description and better understanding of the present invention, the above-mentioned application may be used interchangeably in the MAC layer description of the present invention.

On the other hand, a multicarrier-supported system may provide a plurality of MAC-PHY entities. In more detail, as can be seen from FIG. 5(a), the transmitter and receiver of the multicarrier-supported system may be configured in such a manner that one MAC-PHY entity is mapped to each of n component carriers (n CCs). An independent PHY layer and an independent MAC layer are assigned to each CC, such that a PDSCH for each CC may be created in the range from the MAC PDU to the PHY layer.

Alternatively, the multicarrier-supported system may provide one common MAC entity and a plurality of PHY entities. That is, as shown in FIG. 5(b), the multicarrier-supported system may include the transmitter and the receiver in such a manner that n PHY entities respectively correspond to n CCs and one common MAC entity controlling the n PHY entities may be present in each of the transmitter and the receiver. In this case, a MAC PDU from one MAC layer may be branched into a plurality of transport blocks corresponding to a plurality of CCs through a transport layer. Alternatively, when generating a MAC PDU in the MAC layer or when generating an RLC PDU in the RLC layer, the MAC PDU or RLC PDU may be branched into individual CCs. As a result, a PDSCH for each CC may be generated in the PHY layer.

PDCCH for transmitting L1/L2 control signaling control information generated from a packet scheduler of the MAC layer may be mapped to physical resources for each CC, and then transmitted. In this case, PDCCH that includes control information (DL assignment or UL grant) for transmitting PDSCH or PUSCH to a specific UE may be separately encoded at every CC to which the corresponding PDSCH/PUSCH is transmitted. The PDCCH may be called a separate coded PDCCH. On the other hand, PDSCH/PUSCH transmission control information of several CCs may be configured in one PDCCH such that the configured PDCCH may be transmitted. This PDCCH may be called a joint coded PDCCH.

To support carrier aggregation, connection between a BS (or eNB) and a UE (or RN) needs to be established and preparation of connection setup between the BS and the UE is needed in such a manner that a control channel (PDCCH or PUCCH) and/or a shared channel (PDSCH or PUSCH) can be transmitted. In order to perform the above-mentioned connection or connection setup for a specific UE or RN, measurement and/or reporting for each carrier are needed, and CCs serving as the measurement and/or reporting targets may be assigned. In other words, CC assignment means that CCs (indicating the number of CCs and indexes of CCs) used for DL/UL transmission are established in consideration of not only capability of a specific UE (or RN) from among UL/DL CCs constructed in the BS but also the system environments.

In this case, when CC assignment is controlled in third layer (L3) Radio Resource Management (RRM), UE-specific or RN-specific RRC signaling may be used. Alternatively, cell-specific or cell cluster-specific RRC signaling may be used. Provided that dynamic control such as a series of CC activation/deactivation setting is needed for CC assignment, a predetermined PDCCH may be used as L1/L2 control signaling, or a dedicated physical control channel for CC assignment control information or an L2 MAC-message formatted PDSCH may be used. On the other hand, if CC assignment is controlled by a packet scheduler, a predetermined PDCCH may be used as L1/L2 control signaling, a physical control channel dedicated for CC assignment control information may be used, or a PDSCH configured in the form of L2 MAC message may be used.

Figure 6:
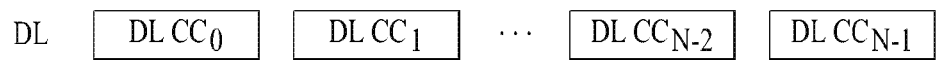
FIG. 6 is a conceptual diagram illustrating downlink (DL) and uplink (UL) component carriers (CCs)
Figure 6:

FIG. 6 is a conceptual diagram illustrating downlink (DL) and uplink (UL) component carriers (CCs). Referring to FIG. 6, DL and UL CCs may be assigned from an eNB (cell) or RN. For example, the number of DL CCs may be set to N and the number of UL CCs may be set to M.

Through the UE's initial access or initial deployment process, after RRC connection is established on the basis of one certain CC for DL or UL (cell search) (for example, system information acquisition/reception, initial random access process, etc.), a unique carrier setup for each UE may be provided from a dedicated signaling (UE-specific RRC signaling or UE-specific L1/L2 PDCCH signaling). For example, assuming that a carrier setup for UE is commonly achieved in units of an eNB (cell or cell-cluster), the UE carrier setup may also be provided through cell-specific RRC signaling or cell-specific UE-common L1/L2 PDCCH signaling. In another example, carrier component information for use in an eNB may be signaled to a UE through system information for RRC connection setup, or may also be signaled to additional system information or cell-specific RRC signaling upon completion of the RRC connection setup.

While DL/UL CC setup has been described, centering on the relationship between an eNB and a UE, to which the present invention is not limited, an RN may also provide DL/UL CC setup to a UE contained in an RN region. In addition, in association with a RN contained in an eNB region, the eNB may also provide DL/UL CC setup of the corresponding RN to the RN of the eNB region. For clarity, while the following description will disclose DL/UL CC setup on the basis of the relationship between the eNB and the UE, it should be noted that the same content may also be applied to the relationship between the RN and the UE (i.e., an access uplink and downlink) or the relation between the eNB and the RN (backhaul uplink or downlink) without departing from the scope or spirit of the present invention.

When the above-mentioned DL/UL CCs are uniquely assigned to individual UEs, DL/UL CC linkage may be implicitly or explicitly configured through a certain signaling parameter definition.

Figure 7:
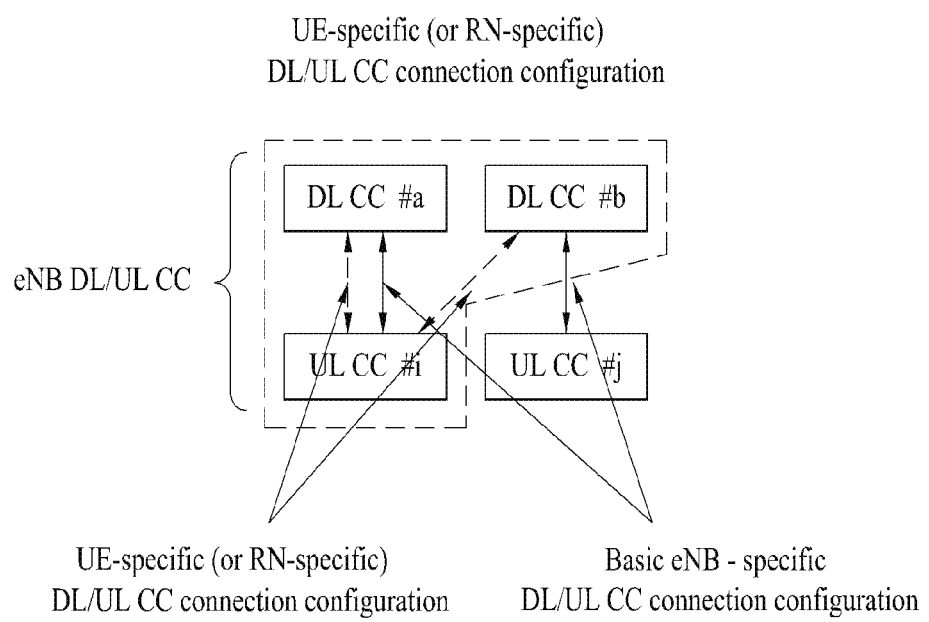
FIG. 7 shows an exemplary linkage of DL/UL CCs.

FIG. 7 shows an exemplary linkage of DL/UL CCs. In more detail, when an eNB configures two DL CCs (DL CC #a and DL CC #b) and two UL CCs (UL CC #i and UL CC #j), FIG. 6 shows a DL/UL CC linkage defined when two DL CCs (DL CC #a and DL CC #b) and one UL CC (UL CC #i) are assigned to a certain UE.

In a DL/UL CC linkage setup shown in FIG. 7, a solid line indicates a linkage setup between DL CC and UL CC that are basically constructed by an eNB, and this linkage setup between DL CC and UL CC may be defined in "System Information Block (SIB) 2". In the DL/UL CC linkage setup shown in FIG. 7, a dotted line indicates a linkage setup between DL CC and UL CC configured in a specific UE. The above-mentioned DL CC and UL CC linkage setup shown in FIG. 7 is disclosed only for illustrative purposes, and the scope or spirit of the present invention is not limited thereto. That is, in accordance with various embodiments of the present invention, the number of DL CCs or UL CCs configured by eNB may be set to an arbitrary number. Thus, the number of UE-specific DL CCs or the number of UE-specific UL CCs in the above-mentioned DL CCs or UL CCs may be set to an arbitrary number, and associated DL/UL CC linkage may be defined in a different way from that of FIG. 7.

Further, from among DL CCs and UL CCs configured or assigned, a primary CC (PCC), or a primary cell (P-cell) or an anchor CC (also called an anchor cell) may be configured. For example, a DL PCC (or DL P-cell) aiming to transmit configuration/reconfiguration information on RRC connection setup may be configured. In another example, UL CC for transmitting PUCCH to be used when a certain UE transmits UCI that must be transmitted on uplink may be configured as UL PCC (or UL P-cell). For convenience of description, it is assumed that one DL PCC (P-cell) and one UL PCC (P-cell) are basically assigned to each UE. Alternatively, if a large number of CCs is assigned to UE or if CCs can be assigned from a plurality of eNBs, one or more DL PCCs (P-cells) and/or one or more UL PCCs (P-cells) may be assigned from one or more eNBs to a certain UE. For the linkage between DL PCC (P-cell) and UL PCC (P-cell), a UE-specific configuration method may be considered by eNB as necessary. To implement a more simplified method, a linkage between DL PCC (P-cell) and UL PCC (P-cell) may be configured on the basis of the relationship of basic linkage that has been defined in LTE Release-8 (LTE Rel-8) and signaled to System Information Block (or Base) 2. DL PCC (P-cell) and UL PCC (P-cell) for the above-mentioned linkage configuration are grouped so that the grouped result may be denoted by a UE-specific P-cell.

SC-FDMA Transmission and OFDMA Transmission

Figure 8:
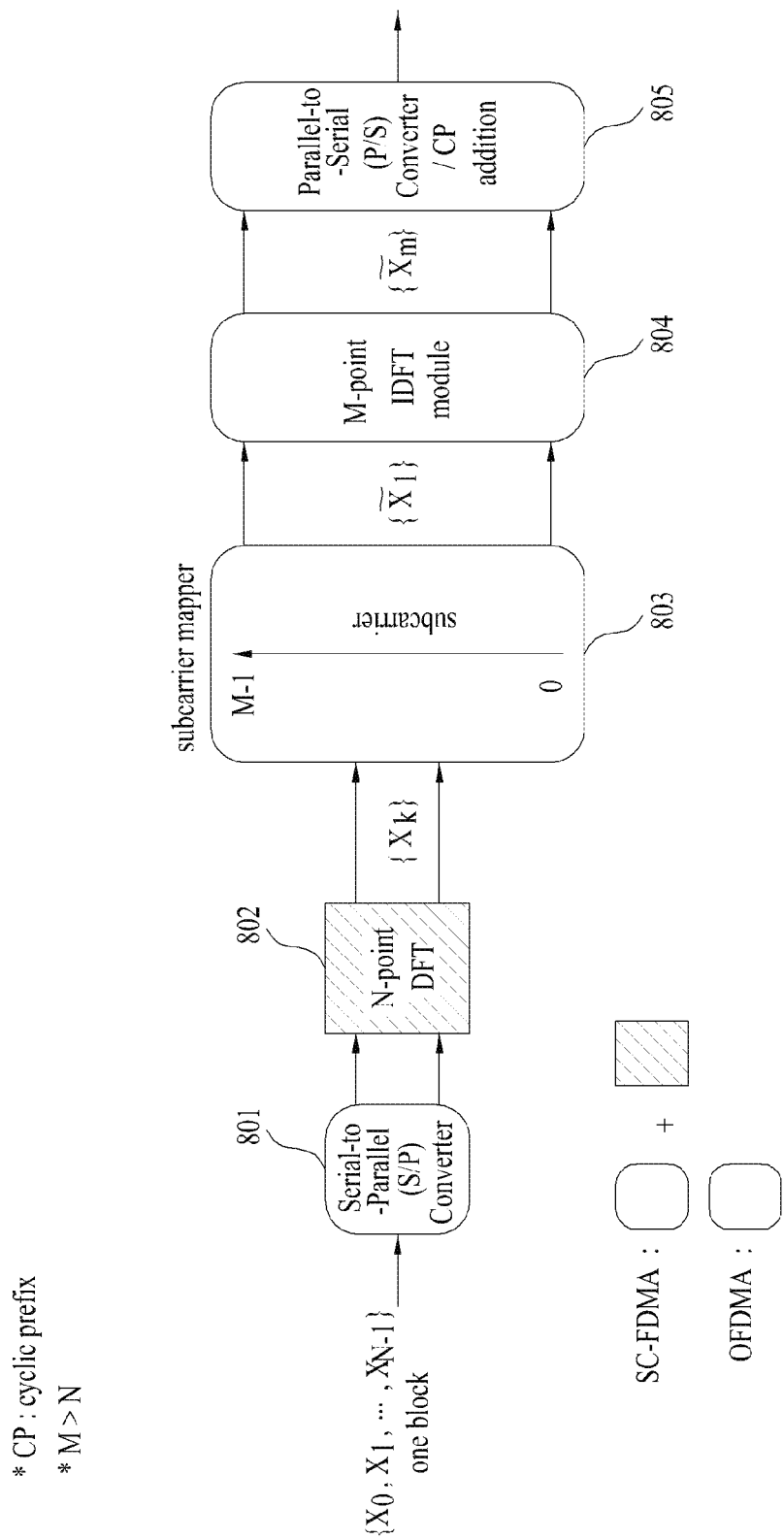
FIG. 8 is a conceptual diagram illustrating an SC-FDMA transmission scheme and an OFDMA transmission scheme.

FIG. 8 is a conceptual diagram illustrating an SC-FDMA transmission scheme and an OFDMA transmission scheme for use in a mobile communication system. The SC-FDMA transmission scheme may be used for UL transmission and the OFDMA transmission scheme may be used for DL transmission.

Each of the UL signal transmission entity (e.g., UE) and the DL signal transmission entity (e.g., eNB) may include a Serial-to-Parallel (S/P) Converter 801, a subcarrier mapper 803, an M-point Inverse Discrete Fourier Transform (IDFT) module 804, and a Parallel-to-Serial Converter 805. Each input signal that is input to the S/P converter 801 may be a channel coded and modulated data symbol. However, a user equipment (UE) for transmitting signals according to the SC-FDMA scheme may further include an N-point Discrete Fourier Transform (DFT) module 802. The influence of IDFT processing of the M-point IDFT module 804 is considerably offset, such that a transmission signal may be designed to have single carrier property. That is, the DFT module 802 performs DFT spreading of an input data symbol such that single carrier property requisite for UL transmission may be satisfied. The SC-FDMA transmission scheme basically provides good or superior Peak to Average Power ratio (PAPR) or Cubic Metric (CM), such that the UL transmitter can more effectively transmit data or information even in the case of the power limitation situation, resulting in an increase in user throughput.

Figure 9:
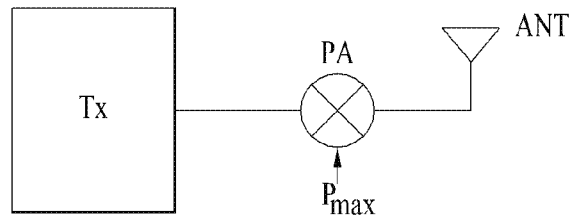
FIG. 9 is a conceptual diagram illustrating maximum transmission power for single antenna transmission and MIMO transmission.
Figure 9:
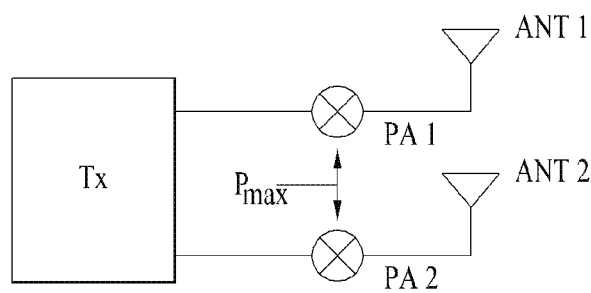
Figure 9:
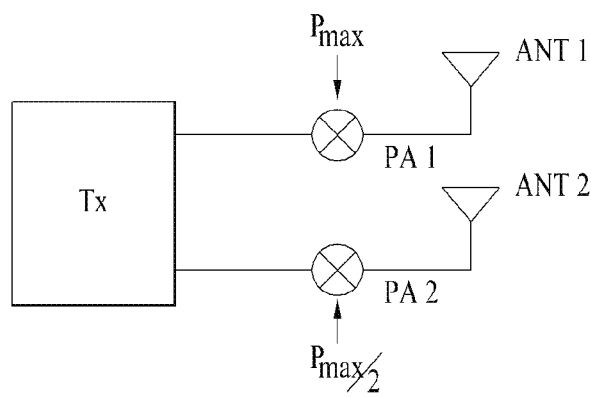

FIG. 9 is a conceptual diagram illustrating maximum transmission power for single antenna transmission and MIMO transmission. FIG. 9(a) shows the case of single antenna transmission. As can be seen from FIG. 9(a), one power amplifier (PA) may be provided to one antenna. In FIG. 9(a), an output signal ($P_{max}$) of the power amplifier (PA) may have a specific value, for example, 23 dBm. In contrast, FIGS. 9(b) and 9(c) show the case of MIMO transmission. As can be seen from FIGS. 9(b) and 9(c), several PAs may be mapped to respective transmission (Tx) antennas. For example, provided that the number of transmission (Tx) antennas is set to 2, 2 PAs may be mapped to respective transmission (Tx) antennas. The setting of output values (i.e., maximum transmission power) of 2 PAs may be configured in different ways as shown in FIGS. 9(b) and 9(c).

In FIG. 9(b), maximum transmission power ($P_{max}$) for single antenna transmission may be divisionally applied to PA1 and PA2. That is, if a transmission power value of x [dBm] is assigned to PA1, a transmission power value of ($P_{max}$-x) [dBm] may be applied to PA2. In this case, since total transmission power ($P_{max}$) is maintained, the transmitter may have higher robustness against the increasing PAPR in the power limitation situation.

On the other hand, as can be seen from FIG. 9(c), only one Tx antenna (ANT1) may have a maximum transmission power value ($P_{max}$), and the other Tx antenna (ANT2) may have a half value ($P_{max}/2$) of the maximum transmission power value ($P_{max}$). In this case, only one transmission antenna may have higher robustness against the increasing PAPR.

MIMO System

MIMO technology is not dependent on one antenna path to receive one total message, collects a plurality of data pieces received via several antennas, and completes total data. As a result, MIMO technology can increase a data transfer rate within a specific range, or can increase a system range at a specific data transfer rate. Under this situation, MIMO technology is a next-generation mobile communication technology capable of being widely applied to mobile communication terminals or RNs. MIMO technology can extend the range of data communication, so that it can overcome the limited amount of transmission (Tx) data of mobile communication systems reaching a critical situation.

Figure 10:
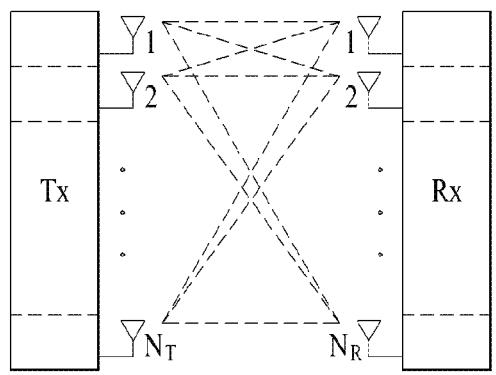
FIG. 10 is a conceptual diagram illustrating a MIMO communication system.
Figure 10:
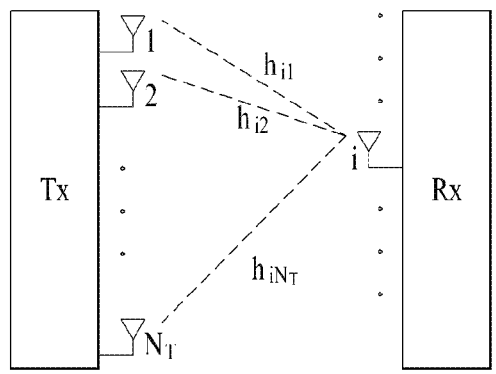

FIG. 10(*a*) is a block diagram illustrating a general MIMO communication system. Referring to FIG. 10(*a*), if the number of transmission (Tx) antennas increases to $N_T$, and at the same time the number of reception (Rx) antennas increases to $N_R$, a theoretical channel transmission capacity of the MIMO communication system increases in proportion to the number of antennas, differently from the above-mentioned case in which only a transmitter or receiver uses several antennas, so that a transfer rate and a frequency efficiency can be greatly increased. In this case, the transfer rate acquired by the increasing channel transmission capacity can theoretically increase by a predetermined amount that corresponds to multiplication of a maximum transfer rate ($R_o$) acquired when one antenna is used and a rate of increase ($R_i$). The rate of increase ($R_i$) can be represented by the following equation 1.

$$R_i = \min(N_T, N_R) \quad \text{[Equation 1]}$$

For example, provided that a MIMO system uses four transmission (Tx) antennas and four reception (Rx) antennas, the MIMO system can theoretically acquire a high transfer rate which is four times higher than that of a one antenna system. After the above-mentioned theoretical capacity increase of the MIMO system was demonstrated in the mid-1990s, many developers began to conduct intensive research into a variety of technologies which can substantially increase a data transfer rate using the theoretical capacity increase. Some of the above technologies have been reflected in a variety of wireless communication standards, for example, a third-generation mobile communication or a next-generation wireless LAN, etc.

A variety of MIMO-associated technologies have been intensively researched by many companies or developers, for example, research into an information theory associated with a MIMO communication capacity calculation under various channel environments or multiple access environments, research into a radio frequency (RF) channel measurement and modeling of the MIMO system, and research into a space-time signal processing technology.

A mathematical modeling of a communication method for use in the above-mentioned MIMO system will hereinafter be described in detail. As can be seen from FIG. 10(*a*), it is assumed that there are $N_T$ transmission (Tx) antennas and $N_R$ reception (Rx) antennas. In the case of a transmission (Tx) signal, a maximum number of transmission information pieces is $N_T$ under the condition that $N_T$ transmission (Tx) antennas are used, so that the transmission (Tx) information can be represented by a specific vector shown in the following equation 2.

$$s = [s_1, s_2, \ldots, s_{N_T}]^T \quad \text{[Equation 2]}$$

In the meantime, individual transmission (Tx) information pieces ($s_1, s_2, s_{N_T}$) may have different transmission powers. In this case, if the individual transmission powers are denoted by ($P_1, P_2, \ldots, P_{N_T}$), transmission (Tx) information having an adjusted transmission power can be represented by a specific vector shown in the following equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In Equation 3, $\hat{s}$ is a transmission vector, and can be represented by the following equation 4 using a diagonal matrix P of a transmission (Tx) power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

In the meantime, the information vector $\hat{s}$ having an adjusted transmission power is applied to a weight matrix (W), so that $N_T$ transmission (Tx) signals ($x_1, x_2, \ldots, x_{N_T}$) to be actually transmitted are configured. In this case, the weight matrix (W) is adapted to properly distribute transmission (Tx) information to individual antennas according to transmission channel situations. The above-mentioned transmission (Tx) signals ($x_1, x_2, \ldots, x_{N_T}$) can be represented by the following equation 5 using the vector (X).

$$\begin{aligned}
x &= \begin{bmatrix} x_1 \\ x_2 \\ \vdots \\ x_i \\ \vdots \\ x_{N_T} \end{bmatrix} \\
&= \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} \\
&= W\hat{s} \\
&= WPs
\end{aligned} \quad \text{[Equation 5]}$$

Next, if $N_R$ reception (Rx) antennas are used, reception (Rx) signals ($y_1, y_2, \ldots, y_{N_R}$) of individual antennas can be represented by a specific vector (y) shown in the following equation 6.

$$y = [y_1, y_2, \ldots, r_{N_R}]^T \quad \text{[Equation 6]}$$

In the meantime, if a channel modeling is executed in the MIMO communication system, individual channels can be distinguished from each other according to transmission/reception (Tx/Rx) antenna indexes. A specific channel passing the range from a transmission (Tx) antenna (j) to a reception (Rx) antenna (i) is denoted by $h_{ij}$. In this case, it should be noted that the index order of the channel $h_{ij}$ is located before a reception (Rx) antenna index and is located after a transmission (Tx) antenna index.

Several channels are tied up, so that they are displayed in the form of a vector or matrix. An exemplary vector is as follows. FIG. 10(*b*) shows channels from $N_T$ transmission (Tx) antennas to a reception (Rx) antenna (i).

Referring to FIG. 10(*b*), the channels passing the range from the $N_T$ transmission (Tx) antennas to the reception (Rx) antenna (i) can be represented by the following equation 7.

$$h_i^T = [h_i 1, h_i 2, \ldots, h_{iN_T}] \quad \text{[Equation 7]}$$

If all channels passing the range from the $N_T$ transmission (Tx) antennas to $N_R$ reception (Rx) antennas are denoted by the matrix shown in Equation 7, the following equation 8 is acquired.

$$H = \begin{bmatrix} h_1^T \\ h_1^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_R N_T} \end{bmatrix} \quad \text{[Equation 8]}$$

Additive white Gaussian noise (AWGN) is added to an actual channel which has passed the channel matrix (H) shown in Equation 8. The AWGN ($n_1, n_2, \ldots, n_{N_R}$) added to each of $N_R$ reception (Rx) antennas can be represented by a specific vector shown in the following equation 9.

$$n = [n_1, n_2, \ldots, n_{N_R}]^T \quad \text{[Equation 9]}$$

A reception signal calculated by the above-mentioned equations can be represented by the following equation 10.

$$y = \begin{bmatrix} y_1 \\ y_2 \\ \vdots \\ y_i \\ \vdots \\ y_{N_R} \end{bmatrix} \quad \text{[Equation 10]}$$

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

In the meantime, the number of rows and the number of columns of a channel matrix H indicating a channel condition are determined by the number of Tx/Rx antennas. In the channel matrix H, the number of rows is equal to the number ($N_R$) of Rx antennas, and the number of columns is equal to the number ($N_T$) of Tx antennas. Namely, the channel matrix H is denoted by $N_R \times N_T$ matrix. Generally, a matrix rank is defined by a smaller number between the number of rows and the number of columns, in which the rows and the columns are independent of each other. Therefore, the matrix rank cannot be higher than the number of rows or columns. The rank of the channel matrix H can be represented by the following equation 11.

$$\text{rank}(H) \leq \min(N_T, N_R) \quad \text{[Equation 11]}$$

A variety of MIMO transmission/reception (Tx/Rx) schemes may be used for operating the MIMO system, for example, frequency switched transmit diversity (FSTD), Space Frequency Block Code (SFBC), Space Time Block Code (STBC), Cyclic Delay Diversity (CDD), time switched transmit diversity (TSTD), etc. In case of Rank 2 or higher, Spatial Multiplexing (SM), Generalized Cyclic Delay Diversity (GCDD), Selective Virtual Antenna Permutation (S-VAP), etc. may be used.

The FSTD scheme is to allocate subcarriers having different frequencies to signals transmitted through multiple antennas so as to obtain diversity gain. The SFBC scheme is to efficiently apply selectivity of a spatial region and a frequency region so as to obtain diversity gain and multiuser scheduling gain. The STBC scheme is to apply selectivity of a spatial domain and a time region. The CDD scheme is to obtain diversity gain using path delay between transmission antennas. The TSTD scheme is to temporally divide signals transmitted through multiple antennas. The spatial multiplexing scheme is to transmit different data through antennas so as to increase a transfer rate. The GCDD scheme is to apply selectivity of a time region and a frequency region. The S-VAP scheme uses a single precoding matrix and includes a Multi Codeword (MCW) S-VAP for mixing multiple codewords among antennas in spatial diversity or spatial multiplexing and a Single Codeword (SCW) S-VAP using a single codeword.

In case of the STBC scheme from among the above-mentioned MIMO transmission schemes, the same data symbol is repeated to support orthogonality in a time domain so that time diversity can be obtained. Similarly, the SFBC scheme enables the same data symbol to be repeated to support orthogonality in a frequency domain so that frequency diversity can be obtained. An exemplary time block code used for STBC and an exemplary frequency block code used for SFBC are shown in Equation 12 and Equation 13, respectively. Equation 12 shows a block code of the case of 2 transmission (Tx) antennas, and Equation 13 shows a block code of the case of 4 transmission (Tx) antennas.

$$\frac{1}{\sqrt{2}} \begin{pmatrix} S_1 & S_2 \\ -S_2^* & S_1^* \end{pmatrix} \quad \text{[Equation 12]}$$

$$\frac{1}{\sqrt{2}} \begin{pmatrix} S_1 & S_2 & 0 & 0 \\ 0 & 0 & S_3 & S_4 \\ -S_2^* & S_1^* & 0 & 0 \\ 0 & 0 & -S_4^* & S_3^* \end{pmatrix} \quad \text{[Equation 13]}$$

In Equations 12 and 13, $S_i$ (i=1, 2, 3, 4) means a modulated data symbol. In addition, each row of the matrixes of Equation 12 and 13 may indicate an antenna port, and each column may indicate time (in case of STBC) or frequency (in case of SFBC).

Figure 11:
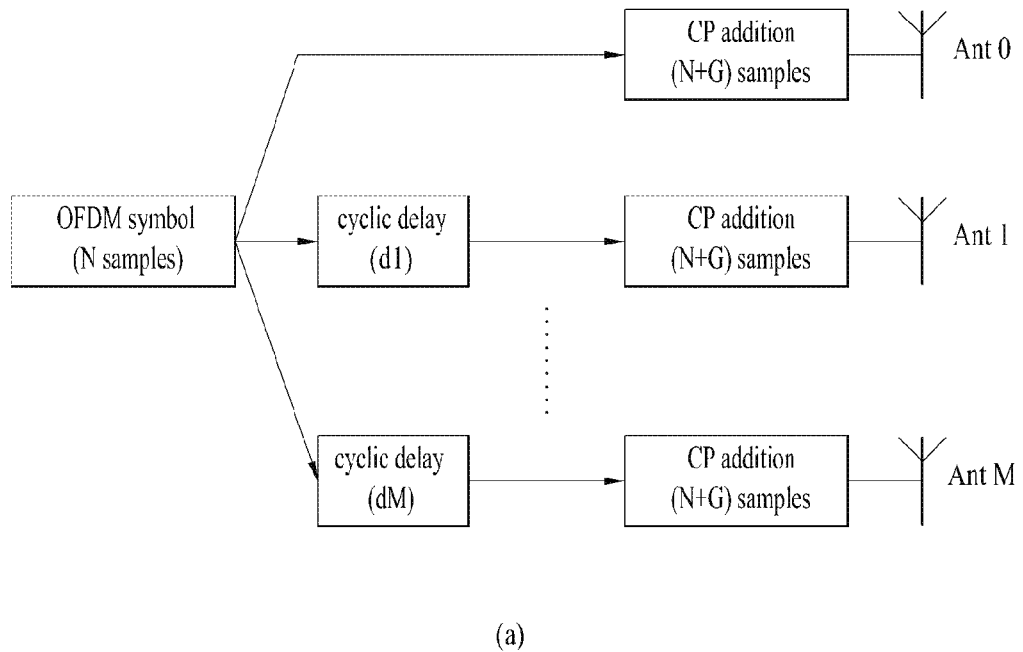
FIG. 11 is a conceptual diagram illustrating a general CDD structure for use in a MIMO system.
Figure 11:
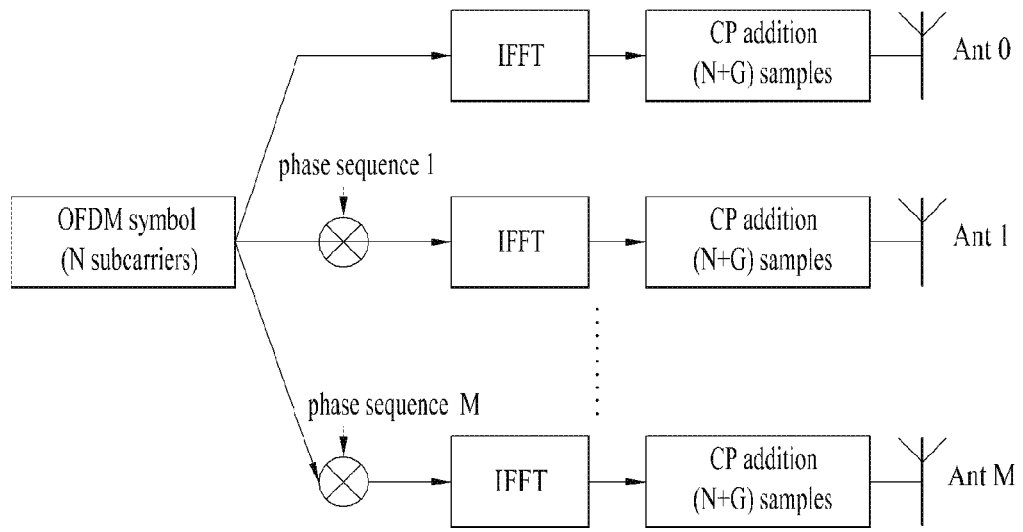

On the other hand, the CDD scheme from among the above-mentioned MIMO transmission schemes mandatorily increases delay spread so as to increase frequency diversity. FIG. 11 is a conceptual diagram illustrating a general CDD structure for use in the MIMO system. FIG. 11(a) shows a method for applying cyclic delay to a time domain. If necessary, the CDD scheme based on the cyclic delay of FIG. 11(a) may also be implemented as phase-shift diversity of FIG. 11(b).

Figure 12:
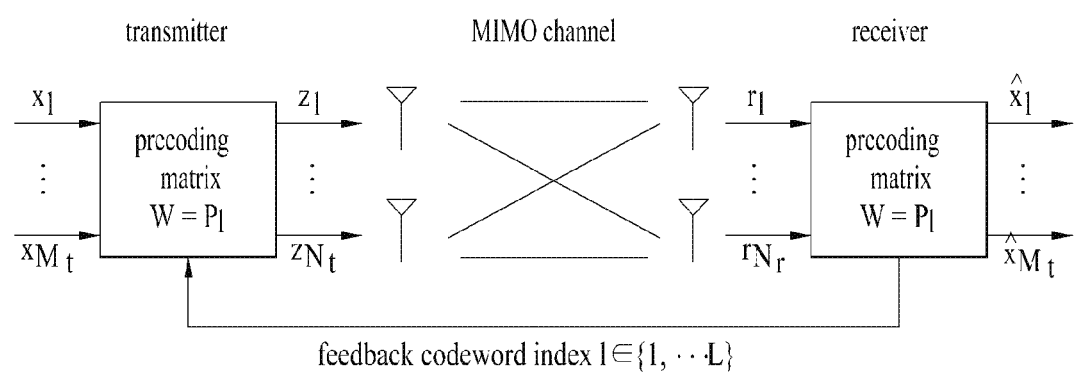
FIG. 12 is a conceptual diagram illustrating codebook-based precoding.

In association with the above-mentioned MIMO transmission techniques, the codebook-based precoding method will hereinafter be described with reference to FIG. 12. FIG. 12 is a conceptual diagram illustrating codebook-based precoding.

In accordance with the codebook-based precoding scheme, a transceiver may share codebook information including a predetermined number of precoding matrixes according to a transmission rank, the number of antennas, etc. That is, if feedback information is infinite, the precoding-based codebook scheme may be used. The receiver measures a channel status through a reception signal, so that an infinite number of preferred precoding matrix information (i.e., an index of the corresponding precoding matrix) may be fed back to the transmitter on the basis of the above-mentioned codebook information. For example, the receiver may select an optimum precoding matrix by measuring an ML (Maximum Likelihood) or MMSE (Minimum Mean Square Error) scheme. Although the receiver shown in FIG. 12 transmits precoding matrix information for each codeword to the transmitter, the scope or spirit of the present invention is not limited thereto.

Upon receiving feedback information from the receiver, the transmitter may select a specific precoding matrix from a codebook on the basis of the received information. The transmitter that has selected the precoding matrix performs a precoding operation by multiplying the selected precoding matrix by as many layer signals as the number of transmission ranks, and may transmit each precoded Tx signal over a plurality of antennas. If the receiver receives the precoded signal from the transmitter as an input, it performs inverse processing of the precoding having been conducted in the transmitter so that it can recover the reception (Rx) signal. Generally, the precoding matrix satisfies a unitary matrix (U) such as ($U*U^H=I$), so that the inverse processing of the above-mentioned precoding may be conducted by multiplying a Hermit matrix ($P^H$) of the precoding matrix H used in the precoding of the transmitter by the reception (Rx) signal.

Physical Uplink Control Channel (PUCCH)

PUCCH including UL control information will hereinafter be described in detail.

A plurality of UE control information pieces may be transmitted through a PUCCH. When Code Division Multiplexing (CDM) is performed in order to discriminate signals of UEs, a Constant Amplitude Zero Autocorrelation (CAZAC) sequence having a length of 12 is mainly used. Since the CAZAC sequence has a property that a constant amplitude is maintained in a time domain and a frequency domain, a Peak-to-Average Power Ratio (PAPR) of a UE or Cubic Metic (CM) may be decreased to increase coverage. In addition, ACK/NACK information for DL data transmitted through the PUCCH may be covered using an orthogonal sequence.

In addition, control information transmitted through the PUCCH may be discriminated using cyclically shifted sequences having different cyclic shift values. A cyclically shifted sequence may be generated by cyclically shifting a basic sequence (also called a base sequence) by a specific cyclic shift (CS) amount. The specific CS amount is indicated by a CS index. The number of available CSs may be changed according to channel delay spread. Various sequences may be used as the basic sequence and examples thereof include the above-described CAZAC sequence.

PUCCH may include a variety of control information, for example, a Scheduling Request (SR), DL channel measurement information, and ACK/NACK information for DL data transmission. The channel measurement information may include a Channel Quality Indicator (CQI), a Precoding Matrix Index (PMI), and a Rank Indicator (RI).

PUCCH format may be defined according to the type of control information contained in a PUCCH, modulation scheme information thereof, etc. That is, PUCCH format 1 may be used for SR transmission, PUCCH format 1a or 1b may be used for HARQ ACK/NACK transmission, PUCCH format 2 may be used for CQI transmission, and PUCCH format 2a/2b may be used for HARQ ACK/NACK transmission.

If HARQ ACK/NACK is transmitted alone in an arbitrary subframe, PUCCH format 1a or 1b may be used. If SR is transmitted alone, PUCCH format 1 may be used. The UE may transmit the HARQ ACK/NACK and the SR through the same subframe, and a detailed description thereof will hereinafter be described in detail.

PUCCH format may be summarized as shown in Table 1.

TABLE 1

| PUCCH format | Modulation scheme | Number of bits per subframe | Usage | etc. |
|---|---|---|---|---|
| 1 | N/A | N/A | SR(Scheduling Request) | |
| 1a | BPSK | 1 | ACK/NACK | One codeword |
| 1b | QPSK | 2 | ACK/NACK | Two codeword |
| 2 | QPSK | 20 | CQI | Joint Coding ACK/NACK (extended CP) |
| 2a | QPSK + BPSK | 21 | CQI + ACK/NACK | Normal CP only |
| 2b | QPSK + BPSK | 22 | CQI + ACK/NACK | Normal CP only |

FIG. 13 shows a PUCCH resource mapping structure for use in a UL physical resource block (PRB). $N_{RB}^{UL}$ is the number of resource blocks (RBs) for use in uplink (UL), and $n_{PRB}$ is a physical resource block (PRB) number. PUCCH may be mapped to both edges of a UL frequency block. CQI resources may be mapped to a PRB located just after the edge of a frequency band, and ACK/NACK may be mapped to this PRB.

PUCCH format 1 may be a control channel used for SR transmission. SR (Scheduling Request) may be transmitted in such a manner that SR is requested or not requested.

PUCCH format 1a/1b is a control channel used for ACK/NACK transmission. In the PUCCH format 1a/1b, a symbol modulated using the BPSK or QPSK modulation scheme is multiplied by a CAZAC sequence of the length 12. Upon completion of the CAZAC sequence multiplication, the resultant symbol is blockwise-spread as an orthogonal sequence. A Hadamard sequence of the length 4 is applied to general ACK/NACK information, and a DFT (Discrete Fourier Transform) sequence of the length 3 is applied to the shortened ACK/NACK information and a reference signal. A Hadamard sequence of the length 2 may be applied to the reference signal for the extended CP.

The UE may also transmit HARQ ACK/NACK and SR through the same subframe. For positive SR transmission, the UE may transmit HARQ ACK/NACK information through resources allocated for the SR. For negative SR transmission, the UE may transmit HARQ ACK/NACK information through resources allocated for ACK/NACK information.

PUCCH format 2/2a/2b will hereinafter be described in detail. PUCCH format 2/2a/2b is a control channel for transmitting channel measurement feedback (CQI, PMI, RI).

The PUCCH format 2/2a/2b may support modulation based on a CAZAC sequence, and a QPSK-modulated symbol may be multiplied by a CAZAC sequence of the length 12. Cyclic shift (CS) of the sequence may be changed between a symbol and a slot. For a reference signal (RS), orthogonal covering may be used.

Figure 14:
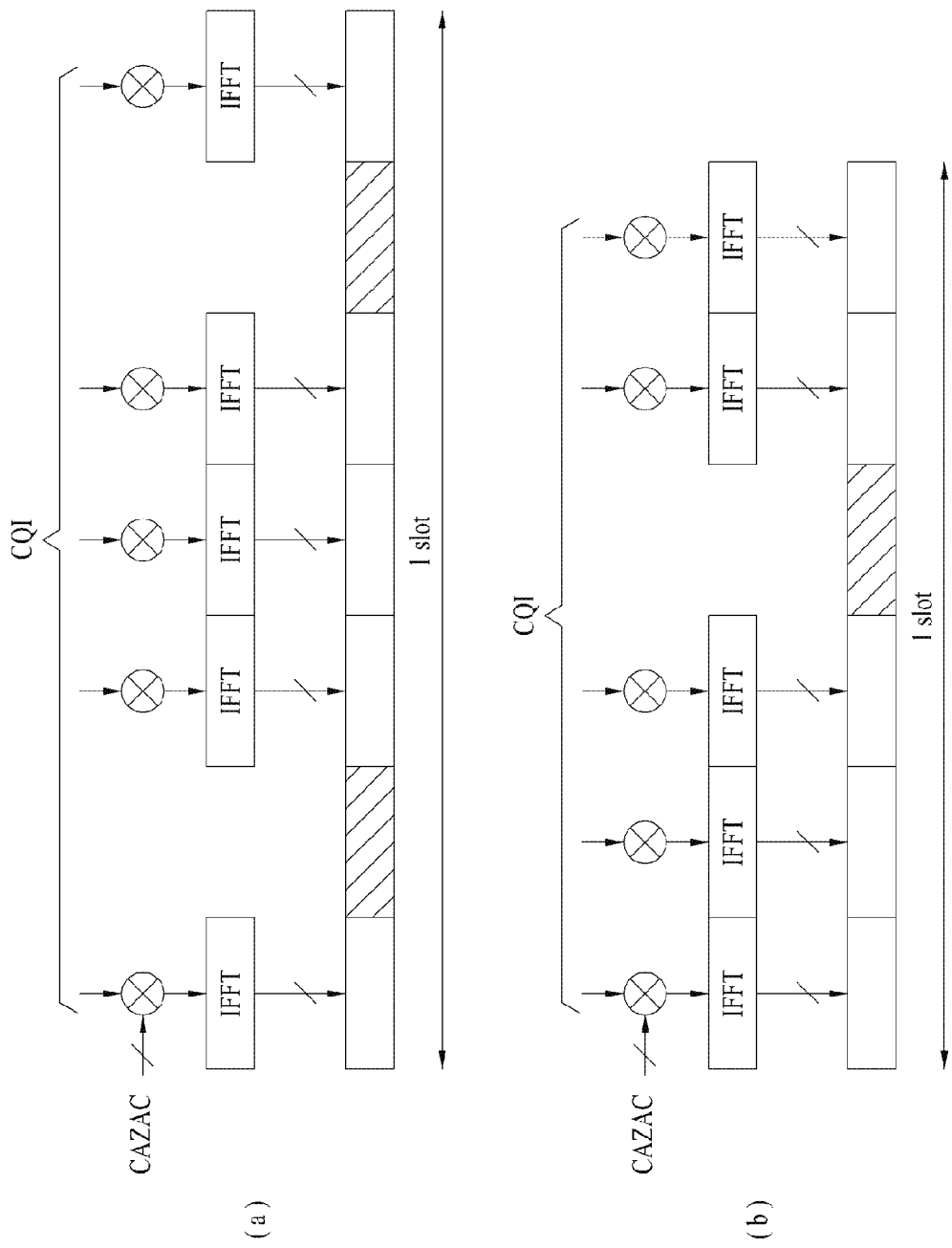
FIG. 14 shows a channel structure of a CQI information bit.

FIG. 14 shows a channel structure of a CQI information bit. The CQI bit may include one or more fields. For example, the CQI bit may include a CQI field indicating a CQI index for MCS decision, a PMI field indicating an index of a precoding matrix of a codebook, and an RI field indicating a rank.

Referring to FIG. 14(a), a reference signal (RS) may be loaded on two SC-FDMA symbols spaced apart from each other by a predetermined distance corresponding to 3 SC-FDMA symbol intervals from among 7 SC-FDMA symbols contained in one slot, and CQI information may be loaded on the remaining 5 SC-FDMA symbols. The reason why two RSs may be used in one slot is to support a high-speed UE. In addition, each UE may be discriminated by a sequence. CQI symbols may be modulated in the entire SC-FDMA symbol, and the modulated CQI symbols are transmitted. The SC-FDMA symbol is composed of one sequence. That is, a UE performs CQI modulation using each sequence, and transmits the modulated result.

The number of symbols that can be transmitted to one TTI is set to 10, and CQI modulation is extended up to QPSK. If QPSK mapping is applied to the SC-FDMA symbol, a CQI value of 2 bits may be loaded on the SC-FDMA symbol, so that a CQI value of 10 bits may be assigned to one slot. Therefore, a maximum of 20-bit CQI value may be assigned to one subframe. A frequency domain spreading code may be used to spread CQI in a frequency domain.

CAZAC sequence (for example, a ZC sequence) may be used as a frequency domain spread code. In addition, another sequence having superior correlation characteristics may be used as the frequency domain spread code. Specifically, CAZAC sequences having different cyclic shift (CS) values may be applied to respective control channels, such that the CAZAC sequences may be distinguished from one another. IFFT may be applied to the frequency domain spread CQI.

FIG. 14(b) shows the example of PUCCH format 2/2a/2b transmission in case of the extended CP. One slot includes 6 SC-FDMA symbols. RS is assigned to one OFDM symbol from among 6 OFDM symbols of each slot, and a CQI bit may be assigned to the remaining 5 OFDM symbols. Except for the six SC-FDMA symbols, the example of the normal CP of FIG. 14(a) may be used without change.

Orthogonal covering applied to the RS of FIGS. 14(a) and 14(b) is shown in Table 2.

TABLE 2

| Normal CP | Extended CP |
|---|---|
| [1 1] | [1] |

Figure 15:
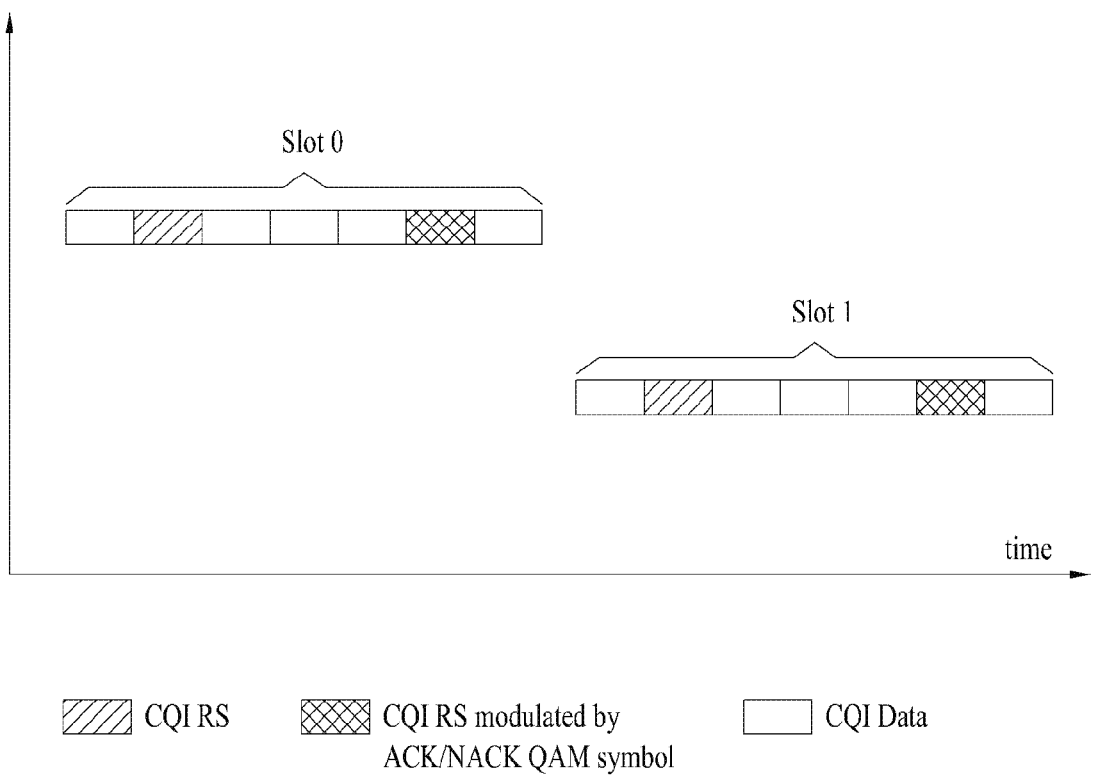
FIG. 15 is a conceptual diagram illustrating transmission of CQI and ACK/NACK information.

Simultaneous transmission of CQI and ACK/NACK information will hereinafter be described with reference to FIG. 15.

In case of the normal CP, CQI and ACK/NACK information can be simultaneously transmitted using PUCCH format 2a/2b. ACK/NACK information may be transmitted through a symbol where CQI RS is transmitted. That is, a second RS for use in the normal CP may be modulated into an ACK/NACK symbol. In the case where the ACK/NACK symbol is modulated using the BPSK scheme as shown in the PUCCH format 1a, CQI RS may be modulated into the ACK/NACK symbol according to the BPSK scheme. In the case where the ACK/NACK symbol is modulated using the QPSK scheme as shown in the PUCCH format 1b, CQI RS may be modulated into the ACK/NACK symbol according to the QPSK scheme. On the other hand, in case of the extended CP, CQI and ACK/NACK information are simultaneously transmitted using the PUCCH format 2. For this purpose, CQI and ACK/NACK information may be joint-coded.

For details of PUCCH other than the above-mentioned description, the 3GPP standard document (e.g., 3GPP TS36.211 5.4) may be referred to, and detailed description thereof will herein be omitted for convenience of description. However, it should be noted that PUCCH contents disclosed in the above-mentioned standard document can also be applied to a PUCCH used in various embodiments of the present invention without departing from the scope or spirit of the present invention.

Channel Status Information (CSI) Feedback

In order to correctly perform MIMO technology, the receiver may feed back a rank indicator (RI), a precoding matrix index (PMI) and a channel quality indicator (CQI) to the transmitter. RI, PMI and CQI may be generically named Channel Status Information (CSI) as necessary. Alternatively, the term "CQI" may be used as the concept of channel information including RI, PMI and CQI.

Figure 16:
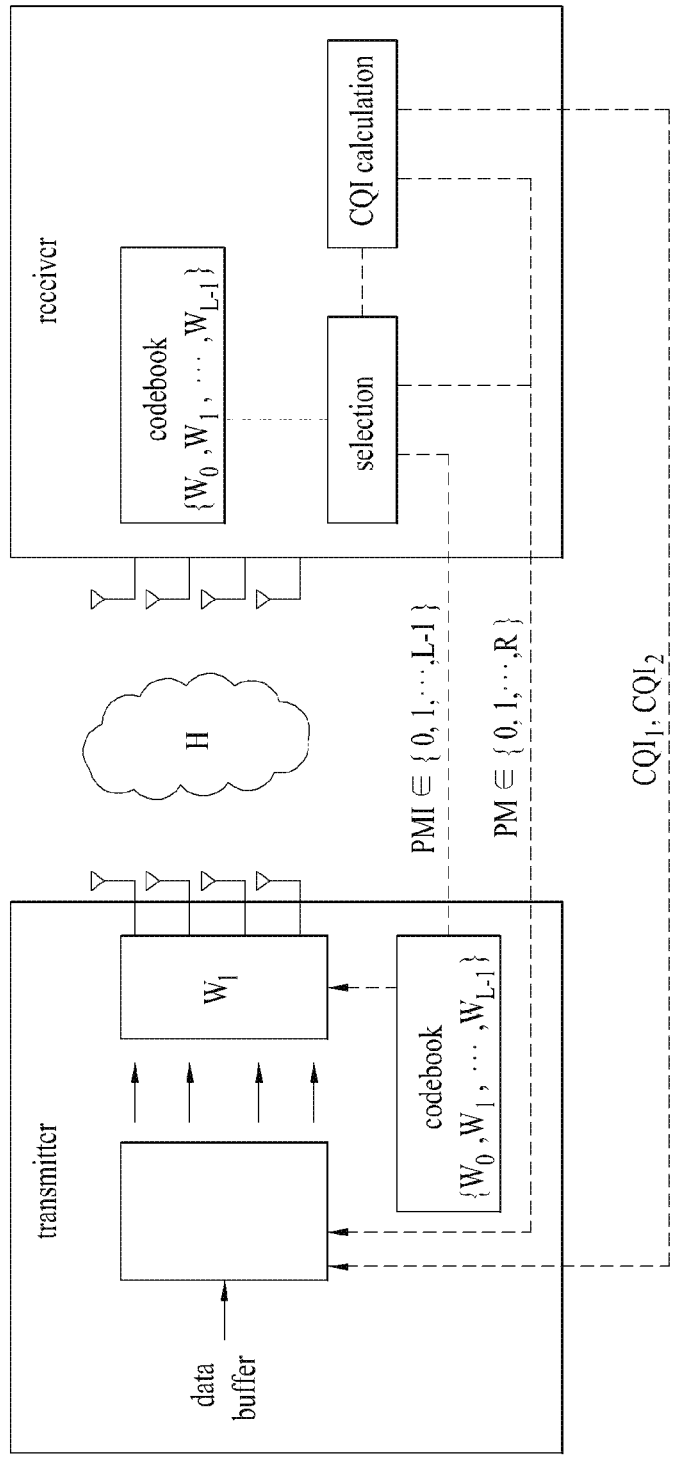
FIG. 16 is a conceptual diagram illustrating feedback of channel status information.

FIG. 16 is a conceptual diagram illustrating a feedback of channel status information.

Referring to FIG. 16, MIMO transmission data from the transmitter may be received at a receiver over a channel (H). The receiver may select a preferred precoding matrix from a codebook on the basis of the received signal, and may feed back the selected PMI to the transmitter. In addition, the receiver may measure a Signal-to-Interference plus Noise Ratio (SINR) of the reception (Rx) signal, calculate channel quality information (CQI), and feed back the calculated CQI to the transmitter. In addition, the receiver may measure a Signal-to-Interference plus Noise Ratio (SINR) of the reception (Rx) signal, calculate a CQI, and feed back the calculated SINR to the transmitter. In addition, the receiver may feed back a rank indicator (RI) of the Rx signal to the transmitter. The transmitter may determine the number of layers suitable for data transmission to the receiver and time/frequency resources, MCS (Modulation and Coding Scheme), etc. using RI and CQI information fed back from the receiver. In addition, the receiver may transmit the precoded Tx signal using the precoding matrix ($W_j$) indicated by a PMI fed back from the receiver over a plurality of antennas.

Channel status information will hereinafter be described in detail.

RI is information regarding a channel rank (i.e., the number of layers for data transmission of a transmitter). RI may be determined by the number of allocated Tx layers, and may be acquired from associated downlink control information (DCI).

PMI is information regarding a precoding matrix used for data transmission of a transmitter. The precoding matrix fed back from the receiver may be determined considering the number of layers indicated by RI. PMI may be fed back in case of a closed-loop spatial multiplexing (SM) and a large delay cyclic delay diversity (CDD). In the case of an open-loop transmission, the transmitter may select a precoding matrix according to the predetermined rules. A process for selecting a PMI for each rank (rank 1 to 4) is as follows. The receiver may calculate an post processing SINR in each PMI, convert the calculated SINR into the sum capacity, and select the best PMI on the basis of the sum capacity. That is, PMI calculation of the receiver may be considered to be a process for searching for an optimum PMI on the basis of the sum capacity. The transmitter that has received PMI feedback from the receiver may use a precoding matrix recommended by the receiver. This fact may be contained as 1-bit indicator in scheduling allocation information for data transmission to the receiver. Alternatively, the transmitter may not use the precoding matrix indicated by a PMI fed back from the transmitter. In this case, precoding matrix information used for data transmission from the transmitter to the receiver may be explicitly contained in the scheduling allocation information. For details of PMI, the 3GPP standard document (e.g., 3GPP TS36.211) may be referred to.

CQI is information regarding a channel quality. CQI may be represented by a predetermined MCS combination. CQI index may be given as shown in the following table 3.

TABLE 3

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Referring to Table 3, CQI index may be represented by 4 bits (i.e., CQI indexes of 0~15). Each CQI index may indicate a modulation scheme and a code rate.

A CQI calculation method will hereinafter be described. The following assumptions (1) to (5) for allowing a UE to calculate a CQI index are defined in the 3GPP standard document (e.g., 3GPP TS36.213).

(1) First three OFDM symbols in one subframe are occupied by control signaling.

(2) Resource element (RE) used by a primary synchronization signal, a secondary synchronization signal or a physical broadcast channel (PBCH) is not present.

(3) CP length of a non-MBSFN subframe is assumed.

(4) Redundancy version is set to zero (0).

(5) PDSCH transmission method may be dependent upon a currently transmission mode (e.g., a default mode) configured in a UE.

(6) The ratio of PDSCH EPRE (Energy Per Resource Element) to a cell-specific reference signal EPRE may be given with the exception of $\rho_A$. (A detailed description of $\rho_A$ may follow the following assumption. Provided that a UE for an arbitrary modulation scheme may be set to a Transmission Mode 2 having four cell-specific antenna ports or may be set to a Transmission Mode 3 having an RI of 1 and four cell-specific antenna ports, $\rho_A$ may be denoted by $\rho_A = P_A + \Delta_{offset} + 10 \log_{10}(2)[dB]$. In the remaining cases, in association with an arbitrary modulation method and the number of arbitrary layers, $\rho_A$ may be denoted by $\rho_A = P_A + \Delta_{offset}[dB]$. $\Delta_{offset}$ is given by a nomPDSCH-RS-EPRE-Offset parameter configured by higher layer signaling.)

Definition of the above-mentioned assumptions (1) to (5) may indicate that a CQI includes not only a CQI but also various information of a corresponding UE. That is, different CQI indexes may be fed back according to a throughput or performance of the corresponding UE at the same channel quality, so that it is necessary to define a predetermined reference for the above-mentioned assumption.

The UE may receive a downlink reference signal (DL RS) from an eNB, and recognize a channel status on the basis of the received DL RS. In this case, the RS may be a common reference signal (CRS) defined in the legacy 3GPP LTE system, and may be a Channel Status Information Reference Signal (CSI-RS) defined in a system (e.g., 3GPP LTE-A system) having an extended antenna structure. The UE may satisfy the assumption given for CQI calculation at a channel recognized through a reference signal (RS), and at the same time calculate a CQI index in which a Block Error Rate (BLER) is not higher than 10%. The UE may transmit the calculated CQI index to the eNB. The UE may not apply a method for improving interference estimation to a CQI index calculation process.

The process for allowing the UE to recognize a channel status and calculate an appropriate MCS may be defined in various ways in terms of UE implementation. For example, the UE may calculate a channel status or an effective SINR using a reference signal (RS). In addition, the channel status or the effective SINR may be measured on the entire system bandwidth (also called 'Set S') or may also be measured on some bandwidths (specific subband or specific RB). The CQI for the set S may be referred to as a Wideband WB CQI, and the CQI for some bandwidths may be referred to as a subband (SB) CQI. The UE may calculate the highest MCS on the basis of the calculated channel status or effective SINR. The highest MCS may indicate an MCS that satisfies the CQI calculation assumption without exceeding a transport block error rate of 10% during the decoding. The UE may determine a CQI index related to the calculated MCS, and may report the determined CQI index to the eNB.

Further, CQI-only transmission may be considered in which a UE transmits only a CQI. Aperiodic CQI transmission may be event-triggered upon receiving a request from the eNB. Such request from the eNB may be a CQI request defined by one bit on DCI format 0. In addition, for CQI-only transmission, MCS index ($I_{MCS}$) of 29 may be signaled as shown in the following table 4. In this case, the CQI request bit of the DCI format 0 is set to 1, transmission of 4 RBs or less may be configured, Redundancy Version 1 (RV1) is indicated in PUSCH data retransmission, and a modulation order ($Q_m$) may be set to 2. In other words, in the case of CQI-only transmission, only a QPSK (Quadrature Phase Shift Keying) scheme may be used as a modulation scheme.

TABLE 4

| MCS Index $I_{MCS}$ | Modulation Order $Q_m'$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

The CQI reporting operation will hereinafter be described in detail.

In the 3GPP LTE system, when a DL reception entity (e.g., UE) is coupled to a DL transmission entity (e.g., eNB), a Reference Signal Received Power (RSRP) and a Reference Signal Received Quality (RSRQ) that are transmitted via downlink are measured at an arbitrary time, and the measured result may be periodically or event-triggeredly reported to the eNB.

In a cellular OFDM wireless packet communication system, each UE may report DL channel information based on a DL channel condition via uplink, and the eNB may determine time/frequency resources and MCS (Modulation and Coding Scheme) so as to transmit data to each UE using DL channel information received from each UE.

In case of the legacy 3GPP LTE system (e.g., 3GPP LTE Release-8 system), such channel information may be composed of Channel Quality Indication (CQI), Precoding Matrix Indicator (PMI), and Rank Indication (RI). All or some of CQI, PMI and RI may be transmitted according to a transmission mode of each UE. CQI may be determined by the received signal quality of the UE. Generally, CQI may be determined on the basis of DL RS measurement. In this case, a CQI value actually applied to the eNB may correspond to an MCS in which the UE maintains a Block Error Rate (BLER) of 10% or less at the measured Rx signal quality and at the same time has a maximum throughput or performance. In addition, such channel information reporting scheme may be divided into periodic reporting and aperiodic reporting upon receiving a request from the eNB.

Information regarding the aperiodic reporting may be assigned to each UE by a CQI request field of 1 bit contained in uplink scheduling information sent from the eNB to the UE. Upon receiving the aperiodic reporting information, each UE may transmit channel information considering the UE's transmission mode to the eNB over a physical uplink shared channel (PUSCH). If necessary, RI and CQI/PMI may not be transmitted over the same PUSCH.

In case of the aperiodic reporting, a cycle in which channel information is transmitted via an upper layer signal, an offset of the corresponding period, etc. may be signaled to each UE in units of a subframe, and channel information considering a transmission (Tx) mode of each UE may be transmitted to the eNB over a physical uplink control channel (PUCCH) at intervals of a predetermined time. In the case where UL transmission data is present in a subframe to which channel information is transmitted at intervals of a predetermined time, the corresponding channel information may be transmitted together with data over not a PUCCH but a PUSCH together. In case of the periodic reporting over a PUCCH, a limited number of bits may be used as compared to PUSCH. RI and CQI/PMI may be transmitted over the same PUSCH. If the periodic reporting collides with the aperiodic reporting, only the aperiodic reporting may be performed within the same subframe.

In order to calculate a WB CQI/PMI, the latest transmission RI may be used. In a PUCCH reporting mode, RI may be independent of another RI for use in a PUSCH reporting mode. RI may be effective only at CQI/PMI for use in the corresponding PUSCH reporting mode.

The CQI/PMI/RI feedback type for the PUCCH reporting mode may be classified into four feedback types (Type 1 to Type 4). Type 1 is a CQI feedback for a user-selected subband. Type 2 is a WB CQI feedback and a WB PMI feedback. Type 3 is an RI feedback. Type 4 is a WB CQI feedback.

Referring to Table 5, in the case of periodic reporting of channel information, a reporting mode is classified into four reporting modes (Modes 1-0, 1-1, 2-0 and 2-1) according to CQI and PMI feedback types.

TABLE 5

|  |  | PMI Feedback Type | |
| --- | --- | --- | --- |
|  |  | No PMI (OL, TD, single-antenna) | Single PMI (CL) |
| CQI Feedback Type | Wideband | Mode 1-0<br>RI (only for Open-Loop SM)<br>One Wideband CQI (4 bit)<br>when RI > 1, CQI of first codeword | Mode 1-1<br>RI<br>Wideband CQI (4 bit)<br>Wideband spatial CQI (3 bit) for RI > 1<br>Wideband PMI (4 bit) |
|  | UE Selected | Mode 2-0<br>RI (only for Open-Loop SM)<br>Wideband CQI (4 bit)<br>Best-1 CQI (4 bit) in each BP<br>Best-1 indicator(L-bit label)<br>when RI > 1, CQI of first codeword | Mode 2-1<br>RI<br>Wideband CQI (4 bit)<br>Wideband spatial CQI (3 bit) for RI > 1<br>Wideband PMI (4 bit)<br>Best-1 CQI (4 bit) 1 in each BP<br>Best-1 spatial CQI (3 bit) for RI > 1<br>Best-1 indicator (L-bit label) |

The reporting mode is classified into a wideband (WB) CQI and a subband (SB) CQI according to a CQI feedback type. The reporting mode is classified into a No-PMI and a Single PMI according to transmission or non-transmission of PMI. As can be seen from Table 5, 'NO PMI' may correspond to an exemplary case in which an Open Loop (OL), a Transmit Diversity (TD), and a single antenna are used, and 'Single PMI" may correspond to an exemplary case in which a closed loop (CL) is used.

Mode 1-0 may indicate an exemplary case in which PMI is not transmitted but WB CQI is transmitted only. In case of Mode 1-0, RI may be transmitted only in the case of Spatial Multiplexing (SM), and one WB CQI denoted by 4 bits may be transmitted. If RI is higher than '1', a CQI for a first codeword may be transmitted. In case of Mode 1-0, Feedback Type 3 and Feedback Type 4 may be multiplexed at different time points within the predetermined reporting period, and then transmitted. The above-mentioned Mode 1-0 transmission scheme may be referred to as Time Division Multiplexing (TDM)-based channel information transmission.

Mode 1-1 may indicate an exemplary case in which a single PMI and a WB CQI are transmitted. In this case, 4-bit WB CQI and 4-bit WB PMI may be transmitted simultaneously with RI transmission. In addition, if RI is higher than '1', 3-bit WB Spatial Differential CQI may be transmitted. In case of transmission of two codewords, the WB spatial differential CQI may indicate a differential value between a WB CQI index for Codeword 1 and a WB CQI index for Codeword 2. These differential values may be assigned to the set {−4, −3, −2, −1, 0, 1, 2, 3}, and each differential value may be assigned to any one of values contained in the set and be represented by 3 bits. In case of Mode 1-1, Feedback Type 2 and Feedback Type 3 may be multiplexed at different time points within the predetermined reporting period, and then transmitted.

Mode 2-0 may indicate that no PMI is transmitted and a CQI of a UE-selected band is transmitted. In this case, RI may be transmitted only in case of an open loop spatial multiplexing (OL SM) only, a WB CQI denoted by 4 bits may be transmitted. In each Bandwidth Part (BP), Best-1 CQI may be transmitted, and Best-1 CQI may be denoted by 4 bits. In addition, an indicator of L bits indicating Best-1 may be further transmitted. If RI is higher than '1', CQI for a first codeword may be transmitted. In case of Mode 2-0, the above-mentioned feedback type 1, feedback type 3, and feedback type 4 may be multiplexed at different time points within a predetermined reporting period, and then transmitted.

Mode 2-1 may indicate an exemplary case in which a single PMI and a CQI of a UE-selected band are transmitted. In this case, WB CQI of 4 bits, WB spatial differential CQI of 3 bits, and WB PMI of 4 bits are transmitted simultaneously with RI transmission. In addition, a Best-1 CQI of 4 bits and a Best-1 indicator of L bits may be simultaneously transmitted at each bandwidth part (BP). If RI is higher than '1', a Best-1 spatial differential CQI of 3 bits may be transmitted. During transmission of two codewords, a differential value between a Best-1 CQI index of Codeword 1 and a Best-1 CQI index of Codeword 2 may be indicated. In Mode 2-1, the above-mentioned feedback type 1, feedback 2, and feedback type 3 may be multiplexed at different time points within a predetermined reporting period, and then transmitted.

In the UE selected SB CQI reporting mode, the size of BP (Bandwidth Part) subband may be defined by the following table 6.

TABLE 6

| System Bandwidth $N_{RB}^{DL}$ | Subband Size k (RBs) | Bandwidth Parts (J) |
|---|---|---|
| 6-7 | NA | NA |
| 8-10 | 4 | 1 |
| 11-26 | 4 | 2 |
| 27-63 | 6 | 3 |
| 64-110 | 8 | 4 |

Table 6 shows a bandwidth part (BP) configuration and the subband size of each BP according to the size of a system bandwidth. UE may select a preferred subband within each BP, and calculate a CQI for the corresponding subband. In Table 6, if the system bandwidth is set to 6 or 7, this means no application of both the subband size and the number of bandwidth parts (BPs). That is, the system bandwidth of 6 or 7 means application of only WB CQI, no subband state, and a BP of 1.

Figure 17:
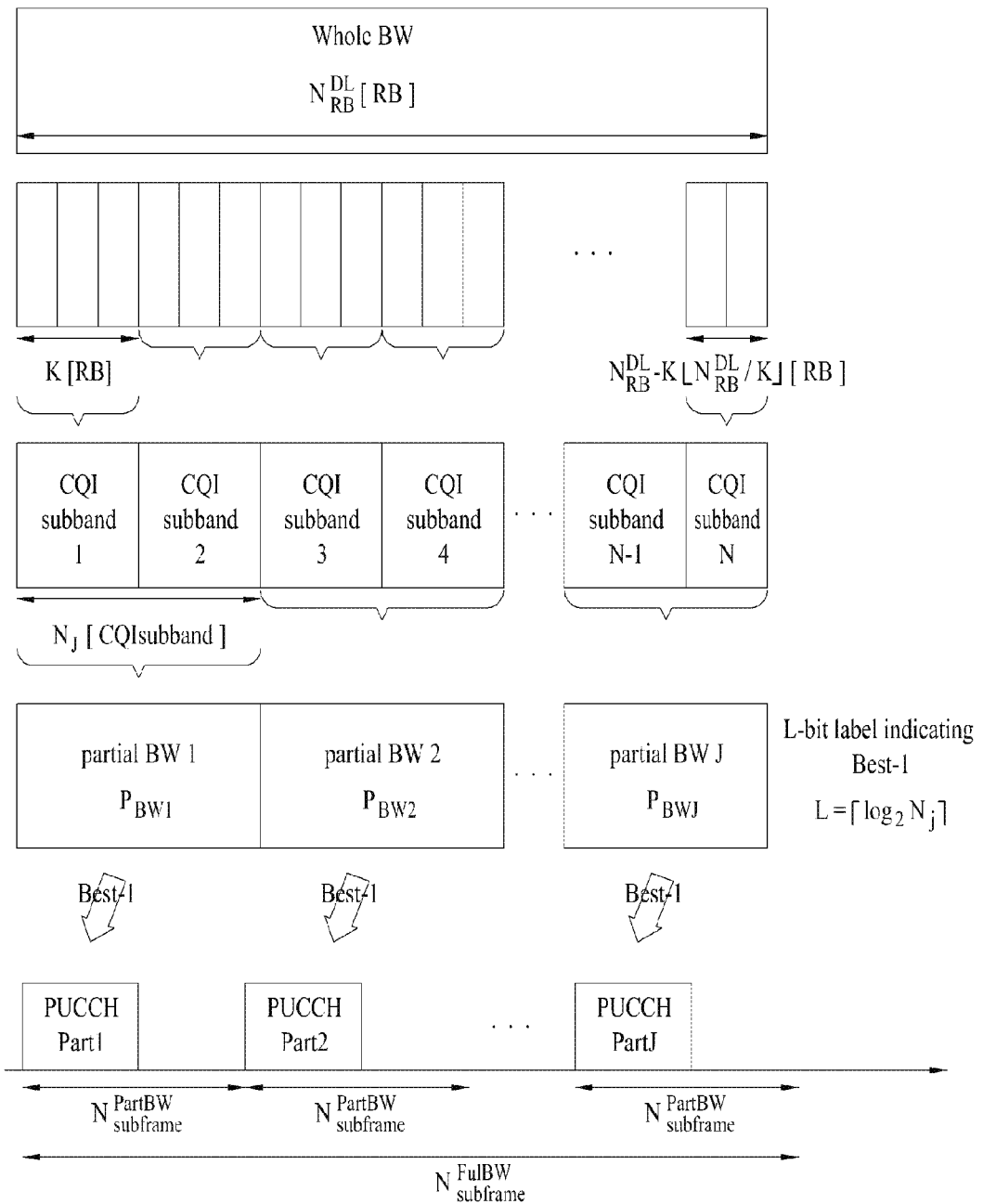
FIG. 17 shows an example of a CQI report mode.

FIG. 17 shows an example of a UE selected CQI reporting mode.

$N_{RB}^{DL}$ is the number of RBs of the entire bandwidth. The entire bandwidth may be divided into N CQI subbands (1, 2, 3, ..., N). One CQI subband may include k RBs defined in Table 6. If the number of RBs of the entire bandwidth is not denoted by an integer multiple of k, the number of RBs contained in the last CQI subband (i.e., the N-th CQI subband) may be determined by the following equation 14.

$$B_{RB}^{DL} - k \cdot \lfloor N_{RB}^{DL}/k \rfloor$$ [Equation 14]

In Equation 14, $\lfloor \ \rfloor$ represents a floor operation, and $\lfloor x \rfloor$ or floor(x) represents a maximum integer not higher than 'x'.

In addition, $N_J$ CQI subbands construct one BP, and the entire bandwidth may be divided into J BPs. UE may calculate a CQI index for one preferred Best-1 CQI subband in contained in one BP, and transmit the calculated CQI index over a PUCCH. In this case, a Best-1 indicator indicating which a Best-1 CQI subband is selected in one BP may also be transmitted. The Best-1 indicator may be composed of L bits, and L may be represented by the following equation 15.

$$L = \lceil \log_2 N_J \rceil$$

In Equation 15, $\lceil \ \rceil$ may represent a ceiling operation, and $\lceil x \rceil$ or ceiling(x) may represent a minimum integer not higher than 'x'.

In the above-mentioned UE selected CQI reporting mode, a frequency band for CQI index calculation may be determined. Hereinafter, a CQI transmission cycle will hereinafter be described in detail.

Each UE may receive information composed of a combination of a transmission cycle of channel information and an offset from an upper layer through RRC signaling. The UE may transmit channel information to an eNB on the basis of the received channel information transmission cycle information.

Figure 18:
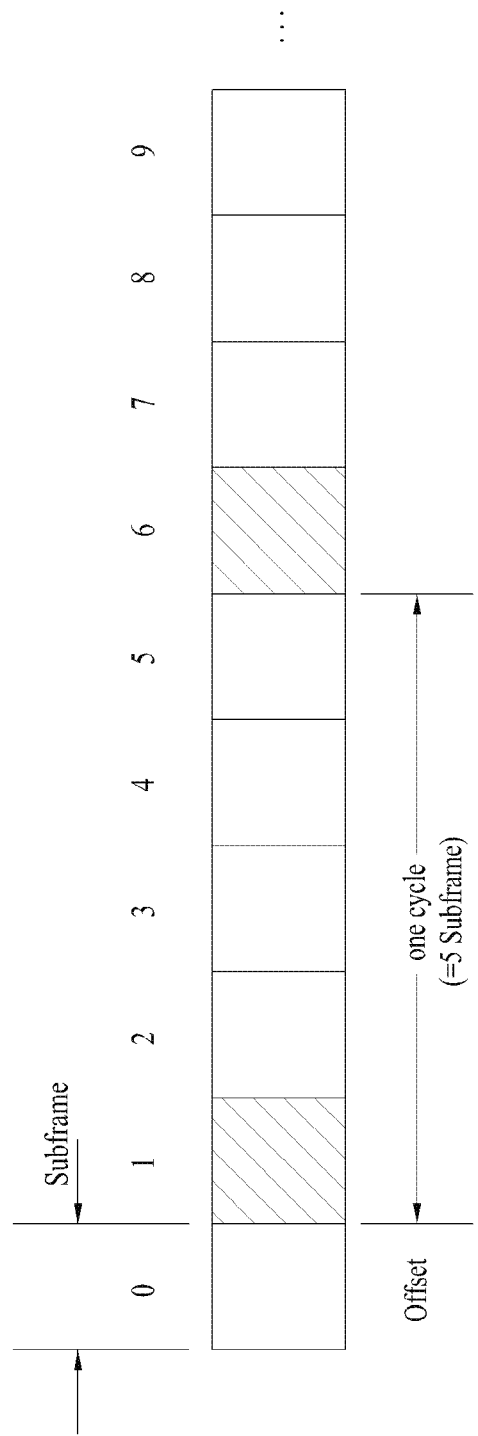
FIG. 18 is a conceptual diagram illustrating a method for enabling a user equipment (UE) to periodically transmit channel information.

FIG. 18 is a conceptual diagram illustrating a method for enabling a UE to periodically transmit channel information. For example, if a UE receives combination information in which a channel information transmission cycle is set to 5 and an offset is set to 1, the UE transmits channel information in units of 5 subframes, one subframe offset is assigned in the increasing direction of a subframe index on the basis of the $0^{th}$ subframe, and channel information may be assigned over a PUCCH. In this case, the subframe index may be comprised of a combination of a system frame number ($n_f$) and 20 slot indexes ($n_s$, 0~19) present in the system frame. One subframe may be comprised of 2 slots, such that the subframe index may be represented by $10 \times n_f + \text{floor}(n_s/2)$.

One type for transmitting only WB CQI and the other type for transmitting both WB CQI and SB CQI may be classified according to CQI feedback types. In case of the first type for transmitting only the WB CQI, WB CQI information for the entire band is transmitted at a subframe corresponding to each CQI transmission cycle. The WB periodic CQI feedback transmission cycle may be set to any of 2, 5, 10, 16, 20, 32, 40, 64, 80, or 160 ms or no transmission of the WB periodic CQI feedback transmission cycle may be established. In this case, if it is necessary to transmit PMI according to the PMI feedback type of Table 5, PMI information is transmitted together with CQI. In case of the second type for transmitting both WB CQI and SB CQI, WB CQI and SB CQI may be alternately transmitted.

Figure 19:
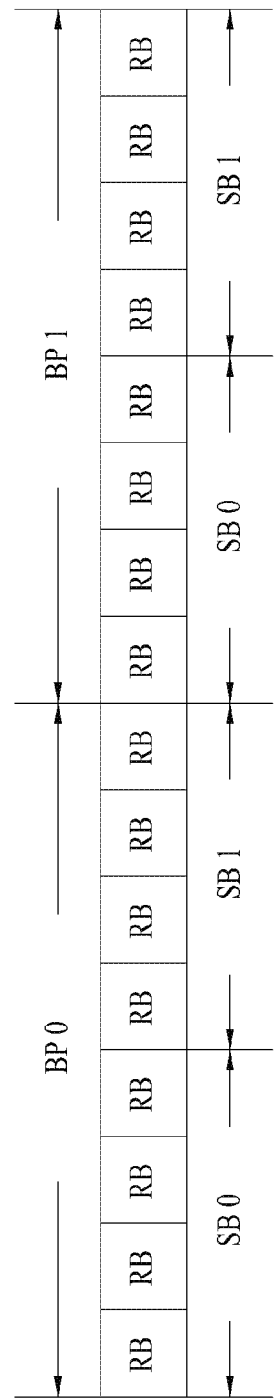
FIG. 19 is a conceptual diagram illustrating SB CQI transmission.

FIG. 19 is a conceptual diagram illustrating a method for transmitting both WB CQI and SB CQI according to an embodiment of the present invention. FIG. 19 shows an exemplary system comprised of 16 RBs. If a system frequency band is comprised of 16 RBs, for example, it is assumed that two bandwidth parts (BPs) (BP0 and BP1) may be configured, each BP may be composed of 2 subbands (SBs) (SB0 and SB1), and each SB may be composed of 4 RBs. In this case, as previously stated in Table 6, the number of BPs and the size of each SB are determined according to the number of RBs contained in the entire system band, and the number of SBs contained in each BP may be determined according to the number of RBs, the number of BPs and the size of SB.

In case of the type for transmitting both WB CQI and SB CQI, the WB CQI is transmitted to the CQI transmission subframe. In the next transmission subframe, a CQI of one SB (i.e., Best-1) having a good channel state from among SB0 and SB1 at BP0 and an index (i.e., Best-1 indicator) of the corresponding SB are transmitted. In the further next transmission subframe, a CQI of one SB (i.e., Best-1) having a good channel state from among SB0 and SB1 at BP1 and an index (i.e., Best-1 indicator) of the corresponding SB are transmitted. After transmitting the WB CQI, CQIs of individual BPs are sequentially transmitted. In this case, CQI of a BP located between a first WB CQI transmitted once and a second WB CQI to be transmitted after the first WB CQI may be sequentially transmitted one to four times. For example, if the CQI of each BP is transmitted once during a time interval between two WB CQIs, CQIs may be transmitted in the order of WB CQI→BP0 CQI→BP1 CQI→WB CQI. In another example, if the CQI of each BP is transmitted four times during a time interval between two WB CQIs, CQIs may be transmitted in the order of WB→CQI BP0 CQI→BP1 CQI→BP0 CQI→BP1 CQI→BP0 CQI→BP1 CQI→BP0 CQI→BP1 CQI→WB CQI. Information about the number of sequential transmission times of BP CQI during a time interval between two WB CQIs is signaled through a higher layer. Irrespective of WB CQI or SB CQI, the above-mentioned information about the number of sequential transmission times of BP CQI may be transmitted through a PUCCH in a subframe corresponding to information of a combination of channel information transmission cycle signaled from the higher layer of FIG. 18 and an offset.

In this case, if PMI also needs to be transmitted according to the PMI feedback type, PMI information and CQI must be simultaneously transmitted. If PUSCH for UL data transmission is present in the corresponding subframe, CQI and PMI can be transmitted along with data through PUSCH instead of PUCCH.

Figure 20:
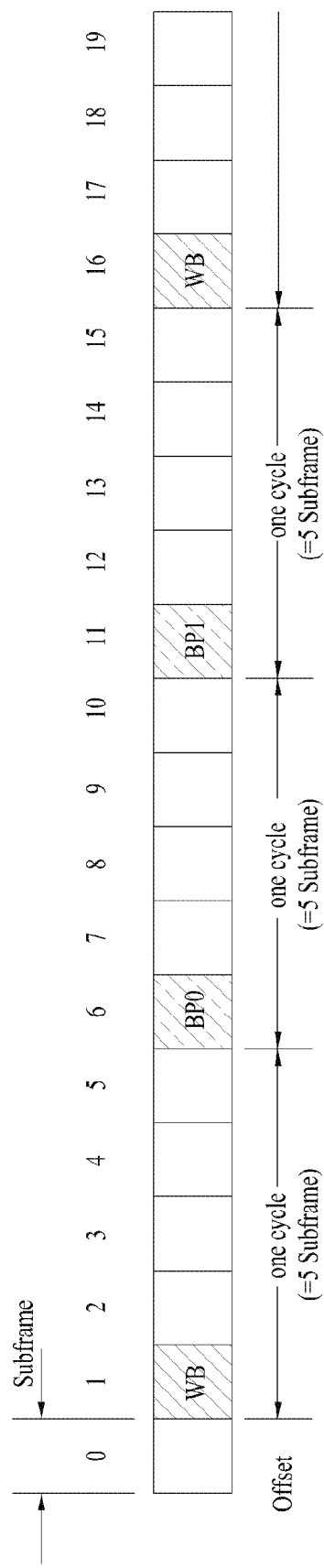
FIG. 20 is a conceptual diagram illustrating transmission of WB CQI and SB CQI.

FIG. 20 is a conceptual diagram illustrating an exemplary CQI transmission scheme when both WB CQI and SB CQI are transmitted. In more detail, provided that combination information in which a channel information transmission cycle is set to 5 and an offset is set to 1 is signaled as shown in FIG. 18, and BP information between two WB CQI/PMI parts is sequentially transmitted once, FIG. 20 shows the example of channel information transmission operation of a UE.

On the other hand, in case of RI transmission, RI may be signaled by information of a combination of one signal indicating how many WB CQI/PMI transmission cycles are used for RI transmission and an offset of the corresponding transmission cycle. In this case, the offset may be defined as a relative offset for a CQI/PMI transmission offset. For example, provided that an offset of the CQI/PMI transmission cycle is set to 1 and an offset of the RI transmission cycle is set to zero, the offset of the RI transmission cycle may be identical to that of the CQI/PMI transmission cycle. The offset of the RI transmission cycle may be defined as a negative value or zero.

Figure 21:
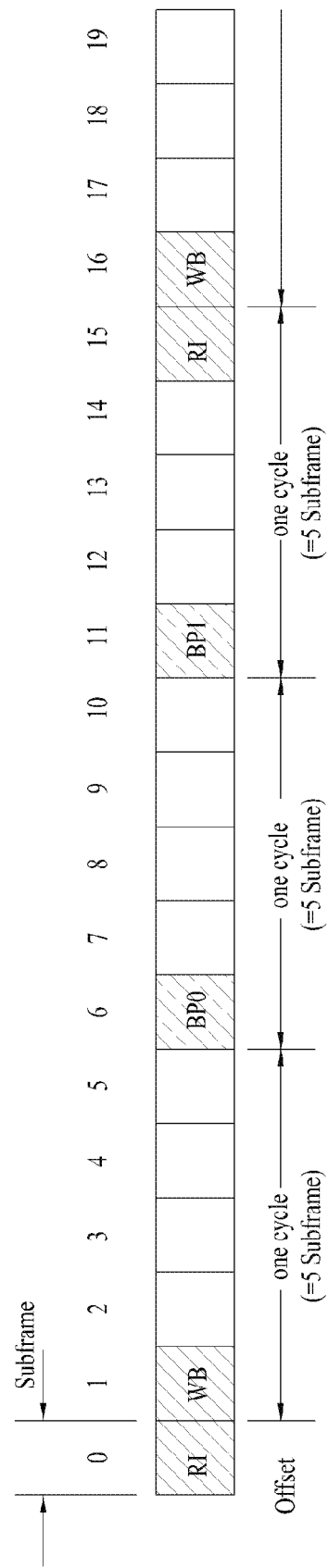
FIG. 21 is a conceptual diagram illustrating transmission of WB CQI, SB CQI and RI.

FIG. 21 is a conceptual diagram illustrating transmission of WB CQI, SB CQI and RI. In more detail, FIG. 21 shows that, under CQI/PMI transmission of FIG. 20, an RI transmission cycle is one time the WB CQI/PMI transmission cycle and the offset of RI transmission cycle is set to '−1'. Since the RI transmission cycle is one time the WB CQI/PMI transmission cycle, the RI transmission cycle has the same time cycle. A relative difference between the RI offset value '−1' and the CQI offset '1' of FIG. 20 is set to '−1', such that RI can be transmitted on the basis of the subframe index '0'.

In addition, provided that RI transmission overlaps with WB CQI/PMI transmission or SB CQI/PMI transmission, WB CQI/PMI or SB CQI/PMI may drop. For example, provided that the RI offset is set to '0' instead of '−1', the WB CQI/PMI transmission subframe overlaps with the RI transmission subframe. In this case, WB CQI/PMI may drop and RI may be transmitted.

By the above-mentioned combination, CQI, PMI, and RI may be transmitted, and such information may be transmitted from each UE by RRC signaling of a higher layer. The BS (or eNB) may transmit appropriate information to each UE in consideration of a channel situation of each UE and a distribution situation of UEs contained in the BS (or eNB).

Meanwhile, payload sizes of SB CQI, WB CQI/PMI, RI and WB CQI in association with the PUCCH report type may be represented by the following table 7.

TABLE 7

| PUCCH Report Type | Reported | Mode State | PUCCH Reporting Modes | | | |
|---|---|---|---|---|---|---|
| | | | Mode 1-1 (bits/BP) | Mode 2-1 (bits/BP) | Mode 1-0 (bits/BP) | Mode 2-0 (bits/BP) |
| 1 | Sub-band CQI | RI = 1 | NA | 4 + L | NA | 4 + L |
| | | RI > 1 | NA | 7 + L | NA | 4 + L |
| 2 | Wideband CQI/PMI | 2 TX Antennas RI = 1 | 6 | 6 | NA | NA |
| | | 4 TX Antennas RI = 1 | 8 | 8 | NA | NA |
| | | 2 TX Antennas RI > 1 | 8 | 8 | NA | NA |
| | | 4 TX Antennas RI > 1 | 11 | 11 | NA | NA |
| 3 | RI | 2-layer spatial multiplexing | 1 | 1 | 1 | 1 |
| | | 4-layer spatial multiplexing | 2 | 2 | 2 | 2 |
| 4 | Wideband CQI | RI = 1 or RI > 1 | NA | NA | 4 | 4 |

Aperiodic transmission of CQI, PMI and RI over a PUSCH will hereinafter be described.

In case of the aperiodic reporting, RI and CQI/PMI may be transmitted over the same PUSCH. In case of the aperiodic reporting mode, RI reporting may be effective only for CQI/PMI reporting in the corresponding aperiodic reporting mode. CQI-PMI combinations capable of being supported to all the rank values are shown in the following table 8.

TABLE 8

| | | PMI Feedback Type | |
|---|---|---|---|
| | | No PMI (OL, TD, single-antenna) | with PMI (CL) |
| PUSCH CQI Feedback Type | Wideband (Wideband CQI) | | Mode 1-2: Multiple PMI<br>RI<br>$1^{st}$ Wideband CQI (4 bit)<br>$2^{nd}$ Wideband CQI (4 bit) if RI > 1<br>subband PMIs on each subband |
| | UE Selected (Subband CQI) | Mode 2-0<br>RI (only for Open-Loop SM)<br>Wideband CQI (4 bit) +<br>Best-M CQI (2 bit)<br>Best-M index<br>when RI > 1, CQI of first codeword | Mode 2-2: Multiple PMI<br>RI<br>$1^{st}$ Wideband CQI (4 bit) +<br>Best-M CQI(2 bit)<br>$2^{nd}$ Wideband CQI (4 bit) +<br>Best-M CQI(2 bit) if RI > 1<br>Wideband PMI + Best-M PMI<br>Best-M index |
| | Higher layer-configured (subband CQI) | Mode 3-0<br>RI (only for Open-Loop SM)<br>Wideband CQI (4 bit) +<br>subband CQI (2 bit)<br>when RI > 1, CQI of first codeword | Mode 3-1: Single PMI<br>RI<br>$1^{st}$ Wideband CQI (4 bit) +<br>subband CQI (2 bit)<br>$2^{nd}$ Wideband CQI (4 bit) +<br>subband CQI (2 bit) if RI > 1<br>Wideband PMI |

Mode 1-2 of Table 8 may indicate a WB feedback. In Mode 1-2, a preferred precoding matrix for each subband may be selected from a codebook subset on the assumption of transmission only in the corresponding subband. The UE may report one WB CQI at every codeword, and WB CQI may be calculated on the assumption that data is transmitted on subbands of the entire system bandwidth (Set S) and the corresponding selected precoding matrix is used on each subband. The UE may report the selected PMI for each subband. In this case, the subband size may be given as shown in the following table 9. In Table 9, if the system bandwidth is set to 6 or 7, this means no application of the subband size. That is, the system bandwidth of 6 or 7 means application of only WB CQI and no subband state.

TABLE 9

| System Bandwidth $N_{RB}^{DL}$ | Subband Size (k) |
|---|---|
| 6-7 | NA |
| 8-10 | 4 |
| 11-26 | 4 |
| 27-63 | 6 |
| 64-110 | 8 |

In Table 8, Mode 3-0 and Mode 3-1 show a subband feedback configured by a higher layer (also called an upper layer).

In Mode 3-0, the UE may report a WB CQI value calculated on the assumption of data transmission on the set-S (total system bandwidth) subbands. The UE may also report one subband CQI value for each subband. The subband CQI value may be calculated on the assumption of data transmission only at the corresponding subband. Even in the case of RI>1, WB CQI and SB CQI may indicate a channel quality for Codeword 1.

In Mode 3-1, a single precoding matrix may be selected from a codebook subset on the assumption of data transmission on the set-S subbands. The UE may report one SB CQI value for each codeword on each subband. The SB CQI value may be calculated on the assumption of a single precoding matrix used in all the subbands and data transmission on the corresponding subband. The UE may report a WB CQI value for each codeword. The WB CQI value may be calculated on the assumption of a single precoding matrix used in all the subbands and data transmission on the set-S subbands. The UE may report one selected precoding matrix indicator. The SB CQI value for each codeword may be represented by a differential WB CQI value using a 2-bit subband differential CQI offset. That is, the subband differential CQI offset may be defined as a differential value between a SB CQI index and a WB CQI index. The subband differential CQI offset value may be assigned to any one of four values {−2, 0, +1, +2}. In addition, the subband size may be given as shown in the following table 7.

In Table 8, Mode 2-0 and Mode 2-2 illustrate a UE selected subband feedback. Mode 2-0 and Mode 2-2 illustrate reporting of the best-M averages.

In Mode 2-0, the UE may select the set of M preferred subbands (i.e., best-M) from among the entire system bandwidth (set S). The size of one subband may be given as k, and k and M values for each set-S range may be given as shown in the following table 10. In Table 10, if the system bandwidth is set to 6 or 7, this means no application of both the subband size and the M value. That is, the system bandwidth of 6 or 7 means application of only WB CQI and no subband state.

The UE may report one CQI value reflecting data transmission only at the best-M subbands (i.e., M selected subbands). This CQI value may indicate a CQI for Codeword 1 even in the case of RI>1. In addition, the UE may report a WB CQI value calculated on the assumption of data transmission on the set-S subbands. The WB CQI value may indicate a CQI for Codeword 1 even in the case of RI>1.

TABLE 10

| System Bandwidth $N_{RB}^{DL}$ | Subband Size k (RBs) | M |
|---|---|---|
| 6-7 | NA | NA |
| 8-10 | 2 | 1 |
| 11-26 | 2 | 3 |
| 27-63 | 3 | 5 |
| 64-110 | 4 | 6 |

In Mode 2-2, the UE may select the set of M preferred subbands (i.e., best-M) from among the set-S subbands (where the size of one subband is set to k). Simultaneously, one preferred precoding matrix may be selected from among a codebook subset to be used for data transmission on the M selected subbands. The UE may report one CQI value for each codeword on the assumption that data transmission is achieved on M selected subbands and one same selection precoding matrix is used in each of the M subbands. The UE may report an indicator of one precoding matrix selected for the M subbands. In addition, one precoding matrix (i.e., a precoding matrix different from the precoding matrix for the above-mentioned M selected subbands) may be selected from among the codebook subset on the assumption that data transmission is achieved on the set-S subbands. The UE may report a WB CQI, that is calculated on the assumption that data transmission is achieved on the set-S subbands and one precoding matrix is used in all the subbands, at every codeword. The UE may report an indicator of the selected one precoding matrix in association with all the subbands.

In association with the entirety of UE-selected subband feedback modes (Mode 2-0 and Mode 2-2), the UE may report the positions of M selected subbands using a combination index (r), where r may be represented by the following equation 16.

$$r = \sum_{i=0}^{M-1} \binom{N - s_i}{m - i}$$ [Equation 16]

In Equation 16, the set may $\{s_i\}_{i=0}^{M-1}$, $(1 \leq s_i \leq N, s_i < s_{i+1})$ include M sorted subband indexes. In Equation 14, $$\binom{x}{y}$$

may indicate an extended binomial coefficient, which is set to $$\binom{x}{y}$$

in case of xy and is set to zero of 0 in case of x<y. Therefore, r may have a unique label and may be denoted by $$r \in \left\{ 0, \ldots, \binom{N}{M} - 1 \right\}.$$

In addition, a CQI value for M selected subbands for each codeword may be denoted by a relative differential value in association with a WB CQI. The relative differential value may be denoted by a differential CQI offset level of 2 bits, and may have a value of 'CQI index—WB CQI index' of M selected subbands. An available differential CQI value may be assigned to any one of four values {+1, +2, +3, +4}.

In addition, the size(k) of supported subband and the M value may be given as shown in Table 10. As shown in Table 10, k or M may be given as a function of a system bandwidth.

A label indicating the position of each of M selected subbands (i.e., best-M subbands) may be denoted by L bits, where L is denoted by $$L = \left\lceil \log_2 \binom{N}{M} \right\rceil.$$

Precoder for 8 Tx Antennas

In the system (e.g., 3GPP LTE Release-10 system) for supporting the extended antenna structure, for example, MIMO transmission based on 8 Tx antennas may be carried out, such that it is necessary to design the codebook for supporting the MIMO transmission.

In order to report a CQI of a channel transmitted through 8 antenna ports, the use of codebooks shown in Tables 11 to 18 may be considered. 8 CSI antenna ports may be represented by indexes of antenna ports 15~22. Table 11 shows an example of the codebook for 1-layer CSI report using antenna ports 15 to 22. Table 12 shows an example of the codebook for 2-layer CSI report using antenna ports 15 to 22. Table 13 shows an example of the codebook for 3-layer CSI report using antenna ports 15 to 22. Table 14 shows an example of the codebook for 4-layer CSI report using antenna ports 15 to 22. Table 15 shows an example of the codebook for 5-layer CSI report using antenna ports 15 to 22. Table 16 shows an example of the codebook for 6-layer CSI report using antenna ports 15 to 22. Table 17 shows an example of the codebook for 7-layer CSI report using antenna ports 15 to 22. Table 18 shows an example of the codebook for 8-layer CSI report using antenna ports 15 to 22.

In Tables 11 to 18, $\phi_n$ and $v_m$ can be represented by the following equation 17.

$$\phi_n = e^{j\pi n/2}$$

$$v_m[1 \, e^{j2\pi n/32} \, e^{j4\pi n/32} \, e^{j6\pi n/32}]^T$$

TABLE 11

| | $i_2$ | | | | | |
|---|---|---|---|---|---|---|
| $i_1$ | 0 | 1 | 2 | 3 | 4 | 5 |
| 0-15 | $W^{(1)}_{2i_1,0}$ | $W^{(1)}_{2i_1,1}$ | $W^{(1)}_{2i_1,2}$ | $W^{(1)}_{2i_1,3}$ | $W^{(1)}_{2i_1+1,0}$ | $W^{(1)}_{2i_1+1,1}$ |

TABLE 11-continued

| $i_1$ | $i_2$ | | | | | |
|---|---|---|---|---|---|---|
| | 6 | 7 | 8 | 9 | 10 | 11 |
| 0-15 | $W^{(1)}_{2i_1+1,2}$ | $W^{(1)}_{2i_1+1,3}$ | $W^{(1)}_{2i_1+2,0}$ | $W^{(1)}_{2i_1+2,1}$ | $W^{(1)}_{2i_1+2,2}$ | $W^{(1)}_{2i_1+2,3}$ |

| $i_1$ | $i_2$ | | | |
|---|---|---|---|---|
| | 12 | 13 | 14 | 15 |
| 0-15 | $W^{(1)}_{2i_1+3,0}$ | $W^{(1)}_{2i_1+3,1}$ | $W^{(1)}_{2i_1+3,2}$ | $W^{(1)}_{2i_1+3,3}$ | where $W^{(1)}_{m,n} = \frac{1}{\sqrt{8}} \begin{bmatrix} v_m \\ \varphi_n v_m \end{bmatrix}$

TABLE 12

| $i_1$ | $i_2$ | | | |
|---|---|---|---|---|
| | 0 | 1 | 2 | 3 |
| 0-15 | $W^{(2)}_{2i_1,2i_1,0}$ | $W^{(2)}_{2i_1,2i_1,1}$ | $W^{(2)}_{2i_1+1,2i_1+1,0}$ | $W^{(2)}_{2i_1+1,2i_1+1,1}$ |

| $i_1$ | $i_2$ | | | |
|---|---|---|---|---|
| | 4 | 5 | 6 | 7 |
| 0-15 | $W^{(2)}_{2i_1+2,2i_1+2,0}$ | $W^{(2)}_{2i_1+2,2i_1+2,1}$ | $W^{(2)}_{2i_1+3,2i_1+3,0}$ | $W^{(2)}_{2i_1+3,2i_1+3,1}$ |

| $i_1$ | $i_2$ | | | |
|---|---|---|---|---|
| | 8 | 9 | 10 | 11 |
| 0-15 | $W^{(2)}_{2i_1,2i_1+1,0}$ | $W^{(2)}_{2i_1,2i_1+1,1}$ | $W^{(2)}_{2i_1+1,2i_1+2,0}$ | $W^{(2)}_{2i_1+1,2i_1+2,1}$ |

| $i_1$ | $i_2$ | | | |
|---|---|---|---|---|
| | 12 | 13 | 14 | 15 |
| 0-15 | $W^{(2)}_{2i_1,2i_1+3,0}$ | $W^{(2)}_{2i_1,2i_1+3,1}$ | $W^{(2)}_{2i_1+1,2i_1+3,0}$ | $W^{(2)}_{2i_1+1,2i_1+3,1}$ | where $W^{(2)}_{m,m',n} = \frac{1}{4} \begin{bmatrix} v_m & v_{m'} \\ \varphi_n v_m & -\varphi_n v_{m'} \end{bmatrix}$

TABLE 13

| $i_1$ | $i_2$ | | |
|---|---|---|---|
| | 0 | 1 | 2 |
| 0-3 | $W^{(3)}_{8i_1,8i_1,8i_1+8}$ | $W^{(3)}_{8i_1+8,8i_1,8i_1+8}$ | $\tilde{W}^{(3)}_{8i_1,8i_1,8i_1+8}$ |

| $i_1$ | $i_2$ | | |
|---|---|---|---|
| | 3 | 4 | 5 |
| 0-3 | $\tilde{W}^{(3)}_{8i_1+8,8i_1,8i_1}$ | $W^{(3)}_{8i_1+2,8i_1+2,4i_1+10}$ | $W^{(3)}_{8i_1+10,8i_1+2,8i_1+10}$ |

| $i_1$ | $i_2$ | | |
|---|---|---|---|
| | 6 | 7 | 8 |
| 0-3 | $\tilde{W}^{(3)}_{8i_1+2,8i_1+10,8i_1+10}$ | $\tilde{W}^{(3)}_{8i_1+10,8i_1+2,8i_1+2}$ | $W^{(3)}_{8i_1+4,8i_1+4,8i_1+12}$ |

TABLE 13-continued

| $i_1$ | $i_2$ | | |
|---|---|---|---|
| | 9 | 10 | 11 |
| 0-3 | $W^{(3)}_{8i_1+12,8i_1+4,8i_1+12}$ | $\tilde{W}^{(3)}_{8i_1+4,8i_1+12,8i_1+2}$ | $\tilde{W}^{(3)}_{8i_1+12,8i_1+4,8i_1+4}$ |

| $i_1$ | $i_2$ | | |
|---|---|---|---|
| | 12 | 13 | 14 |
| 0-3 | $W^{(3)}_{8i_1+6,8i_1+6,8i_1+14}$ | $W^{(3)}_{8i_1+14,8i_1+6,8i_1+14}$ | $\tilde{W}^{(3)}_{8i_1+6,8i_1+14,8i_1+14}$ |

| $i_1$ | $i_2$ |
|---|---|
| | 15 |
| 0-3 | $\tilde{W}^{(3)}_{8i_1+14,8i_1+6,8i_1+6}$ | where $W^{(3)}_{m,m',m''} = \frac{1}{\sqrt{24}} \begin{bmatrix} v_m & v_{m'} & v_{m''} \\ v_m & -v_{m'} & -v_{m''} \end{bmatrix}$, $\tilde{W}^{(3)}_{m,m',m''} = \frac{1}{\sqrt{24}} \begin{bmatrix} v_m & v_{m'} & v_{m''} \\ v_m & v_{m'} & -v_{m''} \end{bmatrix}$

TABLE 14

| $i_1$ | $i_2$ | | | |
|---|---|---|---|---|
| | 0 | 1 | 2 | 3 |
| 0-3 | $W^{(4)}_{8i_1,8i_1+8,0}$ | $W^{(4)}_{8i_1,8i_1+8,1}$ | $W^{(4)}_{8i_1+2,8i_1+10,0}$ | $W^{(4)}_{8i_1+2,8i_1+10,1}$ |

| $i_1$ | $i_2$ | | | |
|---|---|---|---|---|
| | 4 | 5 | 6 | 7 |
| 0-3 | $W^{(4)}_{8i_1+4,8i_1+12,0}$ | $W^{(4)}_{8i_1+4,8i_1+12,1}$ | $W^{(4)}_{8i_1+6,8i_1+14,0}$ | $W^{(4)}_{8i_1+6,8i_1+14,1}$ | where $W^{(4)}_{m,m',n} = \frac{1}{\sqrt{32}} \begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$

TABLE 15

| | $i_2$ |
|---|---|
| $i_1$ | 0 |
| 0-3 | $W_{i_1}^{(5)} = \frac{1}{\sqrt{40}} \begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ |

TABLE 16

| | $i_2$ |
|---|---|
| $i_1$ | 0 |
| 0-3 | $W_{i_1}^{(6)} = \frac{1}{\sqrt{48}} \begin{bmatrix} v_{2i_1} & v_{2i_1} & v_{2i_1+8} & v_{2i_1+8} & v_{2i_1+16} & v_{2i_1+16} \\ v_{2i_1} & -v_{2i_1} & v_{2i_1+8} & -v_{2i_1+8} & v_{2i_1+16} & -v_{2i_1+16} \end{bmatrix}$ |

TABLE 17

| | $i_2$ |
|---|---|
| $i_1$ | 0 |
| 0-3 | $W_{i_1}^{(7)} = \frac{1}{\sqrt{56}} \begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ |

TABLE 18

| | $i_2$ |
|---|---|
| $i_1$ | 0 |
| 0-3 | $W_{i_1}^{(8)} = \frac{1}{8} \begin{bmatrix} v_{2i_1} & v_{2i_1} & v_{2i_1+8} & v_{2i_1+8} & v_{2i_1+16} & v_{2i_1+16} & v_{2i_1+24} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} & -v_{2i_1+24} \end{bmatrix}$ |

Embodiment 1

A first embodiment (Embodiment 1) discloses a method for deciding the number of bits of different precoder indexes constructing the entire precoder.

Tables 11 to 18 show codebooks for enabling a BS (or eNB) having 8 Tx antennas in the 3GPP LTE system to report a CSI. The CSI report codebooks shown in Tables 11 to 18 may decide the codebook element according to two kinds of feedback reports. Although Tables 11 to 18 represent two feedback report values as i1 and i2, i1 and i2 correspond to one precoder index W1 (or PMI1) and another precoder index W2 (or PMI2), respectively. Two report values may have different timing points, and may be established to have different frequency granularities. For data transmission, the number (# of element) of constituent elements of the codebook may have different values according to the number of UE-recommended ranks, as represented by the following Table 19.

TABLE 19

| | Rank | | | | | | | |
|---|---|---|---|---|---|---|---|---|
| | 1 | 2 | 3 | 4 | 5 | 6 | 7 | 8 |
| # of element for i1 | 16 | 16 | 4 | 4 | 4 | 4 | 4 | 1 |
| # of element for i2 | 16 | 16 | 16 | 8 | 1 | 1 | 1 | 1 |

In Table 19, i1 may be defined to have an element of 16, 4 or 1 according to the rank, and i2 may be defined to have an element of 16, 8 or 1 according to the rank. For feedback, i1 may be represented by 0 to 4 bits, and i2 may be represented by 0 to 4 bits. A maximum number of bits capable of expressing i1 and i2 according to the rank can be represented by the following Table 20.

TABLE 20

| | Rank | | | | | | | |
|---|---|---|---|---|---|---|---|---|
| | 1 | 2 | 3 | 4 | 5 | 6 | 7 | 8 |
| Maximum bits for i1 | 4 | 4 | 2 | 2 | 2 | 2 | 2 | 0 |
| Maximum bits for i2 | 4 | 4 | 4 | 3 | 0 | 0 | 0 | 0 |

Due to limitation of control channel capacity defined to report feedback information, bits capable of representing i1 and i2 for CSI report may be restricted. That is, the i1 and i2 values must be transmitted to report a CSI. If an indicator for the i1 value and/or an indicator for the i2 value may be transmitted along with RI or CQI, an error rate similar to that of a channel that reports RI or CQI defined in the legacy 3GPP LTE Release-8 or Release-9 may be implemented and at the same time feedback information may be transmitted as necessary.

In the case where the indicator for the i1 value and/or the indicator for the i2 value are simultaneously transmitted along with RI or CQI, for example, RI may be reported through one subframe, and an indicator for the i1 value, an indicator for the i2 value and a CQI may be simultaneously reported through another subframe. In another example, RI and the indicator for i1 may be simultaneously reported through one subframe, and the indicator for i2 and a CQI may be simultaneously transmitted through another subframe.

The legacy 3GPP LTE Release-8 or Release-9 assumes transmission of a maximum of 2 bits for the RI. In case of RI transmission through a PUCCH, the same coding method as in ACK/NACK transmission may be used. In addition, it is assumed that a maximum of 11 bits is transmitted to report CQI/PMI, such that the coding may be carried out using a Reed-Muller (RM) code that is capable of supporting a maximum of 13 bits.

If it is assumed that the system (e.g., 3GPP LTE Release-10 system) supporting the extended antenna structure simultaneously reports i1, i2, and CQI (i1/i2/CQI), a maximum of 15 (=4+4+7) bits may be requisite for Rank-1 or Rank-2. To transmit 15 bits, the coding method for extending the legacy RM code may be used, or a control signal may be reported using the conventional convolution code. In addition, in order to implement the same level as that of maximum bits defined in the legacy system, a method for reducing the size of indicator bits for i1 and i2 may be used as necessary.

Table 21 shows numbers of bits needed to simultaneously report i1, i2 and CQI (i1/i2/CQI). If the indicator bits for i1 and i2 are set to 0~4, the number of bits transmitted in one subframe is shown in Table 21. In addition, according to the rank, the number of indicator bits for i1 or i2 may be a fullset or subset. For example, if the i1 indicator bit is set to 4 and the i2 indicator bit is set to 4, all the fullsets of a codebook may be used to transmit Rank-1 and Rank-2. Alternatively, in the case where 2 bits are used for i1 or (W1) and 4 bits are used for i2 (or W2), the subset of i1 may be used in Rank-1 or Rank-2, the fullset of i2 may be used, and all fullsets of i1 and i2 may be used in Rank-3. In Table 21, F may represent the fullset, and S may represent the subset. In addition, in association with each expression (F/F, F/S, S/F or S/S) of Table 21, a number located in front of a specific symbol (/) represents bits for i1 and another number located behind the symbol (/) represents bits for i2.

TABLE 21

| R | i1 | i2 | i1 + i2 + CQI | Rank 1 | 2 | 3 | 4 | 5 | 6 | 7 | 8 |
|---|---|---|---|---|---|---|---|---|---|---|---|
| 1/2/3 | 4 | 4 | 4 + 4 + 7 | F/F | F/F | — | — | — | — | — | — |
|  |  | 3 | 4 + 3 + 7 | F/S | F/S | — | — | — | — | — | — |
|  |  | 2 | 4 + 2 + 7 | F/S | F/S | — | — | — | — | — | — |
|  |  | 1 | 4 + 1 + 7 | F/S | F/S | — | — | — | — | — | — |
|  |  | 0 | 4 + 0 + 7 | F/S | F/S | — | — | — | — | — | — |
|  | 3 | 4 | 3 + 4 + 7 | S/F | S/F | — | — | — | — | — | — |
|  |  | 3 | 3 + 3 + 7 | S/S | S/S | — | — | — | — | — | — |
|  |  | 2 | 3 + 2 + 7 | S/S | S/S | — | — | — | — | — | — |
|  |  | 1 | 3 + 1 + 7 | S/S | S/S | — | — | — | — | — | — |
|  |  | 0 | 3 + 0 + 7 | S/S | S/S | — | — | — | — | — | — |
|  | 2 | 4 | 2 + 4 + 7 | S/F | S/F | F/F | — | — | — | — | — |
|  |  | 3 | 2 + 3 + 7 | S/S | S/S | F/S | F/F | — | — | — | — |
|  |  | 2 | 2 + 2 + 7 | S/S | S/S | F/S | F/S | — | — | — | — |
|  |  | 1 | 2 + 1 + 7 | S/S | S/S | F/S | F/S | — | — | — | — |
|  |  | 0 | 2 + 0 + 7 | S/S | S/S | F/S | F/S | F/F | F/F | F/F | — |
|  | 1 | 4 | 1 + 4 + 7 | S/F | S/F | S/F | — | — | — | — | — |
|  |  | 3 | 1 + 3 + 7 | S/S | S/S | S/F | S/F | — | — | — | — |
|  |  | 2 | 1 + 2 + 7 | S/S | S/S | S/S | S/S | — | — | — | — |
|  |  | 1 | 1 + 1 + 7 | S/S | S/S | S/S | S/S | — | — | — | — |
|  |  | 0 | 1 + 0 + 7 | S/S | S/S | S/S | S/S | S/F | S/F | S/F | — |
|  | 0 | 0 | 0 + 0 + 7 | S/S | S/S | S/S | S/S | S/S | S/S | S/S | F/F |

To apply the legacy coding method to PUCCH feedback transmission or to obtain an error rate similar to that of the conventional feedback channel, 13 bits or less may be transmitted within one subframe. In this case, when using the subset including only too small number of codebook elements, the probability that the codebook element for expressing a CSI appropriate for an actual channel state is contained in the corresponding subset is gradually decreased, resulting in a reduction in transmission throughput. Therefore, the number of feedback bits must be reduced and the subset of an appropriate level must be used.

For example, for Rank-1 and Rank-2, a maximum of 4 bits may be requested for each of i1 and i2. The subset of index in which '(bits for the i1 indicator/bits for the i2 indicator)' is set to any of (4/3), (4/2), (3/3), (3/2), (2/3), (2/2), etc. may be used as necessary.

In addition, the fullset or subset of index may be used according to the rank. For example, in order to implement the level corresponding to a maximum of 11 bits, '2 bits/2 bits' may be used for i1 and i2 (i1/i2). In this case, '2 bits/2 bits' may be used at Ranks 1 to 4, '2 bits/0 bit' may be used at Ranks 5 to 7, and '0 bit/0 bit' may be used at Rank-8. Alternatively, in order to implement the level corresponding to a maximum of 13 bits, '3 bits/2 bits' may be used for i1 and i2 (i1/i2). In this case, '3 bits/2 bits' may be used at Ranks 1 and 2, '2 bits/4 bits' may be used at Rank-3, '2 bits/3 bits' may be used at Rank-4, '2 bits/0 bit' may be used at Ranks 5 to 7, and '0 bit/0 bit' may be used at Rank-8. Table 22 shows exemplary bit numbers capable of being used for i1 and i2 (i1/i2) for each rank.

TABLE 22

| Rank | (i1/i2) |
|---|---|
| 1 | (4/2), (3/3), (3/2), (2/3), (2/2) |
| 2 | (4/2), (3/3), (3/2), (2/3), (2/2) |
| 3 | (2/4), (2/3), (2/2), (2/1), (2/0), (1/4), (1/3), (1/2), (1/1), (1/0) |
| 4 | (2/3), (2/2), (2/1), (2/0), (1/3), (1/2), (1/1) |
| 5 | (2/0) |
| 6 | (2/0) |
| 7 | (2/0) |
| 8 | (0/0) |

Table 23 shows bits required either when the RI and the i1 index are simultaneously transmitted within one subframe or when the i2 index and the CQI are simultaneously transmitted within another subframe.

TABLE 23

| RI | i1 | i2 | RI + i1 | i2 + CQI | Rank 1 | 2 | 3 | 4 | 5 | 6 | 7 | 8 |
|---|---|---|---|---|---|---|---|---|---|---|---|---|
| 3 | 4 | 4 | 3 + 4 | 4 + 7 | F/F | F/F | — | — | — | — | — | — |
|  |  | 3 |  | 3 + 7 | F/S | F/S | — | — | — | — | — | — |
|  |  | 2 |  | 2 + 7 | F/S | F/S | — | — | — | — | — | — |
|  |  | 1 |  | 1 + 7 | F/S | F/S | — | — | — | — | — | — |
|  |  | 0 |  | 0 + 7 | F/S | F/S | — | — | — | — | — | — |
|  | 3 | 4 | 3 + 3 | 4 + 7 | S/F | S/F | — | — | — | — | — | — |
|  |  | 3 |  | 3 + 7 | S/S | S/S | — | — | — | — | — | — |
|  |  | 2 |  | 2 + 7 | S/S | S/S | — | — | — | — | — | — |
|  |  | 1 |  | 1 + 7 | S/S | S/S | — | — | — | — | — | — |
|  |  | 0 |  | 0 + 7 | S/S | S/S | — | — | — | — | — | — |
|  | 2 | 4 | 3 + 2 | 4 + 7 | S/F | S/F | F/F | — | — | — | — | — |
|  |  | 3 |  | 3 + 7 | S/S | S/S | F/S | F/F | — | — | — | — |
|  |  | 2 |  | 2 + 7 | S/S | S/S | F/S | F/S | — | — | — | — |
|  |  | 1 |  | 1 + 7 | S/S | S/S | F/S | F/S | — | — | — | — |
|  |  | 0 |  | 0 + 7 | S/S | S/S | F/S | F/S | F/F | F/F | F/F | — |
|  | 1 | 4 | 3 + 1 | 4 + 7 | S/F | S/F | S/F | — | — | — | — | — |
|  |  | 3 |  | 3 + 7 | S/S | S/S | S/F | S/F | — | — | — | — |
|  |  | 2 |  | 2 + 7 | S/S | S/S | S/S | S/S | — | — | — | — |
|  |  | 1 |  | 1 + 7 | S/S | S/S | S/S | S/S | — | — | — | — |
|  |  | 0 |  | 0 + 7 | S/S | S/S | S/S | S/S | S/F | S/F | S/F | — |
|  | 0 | 0 | 3 + 0 | 0 + 7 | S/S | S/S | S/S | S/S | S/S | S/S | S/S | F/F |
| 2 | 4 | 4 | 2 + 4 | 4 + 7 | F/F | F/F | — | — | — | — | — | — |
|  |  | 3 |  | 3 + 7 | F/S | F/S | — | — | — | — | — | — |
|  |  | 2 |  | 2 + 7 | F/S | F/S | — | — | — | — | — | — |
|  |  | 1 |  | 1 + 7 | F/S | F/S | — | — | — | — | — | — |
|  |  | 0 |  | 0 + 7 | F/S | F/S | — | — | — | — | — | — |
|  | 3 | 4 | 2 + 3 | 4 + 7 | S/F | S/F | — | — | — | — | — | — |
|  |  | 3 |  | 3 + 7 | S/S | S/S | — | — | — | — | — | — |
|  |  | 2 |  | 2 + 7 | S/S | S/S | — | — | — | — | — | — |
|  |  | 1 |  | 1 + 7 | S/S | S/S | — | — | — | — | — | — |
|  |  | 0 |  | 0 + 7 | S/S | S/S | — | — | — | — | — | — |
|  | 2 | 4 | 2 + 2 | 4 + 7 | S/F | S/F | F/F | — | — | — | — | — |
|  |  | 3 |  | 3 + 7 | S/S | S/S | F/S | F/F | — | — | — | — |
|  |  | 2 |  | 2 + 7 | S/S | S/S | F/S | F/S | — | — | — | — |
|  |  | 1 |  | 1 + 7 | S/S | S/S | F/S | F/S | — | — | — | — |
|  |  | 0 |  | 0 + 7 | S/S | S/S | F/S | F/S | — | — | — | — |
|  | 1 | 4 | 2 + 1 | 4 + 7 | S/F | S/F | S/F | — | — | — | — | — |
|  |  | 3 |  | 3 + 7 | S/S | S/S | S/F | S/F | — | — | — | — |
|  |  | 2 |  | 2 + 7 | S/S | S/S | S/S | S/S | — | — | — | — |
|  |  | 1 |  | 1 + 7 | S/S | S/S | S/S | S/S | — | — | — | — |
|  |  | 0 |  | 0 + 7 | S/S | S/S | S/S | S/S | — | — | — | — |
|  | 0 | 0 | 2 + 0 | 0 + 7 | S/S | S/S | S/S | S/S | — | — | — | — |
| 1 | 4 | 4 | 1 + 4 | 4 + 7 | F/F | F/F | — | — | — | — | — | — |
|  |  | 3 |  | 3 + 7 | F/S | F/S | — | — | — | — | — | — |
|  |  | 2 |  | 2 + 7 | F/S | F/S | — | — | — | — | — | — |
|  |  | 1 |  | 1 + 7 | F/S | F/S | — | — | — | — | — | — |
|  |  | 0 |  | 0 + 7 | F/S | F/S | — | — | — | — | — | — |
|  | 3 | 4 | 1 + 3 | 4 + 7 | S/F | S/F | — | — | — | — | — | — |
|  |  | 3 |  | 3 + 7 | S/S | S/S | — | — | — | — | — | — |
|  |  | 2 |  | 2 + 7 | S/S | S/S | — | — | — | — | — | — |
|  |  | 1 |  | 1 + 7 | S/S | S/S | — | — | — | — | — | — |
|  |  | 0 |  | 0 + 7 | S/S | S/S | — | — | — | — | — | — |
|  | 2 | 4 | 1 + 2 | 4 + 7 | S/F | S/F | — | — | — | — | — | — |
|  |  | 3 |  | 3 + 7 | S/S | S/S | — | — | — | — | — | — |

TABLE 23-continued

| RI | i1 | i2 | RI + i1 | i2 + CQI | 1 | 2 | 3 | 4 | 5 | 6 | 7 | 8 |
|----|----|----|---------|----------|---|---|---|---|---|---|---|---|
|  |  | 2 |  | 2 + 7 | S/S | S/S | — | — | — | — | — | — |
|  |  | 1 |  | 1 + 7 | S/S | S/S | — | — | — | — | — | — |
|  |  | 0 |  | 0 + 7 | S/S | S/S | — | — | — | — | — | — |
| 1 | 4 |  | 1 + 1 | 4 + 7 | S/F | S/F | — | — | — | — | — | — |
|  |  | 3 |  | 3 + 7 | S/S | S/S | — | — | — | — | — | — |
|  |  | 2 |  | 2 + 7 | S/S | S/S | — | — | — | — | — | — |
|  |  | 1 |  | 1 + 7 | S/S | S/S | — | — | — | — | — | — |
|  |  | 0 |  | 0 + 7 | S/S | S/S | — | — | — | — | — | — |
| 0 | 0 |  | 1 + 0 | 0 + 7 | S/S | S/S | — | — | — | — | — | — |

If the maximum number of Ranks reported by a UE is determined according to either a maximum rank capable of being received at the UE or a maximum rank to be transmitted from an eNB, a bit for Rank indication may be determined. Provided that RI and i1 are combined and simultaneously transmitted, a maximum number of bits requisite for feedback may be 7 (=3+4) bits, and a minimum number of bits may be 5 (=1+4) bits.

Rank information is basically used to select/calculate other feedback information, such that it is necessary to robustly transmit the rank information. Thus, it is preferable that the number of bits contained in a subframe corresponding to rank transmission be reduced as much as possible. For such transmission, a method for reducing the number of bits of the i1 indicator may be used as necessary. Considering the above-mentioned condition, Table 24 exemplarily shows bit numbers capable of being used for i1 and i2 (i1/i2) for each rank.

TABLE 24

| Rank | (i1/i2) |
|------|---------|
| 1 | (3/4), (3/3), (3/2), (2/4), (2/3), (2/2) |
| 2 | (3/4), (3/3), (3/2), (2/4), (2/3), (2/2) |
| 3 | (2/4), (2/3), (2/2), (2/1), (2/0), (1/4), (1/3), (1/2), (1/1), (1/0) |
| 4 | (2/3), (2/2), (2/1), (2/0), (1/3), (1/2), (1/1) |
| 5 | (2/0), (1/0) |
| 6 | (2/0), (1/0) |
| 7 | (2/0), (1/0) |
| 8 | (0/0) |

In case of setting the subset of the i1/i2 indicators, for example, the i1 and i2 subsets may be designed to have different sizes according to a preferred rank. In another example, the i1 and i2 subsets may be designed to have different sizes according to UE category. The UE category may be classified according to UE capability.

Embodiment 2

A method for setting the codebook subset through different precoder indexes (i1/i2) according to the present invention will hereinafter be described in detail.

Table 25 shows another example of a codebook appropriate for Rank-1 CSI report shown in Table 11. Rank-1 codeword may be configured on the basis of 4 Tx DFT vector ($v_m$), and may be represented by a combination of the 4Tx DFT vector ($v_m$) and a phase ($\phi_n$). If the i1 index is defined as 0 to 15 and the i2 index is defined as 0 to 15, the codebook may be configured by both $v_m$ having a 32PSK (Phase Shift Keying) phase and $\phi_n$ having a QPSK (Quadrature PSK) phase. In this case, the same element may be repeated between contiguous indexes of the i1 value.

TABLE 25

| i1 | i2=0 | i2=1 | i2=2 | i2=3 | i2=4 | i2=5 | i2=6 | i2=7 |
|----|----|----|----|----|----|----|----|----|
| 0 | V0 | V0 | V0 | V0 | V1 | V1 | V1 | V1 |
|  | V0 | jV0 | −V0 | −jV0 | V1 | jV1 | −V1 | −jV1 |
| 1 | V2 | V2 | V2 | V2 | V3 | V3 | V3 | V3 |
|  | V2 | jV2 | −V2 | −jV2 | V3 | jV3 | −V3 | −jV3 |
| 2 | V4 | V4 | V4 | V4 | V5 | V5 | V5 | V5 |
|  | V4 | jV4 | −V4 | −jV4 | V5 | jV5 | −V5 | −jV5 |
| 3 | V6 | V6 | V6 | V6 | V7 | V7 | V7 | V7 |
|  | V6 | jV6 | −V6 | −jV6 | V7 | jV7 | −V7 | −jV7 |
| 4 | V8 | V8 | V8 | V8 | V9 | V9 | V9 | V9 |
|  | V8 | jV8 | −V8 | −jV8 | V9 | jV9 | −V9 | −jV9 |
| 5 | V10 | V10 | V10 | V10 | V11 | V11 | V11 | V11 |
|  | V10 | jV10 | −V10 | −jV10 | V11 | jV11 | −V11 | −jV11 |
| 6 | V12 | V12 | V12 | V12 | V13 | V13 | V13 | V13 |
|  | V12 | jV12 | −V12 | −jV12 | V13 | jV13 | −V13 | −jV13 |
| 7 | V14 | V14 | V14 | V14 | V15 | V15 | V15 | V15 |
|  | V14 | jV14 | −V14 | −jV14 | V15 | jV15 | −V15 | −jV15 |
| 8 | V16 | V16 | V16 | V16 | V17 | V17 | V17 | V17 |
|  | V16 | jV16 | −V16 | −jV16 | V17 | jV17 | −V17 | −jV17 |
| 9 | V18 | V18 | V18 | V18 | V19 | V19 | V19 | V19 |
|  | V18 | jV18 | −V18 | −jV18 | V19 | jV19 | −V19 | −jV19 |
| 10 | V20 | V20 | V20 | V20 | V21 | V21 | V21 | V21 |
|  | V20 | jV20 | −V20 | −jV20 | V21 | jV21 | −V21 | −jV21 |
| 11 | V22 | V22 | V22 | V22 | V23 | V23 | V23 | V23 |
|  | V22 | jV22 | −V22 | −jV22 | V23 | jV23 | −V23 | −jV23 |
| 12 | V24 | V24 | V24 | V24 | V25 | V25 | V25 | V25 |
|  | V24 | jV24 | −V24 | −jV24 | V25 | jV25 | −V25 | −jV25 |
| 13 | V26 | V26 | V26 | V26 | V27 | V27 | V27 | V27 |
|  | V26 | jV26 | −V26 | −jV26 | V27 | jV27 | −V27 | −jV27 |
| 14 | V28 | V28 | V28 | V28 | V29 | V29 | V29 | V29 |
|  | V28 | jV28 | −V28 | −jV28 | V29 | jV29 | −V29 | −jV29 |
| 15 | V30 | V30 | V30 | V30 | V31 | V31 | V31 | V31 |
|  | V30 | jV30 | −V30 | −jV30 | V31 | jV31 | −V31 | −jV31 |

| i1 | i2=8 | i2=9 | i2=10 | i2=11 | i2=12 | i2=13 | i2=14 | i2=15 |
|----|----|----|----|----|----|----|----|----|
| 0 | V2 | V2 | V2 | V2 | V3 | V3 | V3 | V3 |
|  | V2 | jV2 | −V2 | −jV2 | V3 | jV3 | −V3 | −jV3 |
| 1 | V4 | V4 | V4 | V4 | V5 | V5 | V5 | V5 |
|  | V4 | jV4 | −V4 | −jV4 | V5 | jV5 | −V5 | −jV5 |
| 2 | V6 | V6 | V6 | V6 | V7 | V7 | V7 | V7 |
|  | V6 | jV6 | −V6 | −jV6 | V7 | jV7 | −V7 | −jV7 |
| 3 | V8 | V8 | V8 | V8 | V9 | V9 | V9 | V9 |
|  | V8 | jV8 | −V8 | −jV8 | V9 | jV9 | −V9 | −jV9 |
| 4 | V10 | V10 | V10 | V10 | V11 | V11 | V11 | V11 |
|  | V10 | jV10 | −V10 | −jV10 | V11 | jV11 | −V11 | −jV11 |
| 5 | V12 | V12 | V12 | V12 | V13 | V13 | V13 | V13 |
|  | V12 | jV12 | −V12 | −jV12 | V13 | jV13 | −V13 | −jV13 |
| 6 | V14 | V14 | V14 | V14 | V15 | V15 | V15 | V15 |
|  | V14 | jV14 | −V14 | −jV14 | V15 | jV15 | −V15 | −jV15 |
| 7 | V16 | V16 | V16 | V16 | V17 | V17 | V17 | V17 |
|  | V16 | jV16 | −V16 | −jV16 | V17 | jV17 | −V17 | −jV17 |
| 8 | V18 | V18 | V18 | V18 | V19 | V19 | V19 | V19 |
|  | V18 | jV18 | −V18 | −jV18 | V19 | jV19 | −V19 | −jV19 |
| 9 | V20 | V20 | V20 | V20 | V21 | V21 | V21 | V21 |
|  | V20 | jV20 | −V20 | −jV20 | V21 | jV21 | −V21 | −jV21 |
| 10 | V22 | V22 | V22 | V22 | V23 | V23 | V23 | V23 |
|  | V22 | jV22 | −V22 | −jV22 | V23 | jV23 | −V23 | −jV23 |
| 11 | V24 | V24 | V24 | V24 | V25 | V25 | V25 | V25 |
|  | V24 | jV24 | −V24 | −jV24 | V25 | jV25 | −V25 | −jV25 |
| 12 | V26 | V26 | V26 | V26 | V27 | V27 | V27 | V27 |
|  | V26 | jV26 | −V26 | −jV26 | V27 | jV27 | −V27 | −jV27 |
| 13 | V28 | V28 | V28 | V28 | V29 | V29 | V29 | V29 |
|  | V28 | jV28 | −V28 | −jV28 | V29 | jV29 | −V29 | −jV29 |
| 14 | V30 | V30 | V30 | V30 | V31 | V31 | V31 | V31 |
|  | V30 | jV30 | −V30 | −jV30 | V31 | jV31 | −V31 | −jV31 |
| 15 | V0 | V0 | V0 | V0 | V1 | V1 | V1 | V1 |
|  | V0 | jV0 | −V0 | −jV0 | V1 | jV1 | −V1 | −jV1 |

Accordingly, in order to configure the subset of a codebook, a method for limiting a phase of a DFT matrix constructing the vector of $v_m$ or the phase of $\phi_n$, and a method for constructing the i1 value using different codebook elements at different i1 indexes of codebook elements contained in one i1 value may be considered. In this way, the codebook subset may be constructed.

According to whether the i1 or i2 subset is used, DFT vector of $v_m$ and a phase of $\phi_n$ may be determined. For example, it is assumed that, in order to indicate the i1 value, 3 bits may be used and 8 even indexes (0, 2, 4, 6, 8, 10, 12, 14) may be used. It is also assumed that, in order to indicate the i1 value, 3 bits may be used and 8 indexes (0, 1, 2, 3, 8, 9, 10, 11) may be used. Under these assumption, a 4Tx DFT vector having a 16PSK phase for the $v_m$ value and a QPSK for the phase ($\phi_n$)) may be configured.

As described above, when deciding the indication bit for the i1 value and the indication bit for the i2 value, one phase of the 4Tx DFT vector for constructing the $v_m$ value and the other phase for constructing the phase ($\phi_n$) according to a combination of indexes appropriate for individual bits may be represented by the following table 26.

TABLE 26

| | Bit for i1 (elements number) | Bit for i2 (elements number) | $v_m$ | $\phi_n$ |
|---|---|---|---|---|
| 1 | 2 (4n, n: 0~3) | 1 (0, 1) | QPSK | {1, j} |
| 2 | 2 (4n, n: 0~3) | 1 (0, 2) | QPSK | BPSK |
| 3 | 2 (4n, n: 0~3) | 2 (0~3) | QPSK | QPSK |
| 4 | 2 (4n, n: 0~3) | 2 (2m, m: 0~3) | QPSK + QPSK(2pi/32) | BPSK |
| 5 | 2 (4n, n: 0~3) | 3 (0~7) | QPSK + QPSK(2pi/32) | QPSK |
| 6 | 2 (4n, n: 0~3) | 3 (0~3, 8~11) | QPSK + QPSK(2x2pi/32) | QPSK |
| 7 | 2 (4n, n: 0~3) | 3 (2m, m: 0~7) | QPSK + QPSK(2pi/32) + QPSK(2x2pi/32) + QPSK(2x3pi/32) | BPSK |
| 8 | 2 (4n, n: 0~3) | 4 (0~15) | QPSK + QPSK(2pi/32) + QPSK(2x2pi/32) + QPSK(2x3pi/32) | QPSK |
| 9 | 3 (2n, n: 0~7) | 1 (0, 1) | 8 PSK | {1, j} |
| 10 | 3 (2n, n: 0~7) | 1 (0, 2) | 8 PSK | BPSK |
| 11 | 3 (2n, n: 0~7) | 2 (0~3) | 8 PSK | QPSK |
| 12 | 3 (2n, n: 0~7) | 2 (2m, m: 0~3) | 8 PSK + 8 PSK(2pi/32) | BPSK |
| 13 | 3 (2n, n: 0~7) | 3 (0~7) | 8 PSK + 8 PSK(2pi/32) | QPSK |
| 14 | 3 (2n, n: 0~7) | 3 (0~3, 8~11) | 16 PSK | QPSK |
| 15 | 3 (2n, n: 0~7) | 3 (2m, m: 0~7) | 32 PSK | BPSK |
| 16 | 3 (2n, n: 0~7) | 4 (0~15) | 32 PSK | QPSK |
| 17 | 4 (0~15) | 1 (0, 1) | 16 PSK | {1, j} |
| 18 | 4 (0~15) | 1 (0, 2) | 16 PSK | BPSK |
| 19 | 4 (0~15) | 2 (0~3) | 16 PSK | QPSK |
| 20 | 4 (0~15) | 2 (2m, m: 0~3) | 32 PSK | BPSK |
| 21 | 4 (0~15) | 3 (0~7) | 32 PSK | QPSK |
| 22 | 4 (0~15) | 3 (0~3, 8~11) | 16 PSK (Overraped) | QPSK |
| 23 | 4 (0~15) | 3 (2m, m: 0~7) | 32 PSK (Overraped) | BPSK |
| 24 | 4 (0~15) | 4 (0~15) | 32 PSK (Overraped) | QPSK |

Table 27 shows another example of a codebook appropriate for Rank-2 CSI report shown in Table 12. In the Rank-2 CSI report, 16 indexes (0 to 15) are defined for each of the i1 and i2 values.

TABLE 27

| | i2 | | | | | | | |
|---|---|---|---|---|---|---|---|---|
| | 0 | | 1 | | 2 | | 3 | |
| | $1^{st}$ | $2^{nd}$ | $1^{st}$ | $2^{nd}$ | $1^{st}$ | $2^{nd}$ | $1^{st}$ | $2^{nd}$ |
| i1 | 0 | 2 | 1 | 3 | 4 | 6 | 5 | 7 |
| 0 | V0 | V0 | V0 | V0 | V1 | V1 | V1 | V1 |
|   | V0 | −V0 | jV0 | −jV0 | V1 | −V1 | jV1 | −jV1 |
| 1 | V2 | V2 | V2 | V2 | V3 | V3 | V3 | V3 |
|   | V2 | −V2 | jV2 | −jV2 | V3 | −V3 | jV3 | −jV3 |
| 2 | V4 | V4 | V4 | V4 | V5 | V5 | V5 | V5 |
|   | V4 | −V4 | jV4 | −jV4 | V5 | −V5 | jV5 | −jV5 |
| 3 | V6 | V6 | V6 | V6 | V7 | V7 | V7 | V7 |
|   | V6 | −V6 | jV6 | −jV6 | V7 | −V7 | jV7 | −jV7 |

TABLE 27-continued

| 4 | V8 | V8 | V8 | V8 | V9 | V9 | V9 | V9 |
|---|---|---|---|---|---|---|---|---|
|   | V8 | −V8 | jV8 | −jV8 | V9 | −V9 | jV9 | −jV9 |
| 5 | V10 | V10 | V10 | V10 | V11 | V11 | V11 | V11 |
|   | V10 | −V10 | jV10 | −jV10 | V11 | −V11 | jV11 | −jV11 |
| 6 | V12 | V12 | V12 | V12 | V13 | V13 | V13 | V13 |
|   | V12 | −V12 | jV12 | −jV12 | V13 | −V13 | jV13 | −jV13 |
| 7 | V14 | V14 | V14 | V14 | V15 | V15 | V15 | V15 |
|   | V14 | −V14 | jV14 | −jV14 | V15 | −V15 | jV15 | −jV15 |
| 8 | V16 | V16 | V16 | V16 | V17 | V17 | V17 | V17 |
|   | V16 | −V16 | jV16 | −jV16 | V17 | −V17 | jV17 | −jV17 |
| 9 | V18 | V18 | V18 | V18 | V19 | V19 | V19 | V19 |
|   | V18 | −V18 | jV18 | −jV18 | V19 | −V19 | jV19 | −jV19 |
| 10 | V20 | V20 | V20 | V20 | V21 | V21 | V21 | V21 |
|   | V20 | −V20 | jV20 | −jV20 | V21 | −V21 | jV21 | −jV21 |
| 11 | V22 | V22 | V22 | V22 | V23 | V23 | V23 | V23 |
|   | V22 | −V22 | jV22 | −jV22 | V23 | −V23 | jV23 | −jV23 |
| 12 | V24 | V24 | V24 | V24 | V25 | V25 | V25 | V25 |
|   | V24 | −V24 | jV24 | −jV24 | V25 | −V25 | jV25 | −jV25 |

TABLE 27-continued

| 13 | V26 | V26 | V26 | V26 | V27 | V27 | V27 | V27 |
|---|---|---|---|---|---|---|---|---|
|   | V26 | −V26 | jV26 | −jV26 | V27 | −V27 | jV27 | −jV27 |
| 14 | V28 | V28 | V28 | V28 | V29 | V29 | V29 | V29 |
|   | V28 | −V28 | jV28 | −jV28 | V29 | −V29 | jV29 | −jV29 |
| 15 | V30 | V30 | V30 | V30 | V31 | V31 | V31 | V31 |
|   | V30 | −V30 | jV30 | −jV30 | V31 | −V31 | jV31 | −jV31 |

| | i2 | | | | | | | |
|---|---|---|---|---|---|---|---|---|
| | 4 | | 5 | | 6 | | 7 | |
| | $1^{st}$ | $2^{nd}$ | $1^{st}$ | $2^{nd}$ | $1^{st}$ | $2^{nd}$ | $1^{st}$ | $2^{nd}$ |
| i1 | 8 | 10 | 9 | 11 | 12 | 14 | 13 | 15 |
| 0 | V2 | V2 | V2 | V2 | V3 | V3 | V3 | V3 |
|   | V2 | −V2 | jV2 | −jV2 | V3 | −V3 | jV3 | −jV3 |
| 1 | V4 | V4 | V4 | V4 | V5 | V5 | V5 | V5 |
|   | V4 | −V4 | jV4 | −jV4 | V5 | −V5 | jV5 | −jV5 |
| 2 | V6 | V6 | V6 | V6 | V7 | V7 | V7 | V7 |
|   | V6 | −V6 | jV6 | −jV6 | V7 | −V7 | jV7 | −jV7 |

TABLE 27-continued

| i1 | | | | | | | | |
|---|---|---|---|---|---|---|---|---|
| 3 | V8 | V8 | V8 | V8 | V9 | V9 | V9 | V9 |
|   | V8 | −V8 | jV8 | −jV8 | V9 | −V9 | jV9 | −jV9 |
| 4 | V10 | V10 | V10 | V10 | V11 | V11 | V11 | V11 |
|   | V10 | −V10 | jV10 | −jV10 | V11 | −V11 | jV11 | −jV11 |
| 5 | V12 | V12 | V12 | V12 | V13 | V13 | V13 | V13 |
|   | V12 | −V12 | jV12 | −jV12 | V13 | −V13 | jV13 | −jV13 |
| 6 | V14 | V14 | V14 | V14 | V15 | V15 | V15 | V15 |
|   | V14 | −V14 | jV14 | −jV14 | V15 | −V15 | jV15 | −jV15 |
| 7 | V16 | V16 | V16 | V16 | V17 | V17 | V17 | V17 |
|   | V16 | −V16 | jV16 | −jV16 | V17 | −V17 | jV17 | −jV17 |
| 8 | V18 | V18 | V18 | V18 | V19 | V19 | V19 | V19 |
|   | V18 | −V18 | jV18 | −jV18 | V19 | −V19 | jV19 | −jV19 |
| 9 | V20 | V20 | V20 | V20 | V21 | V21 | V21 | V21 |
|   | V20 | −V20 | jV20 | −jV20 | V21 | −V21 | jV21 | −jV21 |
| 10 | V22 | V22 | V22 | V22 | V23 | V23 | V23 | V23 |
|   | V22 | −V22 | jV22 | −jV22 | V23 | −V23 | jV23 | −jV23 |
| 11 | V24 | V24 | V24 | V24 | V25 | V25 | V25 | V25 |
|   | V24 | −V24 | jV24 | −jV24 | V25 | −V25 | jV25 | −jV25 |
| 12 | V26 | V26 | V26 | V26 | V27 | V27 | V27 | V27 |
|   | V26 | −V26 | jV26 | −jV26 | V27 | −V27 | jV27 | −jV27 |
| 13 | V28 | V28 | V28 | V28 | V29 | V29 | V29 | V29 |
|   | V28 | −V28 | jV28 | −jV28 | V29 | −V29 | jV29 | −jV29 |
| 14 | V30 | V30 | V30 | V30 | V31 | V31 | V31 | V31 |
|   | V30 | −V30 | jV30 | −jV30 | V31 | −V31 | jV31 | −jV31 |
| 15 | V0 | V0 | V0 | V0 | V1 | V1 | V1 | V1 |
|   | V0 | −V0 | jV0 | −jV0 | V1 | −V1 | jV1 | −jV1 |

| i2 | | | | | | | | |
|---|---|---|---|---|---|---|---|---|
| | 8 | | 9 | | 10 | | 11 | |
| | 1st | 2nd | 1st | 2nd | 1st | 2nd | 1st | 2nd |
| i1 | 0 | 6 | 1 | 7 | 4 | 10 | 5 | 9 |
| 0 | V0 | V1 | V0 | V1 | V1 | V2 | V1 | V2 |
|   | V0 | −V1 | jV0 | −jV1 | V1 | −V2 | jV1 | −jV2 |
| 1 | V2 | V3 | V2 | V3 | V3 | V4 | V3 | V4 |
|   | V2 | −V3 | jV2 | −jV3 | V3 | −V4 | jV3 | −jV4 |
| 2 | V4 | V5 | V4 | V5 | V5 | V6 | V5 | V6 |
|   | V4 | −V5 | jV4 | −jV5 | V5 | −V6 | jV5 | −jV6 |
| 3 | V6 | V7 | V6 | V7 | V7 | V8 | V7 | V8 |
|   | V6 | −V7 | jV6 | −jV7 | V7 | −V8 | jV7 | −jV8 |
| 4 | V8 | V9 | V8 | V9 | V9 | V10 | V9 | V10 |
|   | V8 | −V9 | jV8 | −jV9 | V9 | −V10 | jV9 | −jV10 |
| 5 | V10 | V11 | V10 | V11 | V11 | V12 | V11 | V12 |
|   | V10 | −V11 | jV10 | −jV11 | V11 | −V12 | jV11 | −jV12 |
| 6 | V12 | V13 | V12 | V13 | V13 | V14 | V13 | V14 |
|   | V12 | −V13 | jV12 | −jV13 | V13 | −V14 | jV13 | −jV14 |
| 7 | V14 | V15 | V14 | V15 | V15 | V16 | V15 | V16 |
|   | V14 | −V15 | jV14 | −jV15 | V15 | −V16 | jV15 | −jV16 |
| 8 | V16 | V17 | V16 | V17 | V17 | V18 | V17 | V18 |
|   | V16 | −V17 | jV16 | −jV17 | V17 | −V18 | jV17 | −jV18 |
| 9 | V18 | V19 | V18 | V19 | V19 | V20 | V19 | V20 |
|   | V18 | −V19 | jV18 | −jV19 | V19 | −V20 | jV19 | −jV20 |
| 10 | V20 | V21 | V20 | V21 | V21 | V22 | V21 | V22 |
|   | V20 | −V21 | jV20 | −jV21 | V21 | −V22 | jV21 | −jV22 |
| 11 | V22 | V23 | V22 | V23 | V23 | V24 | V23 | V24 |
|   | V22 | −V23 | jV22 | −jV23 | V23 | −V24 | jV23 | −jV24 |
| 12 | V24 | V25 | V24 | V25 | V25 | V26 | V25 | V26 |
|   | V24 | −V25 | jV24 | −jV25 | V25 | −V26 | jV25 | −jV26 |
| 13 | V26 | V27 | V26 | V27 | V27 | V28 | V27 | V28 |
|   | V26 | −V27 | jV26 | −jV27 | V27 | −V28 | jV27 | −jV28 |
| 14 | V28 | V29 | V28 | V29 | V29 | V30 | V29 | V30 |
|   | V28 | −V29 | jV28 | −jV29 | V29 | −V30 | jV29 | −jV30 |
| 15 | V30 | V31 | V30 | V31 | V31 | V0 | V31 | V0 |
|   | V30 | −V31 | jV30 | −jV31 | V31 | −V0 | jV31 | −jV0 |

| i2 | | | | | | | | |
|---|---|---|---|---|---|---|---|---|
| | 12 | | 13 | | 14 | | 15 | |
| | 1st | 2nd | 1st | 2nd | 1st | 2nd | 1st | 2nd |
| i1 | 0 | 14 | 1 | 13 | 4 | 14 | 5 | 15 |
| 0 | V0 | V3 | V0 | V3 | V1 | V3 | V1 | V3 |
|   | V0 | −V3 | jV0 | −jV3 | V1 | −V3 | jV1 | −jV3 |
| 1 | V2 | V5 | V2 | V5 | V3 | V5 | V3 | V5 |
|   | V2 | −V5 | jV2 | −jV5 | V3 | −V5 | jV3 | −jV5 |
| 2 | V4 | V7 | V4 | V7 | V5 | V7 | V5 | V7 |
|   | V4 | −V7 | jV4 | −jV7 | V5 | −V7 | jV5 | −jV7 |
| 3 | V6 | V9 | V6 | V9 | V7 | V9 | V7 | V9 |
|   | V6 | −V9 | jV6 | −jV9 | V7 | −V9 | jV7 | −jV9 |
| 4 | V8 | V11 | V8 | V11 | V9 | V11 | V9 | V11 |
|   | V8 | −V11 | jV8 | −jV11 | V9 | −V11 | jV9 | −jV11 |
| 5 | V10 | V13 | V10 | V13 | V11 | V13 | V11 | V13 |
|   | V10 | −V13 | jV10 | −jV13 | V11 | −V13 | jV11 | −jV13 |
| 6 | V12 | V15 | V12 | V15 | V13 | V15 | V13 | V15 |
|   | V12 | −V15 | jV12 | −jV15 | V13 | −V15 | jV13 | −jV15 |
| 7 | V14 | V17 | V14 | V17 | V15 | V17 | V15 | V17 |
|   | V14 | −V17 | jV14 | −jV17 | V15 | −V17 | jV15 | −jV17 |
| 8 | V16 | V19 | V16 | V19 | V17 | V19 | V17 | V19 |
|   | V16 | −V19 | jV16 | −jV19 | V17 | −V19 | jV17 | −jV19 |
| 9 | V18 | V21 | V18 | V21 | V19 | V21 | V19 | V21 |
|   | V18 | −V21 | jV18 | −jV21 | V19 | −V21 | jV19 | −jV21 |
| 10 | V20 | V23 | V20 | V23 | V21 | V23 | V21 | V23 |
|   | V20 | −V23 | jV20 | −jV23 | V21 | −V23 | jV21 | −jV23 |
| 11 | V22 | V25 | V22 | V25 | V23 | V25 | V23 | V25 |
|   | V22 | −V25 | jV22 | −jV25 | V23 | −V25 | jV23 | −jV25 |
| 12 | V24 | V27 | V24 | V27 | V25 | V27 | V25 | V27 |
|   | V24 | −V27 | jV24 | −jV27 | V25 | −V27 | jV25 | −jV27 |
| 13 | V26 | V29 | V26 | V29 | V27 | V29 | V27 | V29 |
|   | V26 | −V29 | jV26 | −jV29 | V27 | −V29 | jV27 | −jV29 |
| 14 | V28 | V31 | V28 | V31 | V29 | V31 | V29 | V31 |
|   | V28 | −V31 | jV28 | −jV31 | V29 | −V31 | jV29 | −jV31 |
| 15 | V30 | V1 | V30 | V1 | V31 | V1 | V31 | V1 |
|   | V30 | −V1 | jV30 | −jV1 | V31 | −V1 | jV31 | −jV1 |

When the indication bit for the i1 value and the indication bit for the i2 value are decided in the codebook subset configuration, a phase of the 4Tx DFT vector constructing the $v_m$ value and a phase of $\phi_n$ according to a combination of indexes appropriate for each bit may be represented by Table 26.

The DFT vector of $v_m$ and the phase of $\phi_n$ are determined according to whether the i1 or i2 subset is used. As shown in Table 27, when deciding the indication bit for the i1 value and the indication bit for the i2 value, one phase of the 4Tx DFT vector for constructing the $v_m$ value and the other phase for constructing the phase ($\phi_n$)) according to a combination of indexes appropriate for each bit may be represented by the following table 28.

TABLE 28

| Bit for i1 (elements number) | Bit for i2 (elements number) | $v_m$ | $\phi_n$ |
|---|---|---|---|
| 1  2 (4n, n: 0~3) | 1 (0, 1) | QPSK + QPSK(2pi/32) | QPSK |
| 2  2 (4n, n: 0~3) | 1 (0, 2) | QPSK + QPSK(2pi/32) | BPSK |
| 3  2 (4n, n: 0~3) | 2 (0~3) | QPSK + QPSK(2pi/32) | QPSK |
| 4  2 (4n, n: 0~3) | 2 (0, 1, 4, 5) | QPSK + QPSK(2x2pi/32) | QPSK |
| 5  2 (4n, n: 0~3) | 2 (2m, m: 0~3) | QPSK + QPSK(2pi/32) + QPSK(2x2pi/32) + QPSK(2x3pi/32) | BPSK |
| 6  2 (4n, n: 0~3) | 2 (2m + 8, m: 0~3) | QPSK + QPSK(2pi/32) + QPSK(2x2pi/32) + QPSK(2x3pi/32) | BPSK |

TABLE 28-continued

| Bit for i1 (elements number) | Bit for i2 (elements number) | $v_m$ | $\phi_n$ |
|---|---|---|---|
| 7 | 2 (4n, n: 0~3) | 3 (0~7) | QPSK + QPSK(2pi/32) + QPSK(2x2pi/32) + QPSK(2x3pi/32) | QPSK |
| 8 | 2 (4n, n: 0~3) | 3 (8~15) | QPSK + QPSK(2pi/32) + QPSK(2x2pi/32) + QPSK(2x3pi/32) | QPSK |
| 9 | 2 (4n, n: 0~3) | 3 (2m, m: 0~7) | QPSK + QPSK(2pi/32) + QPSK(2x2pi/32) + QPSK(2x3pi/32) | BPSK |
| 10 | 2 (4n, n: 0~3) | 4 (0~15) | QPSK + QPSK(2pi/32) + QPSK(2x2pi/32) + QPSK(2x3pi/32) | QPSK |
| 11 | 3 (2n, n: 0~7) | 1 (0, 1) | 8 PSK | QPSK |
| 12 | 3 (2n, n: 0~7) | 1 (0, 2) | 16 PSK | BPSK |
| 13 | 3 (2n, n: 0~7) | 1 (8, 9) | 8 PSK | QPSK |
| 14 | 3 (2n, n: 0~7) | 1 (8, 10) | 16 PSK | BPSK |
| 15 | 3 (2n, n: 0~7) | 2 (0~3) | 8 PSK + 8 PSK(2pi/32) | QPSK |
| 16 | 3 (2n, n: 0~7) | 2 (0, 1, 4, 5) | 16 PSK | QPSK |
| 17 | 3 (2n, n: 0~7) | 2 (2m, m: 0~3) | 32 PSK | BPSK |
| 18 | 3 (2n, n: 0~7) | 2 (2m + 8, m: 0~3) | 32 PSK | BPSK |
| 19 | 3 (2n, n: 0~7) | 3 (0~7) | 32 PSK | QPSK |
| 20 | 3 (2n, n: 0~7) | 3 (8~15) | 32 PSK | QPSK |
| 21 | 3 (2n, n: 0~7) | 3 (2m, m: 0~7) | 32 PSK | BPSK |
| 22 | 3 (2n, n: 0~7) | 4 (0~15) | 32 PSK | QPSK |
| 23 | 4 (0~15) | 1 (0, 1) | 16 PSK | QPSK |
| 24 | 4 (0~15) | 1 (0, 2) | 32 PSK | BPSK |
| 25 | 4 (0~15) | 2 (0~3) | 32 PSK | QPSK |
| 26 | 4 (0~15) | 2 (0, 1, 4, 5) | 16 PSK(Overraped) | QPSK |
| 27 | 4 (0~15) | 2 (2m, m: 0~3) | 32 PSK | BPSK |
| 28 | 4 (0~15) | 2 (2m + 8, m: 0~3) | 32 PSK | BPSK |
| 29 | 4 (0~15) | 3 (0~7) | 32 PSK(Overraped) | QPSK |
| 30 | 4 (0~15) | 3 (8~15) | 32 PSK | QPSK |
| 31 | 4 (0~15) | 3 (2m, m: 0~7) | 32 PSK(Overraped) | QPSK |
| 32 | 4 (0~15) | 4 (0~15) | 32 PSK (Overraped) | QPSK |
| 33 | 4 (0~15) | 2 (8, 9, 10, 11) | | |
| 34 | 4 (0~15) | 2 (0, 1, 8, 9) | | |
| 35 | 4 (0~15) | 2 (0, 2, 9, 10) | | |
| 36 | 4 (0~15) | 2 (8, 10, 12, 14) | | |

Similar to the above-mentioned scheme, a method for selecting the subset of a codebook denoted by 'i1/i2' may be applied to the codebooks appropriate for Rank-3 to Rank-8 of Tables 13 to 18.

For example, the i2 value of the Rank-3 codebook of Table 13 may be composed of 16 elements (0~15), and may be composed of a matrix that generates three orthogonal beams using two vectors. Four types of Rank-3 codebooks may be configured using two vectors.

For example, if i2 is composed of 0, 1, 2 and 3, four Rank-3 codebooks (Type-A, Type-B, Type-C and Type-D) may be used, and a detailed description thereof will hereinafter be described in detail.

In case of Type-A, a $1^{st}$ column is composed of $W_{8i_1}^{(3)}$ with a positive(+) co-phase, a $2^{nd}$ column is composed of $W_{8i_1}^{(3)}$ with a negative(−) co-phase, and a $3^{rd}$ column is composed of $W_{8i_1+8}^{(3)}$ with a negative(−) co-phase. [A: $1^{st}$ col ($W_{8i_1}^{(3)}$ with (+) co-phase), $2^{nd}$ col ($W_{8i_1}^{(3)}$ with (−) co-phase), and $3^{rd}$ col ($W_{8i_1+8}^{(3)}$ with (−) co-phase)].

In case of Type-B, a $1^{st}$ column is composed of $W_{8i_1+8}^{(3)}$ with a positive(+) co-phase, a $2^{nd}$ column is composed of $W_{8i_1}^{(3)}$ with a negative(−) co-phase, and a $3^{rd}$ column is composed of $W_{8i_1+8}^{(3)}$ with a negative(−) co-phase. [B: $1^{st}$ col ($W_{8i_1+8}^{(3)}$ with (+) co-phase), $2^{nd}$ col ($W_{8i_1}^{(3)}$ with (−) co-phase), $3^{rd}$ col ($W_{8i_1+8}^{(3)}$ with (−) co-phase)].

In case of Type-C, a $1^{st}$ column is composed of $W_{8i_1}^{(3)}$ with a positive(+) co-phase, a $2^{nd}$ column is composed of $W_{8i_1+8}^{(3)}$ with a positive(+) co-phase, and a $3^{rd}$ column is composed of $W_{8i_1+8}^{(3)}$ with a negative(−) co-phase. [C: $1^{st}$ col ($W_{8i_1}^{(3)}$ with (+) co-phase), $2^{nd}$ col ($W_{8i_1+8}^{(3)}$ with (+) co-phase), $3^{rd}$ col ($W_{8i_1+8}^{(3)}$ with (−) co-phase)].

In case of Type-D, a $1^{st}$ column is composed of $W_{8i_1+8}^{(3)}$ with a positive(+) co-phase, a $2^{nd}$ column is composed of $W_{8i_1}^{(3)}$ with a positive(+) co-phase, and a $3^{rd}$ column is composed of $W_{8i_1}^{(3)}$ with a negative(−) co-phase. [D: $1^{st}$ col ($W_{8i_1+8}^{(3)}$ with (+) co-phase), $2^{nd}$ col ($W_{8i_1}^{(3)}$ with (+) co-phase), $3^{rd}$ col ($W_{8i_1}^{(3)}$ with (−) co-phase)].

In the above-mentioned examples, two vectors for use in the codebook are one vector $W_{8i_1}^{(3)}$ and the other vector $W_{8i_1+8}^{(3)}$. In case of i2=0 and i2=2, the $W_{8i_1}^{(3)}$ vector is used for the first column. In case of i2=1 and i2=3, the $W_{8i_1+8}^{(3)}$ vector is used for the first column. In addition, in case of i2=0 and i2=1, two different vectors (i.e., $W_{8i_1}^{(3)}$ and $W_{8i_1+8}^{(3)}$ vectors) are applied to the second and third columns, such that orthogonality may be achieved between two columns. On the other hand, in case of i2=2 and i2=3, one vector (i.e., $W_{8i_1}^{(3)}$ or $W_{8i_1+8}^{(3)}$ vector) may be applied to the second and third columns, such that orthogonality may be obtained using different co-phase components (i.e., (+) and (−) co-phases).

When comparing one case of (i2=0, 1, 2, 3) at the Rank-3 codebook of Table 13 with the case of (i2=4, 5, 6, 7) at the Rank-3 codebook of Table 13, it can be recognized that constituent vectors of the codebook are different from each other. That is, in association with the case of (i2=0, 1, 2, 3), $W_{8i_1}^{(3)}$ and $W_{8i_1+8}^{(3)}$ vectors are used. In association with the other case of (i2=4, 5, 6, 7), $W_{8i_1+2}^{(3)}$ and $W_{8i_1+10}^{(3)}$ vectors are used.

By means of the above-mentioned types (Type-A, Type-B, Type-C, and Type-D), a Rank-3 codebook generation matrix may also be represented by the following Table 29.

TABLE 29

| I1 | 0<br>A | 1<br>B | 2<br>C | 3<br>D | 4<br>A | 5<br>B | 6<br>C | 7<br>D | 8<br>A | 9<br>B | 10<br>C | 11<br>D | 12<br>A | 13<br>B | 14<br>C | 15<br>D |
|---|---|---|---|---|---|---|---|---|---|---|---|---|---|---|---|---|
| 0 | $W_{8i_1}^{(3)}$, | $W_{8i_1+8}^{(3)}$ | | | $W_{8i_1+2}^{(3)}$, | $W_{8i_1+10}^{(3)}$ | | | $W_{8i_1+4}^{(3)}$, | $W_{8i_1+12}^{(3)}$ | | | $W_{8i_1+6}^{(3)}$, | $W_{8i_1+14}^{(3)}$ | | |
| 1 | $W_{8i_1+8}^{(3)}$, | $W_{8i_1+16}^{(3)}$ | | | $W_{8i_1+10}^{(3)}$, | $W_{8i_1+18}^{(3)}$ | | | $W_{8i_1+12}^{(3)}$, | $W_{8i_1+20}^{(3)}$ | | | $W_{8i_1+14}^{(3)}$, | $W_{8i_1+22}^{(3)}$ | | |
| 2 | $W_{8i_1+16}^{(3)}$, | $W_{8i_1+24}^{(3)}$ | | | $W_{8i_1+18}^{(3)}$, | $W_{8i_1+26}^{(3)}$ | | | $W_{8i_1+20}^{(3)}$, | $W_{8i_1+28}^{(3)}$ | | | $W_{8i_1+22}^{(3)}$, | $W_{8i_1+30}^{(3)}$ | | |
| 3 | $W_{8i_1+24}^{(3)}$, | $W_{8i_1}^{(3)}$ | | | $W_{8i_1+26}^{(3)}$, | $W_{8i_1+2}^{(3)}$ | | | $W_{8i_1+28}^{(3)}$, | $W_{8i_1+4}^{(3)}$ | | | $W_{8i_1+30}^{(3)}$, | $W_{8i_1+6}^{(3)}$ | | |

As a method for reducing the size of bits requisite for codebook indication, the sub-sampling application may be used.

For example, 2 indication bits constructing the Rank-3 codebook may be reduced to exemplary bits shown in Table 30.

TABLE 30

| I1 | I2 | Total bit size |
|---|---|---|
| 2 | 4 | 6 |
| 1 | 4 | 5 |
| 2 | 3 | 5 |
| 0 | 4 | 4 |
| 1 | 3 | 4 |
| 2 | 2 | 4 |

In order to allow the entire bit size for codebook indication to be composed of 4 bits, three schemes (i.e., i1+i2=0+4, 1+3, 2+2) may be used as necessary. From among the three schemes, if 'i1' is composed of 0 bit, namely, if 'i1' is composed of one element, beam resolution is deteriorated, resulting in a reduction in performance or throughout. Next, the remaining schemes other than the scheme of using 'i1' composed of 0 bit will hereinafter be described in detail.

First, various methods for constructing the i1 subset and the i2 subset on the condition that one bit (1 bit) is assigned to 'i1' and 3 bits are assigned to 'i2' will hereinafter be described.

In case of selecting/using the subset from among all indexes of i1 and i2, the element of codebook capable of being generated according to which index is selected is changed to another element, such that it is preferable that indexes be properly selected to construct a high-performance codebook.

If i1 is composed of 1 bit, two indexes may be selected from among several indexes (0, 1, 2, 3) of the i1 composed of 1 bit. The number of vectors capable of being used as constituent elements of the codebook is set to 12 or 16 according to which index is selected from among indexes (0, 1, 2, 3) of the i1. For example, provided that (0, 1) may be selected from among indexes (0, 1, 2, 3) of the i1, 12 vectors of $W_{8i_1+m}^{(3)}$ (m=0, 2, 4, 6, 8, 10, 12, 14, 16, 18, 20, 22) may be used. In another example, provided that (0, 2) may be selected from among indexes (0, 1, 2, 3) of the i1, 16 vectors of $W_{8i_1+m}^{(3)}$ (m=0, 2, 4, 6, 8, 10, 12, 14, 16, 18, 20, 22, 24, 26, 28, 30) may be used. That is, if i1 is set to (0, 1) [i.e., i1=(0, 1)], duplicated or overlapped vectors may be applied to each of i1=0 and i1=1. If i1 is set to (0, 2) [i.e., i1=(0, 2)], different vectors may be applied to each of i1=0 and i1=2. Therefore, it is preferable that i1=(0, 2) be used from the viewpoint of beam resolution.

On the other hand, if i2 is assigned 3 bits, 8 indexes may be selected from among 16 i2 indexes from 0 to 15. A first method for selecting 8 indexes is designed to select the i2 index including various vectors so as to increase beam resolution. A second method for selecting 8 indexes performs index selection to include all of four types (Type-A, Type-B, Type-C, Type-D) constructing a Rank-3 element.

For example, the first method selects two groups from among four i2-index groups [(0, 1, 2, 3), (4, 5, 6, 7), (8, 9, 10, 11), (12, 13, 14, 15)] such that it may use 8 indexes. For example, provided that 8 indexes [(0, 2), (4, 6), (8, 10), (12, 14)] are selected as the i2 index, Rank-3 codebook elements based on Type-A and Type-C may be generated using 8 vectors. In another example, provided that 8 indexes [(1, 3), (5, 7), (9, 11), (13, 15)] are selected as the i2 indexes, Rank-3 codebook elements based on Type-B and Type-D may be generated using 8 vectors.

For example, the second method may select two groups from among four groups [(0, 1, 2, 3), (4, 5, 6, 7), (8, 9, 10, 11), (12, 13, 14, 15)] such that it may use 8 indexes. In case of the matrix constructing a Rank-3 codebook, +1 and −1 may be used as co-phase components. In addition, there are vectors capable of forming 8 Tx DFT vectors by co-phase components. For example, provided that (+1) is used as the co-phase element in case of vectors numbered 0, 8, 16 and 24, 8 Tx DFT vectors may be formed. In another example, provided that (−1) is used as the co-phase element in case of vectors numbered 4, 14, 20 and 28, 8 Tx DFT vectors may be formed. Considering the co-polarized antenna structure, the use of 8 Tx DFT vectors may achieve high throughput or performance.

Since the co-phase components used in the matrix constructing the Rank-3 codebook are set to (+1) and (−1), it is preferable that the i2 index be selected to include Nos. 0, 8, 16, 4, 14, 20, and 28 vectors capable of forming the 8Tx DFT vector using the above-mentioned co-phase components. For example, (0, 1, 2, 3) and (8, 9, 10, 11) may be selected as the i2 indexes.

Next, in the case where 2 bits are assigned to 'i1' and 2 bits are selected to 'i2', various methods for constructing the i2 subset will hereinafter be described in detail. Since i1 includes Nos. 0, 1, 2 and 3 indexes, all indexes can be represented through 2 bits.

For example, in order to select the subset of the i2 index when the i2 indexes 0 to 15 are classified into four groups [(0, 1, 2, 3), (4, 5, 6, 7), (8, 9, 10, 11), and (12, 13, 14, 15)], one group is selected from among the four groups so that four elements of the corresponding group may be used. One index is selected from among each of the four groups such that four elements may be configured. Alternatively, two groups are selected from among four groups, and two indexes are selected from among the selected group such that four elements may be configured.

The number of cases, each of which can selectively use two of four types (Type-A, Type-B, Type-C, and Type-D) constructing the Rank-3 codebook element, is set to 6, respective cases are (A, B), (A, C), (A, D), (B, C), (B, D), and (C, D).

In addition, the number of cases, each of which can selectively use two of four groups of the i2 index, is set to 6. If the frontmost vector from among the i2 index groups refers to the corresponding group, respective groups may be represented by Nos. 0, 4, 8, and 12 groups. Respective cases, each of which selects two of four groups, are (0, 4), (0, 8), (0, 12), (4, 8), (4, 12), and (8, 12).

As a combination of six cases about a method for constructing the Rank-3 codebook element and six cases about a method for selecting a vector group, a method for constructing subsets of a total of 36 i2 indexes is achieved.

According to the above-mentioned examples, in the case where, in association with the Rank-3 codebook, one bit is assigned to 'i1' and 3 bits are assigned to 'i2', and 2 bits are assigned to 'i1' and 2 bits are assigned to 'i2', examples constructing the i2 and i2 subsets may be represented by the following Table 31.

TABLE 31

| i1<br>Bit (index) | i2<br>Bit (index) |
| --- | --- |
| 1 (0, 1) | 3 (0, 2) (4, 6) (8, 10) (12, 14) |
| 1 (0, 1) | 3 (1, 3) (5, 7) (9, 11) (13, 1 5) |
| 1 (0, 1) | 3 (0, 1) (4, 5) (8, 9) (12, 13) |
| 1 (0, 1) | 3 (2, 3) (6, 7) (10, 11) (14, 15) |
| 1 (0, 1) | 3 (0, 1, 2, 3) (8, 9, 10, 11) |
| 1 (0, 1) | 3 (0, 1, 2, 3) (4, 5, 6, 7) |
| 1 (0, 1) | 3 (4, 5, 6, 7) (12, 13, 14, 15) |
| 1 (0, 2) | 3 (0, 2) (4, 6) (8, 10) (12, 14) |
| 1 (0, 2) | 3 (1, 3) (5, 7) (9, 11) (13, 15) |
| 1 (0, 2) | 3 (0, 1) (4, 5) (8, 9) (12, 13) |
| 1 (0, 2) | 3 (2, 3) (6, 7) (10, 11) (14, 15) |
| 1 (0, 2) | 3 (0, 1, 2, 3) (8, 9, 10, 11) |
| 1 (0, 2) | 3 (0, 1, 2, 3) (4, 5, 6, 7) |
| 1 (0, 2) | 3 (4, 5, 6, 7) (12, 13, 14, 15) |
| 2 (0, 1, 2, 3) | 2 (0, 1, 2, 3) |
| 2 (0, 1, 2, 3) | 2 (4, 5, 6, 7) |
| 2 (0, 1, 2, 3) | 2 (8, 9, 10, 11) |
| 2 (0, 1, 2, 3) | 2 (12, 13, 14, 15) |
| 2 (0, 1, 2, 3) | 2 (0, 4, 8, 12) |
| 2 (0, 1, 2, 3) | 2 (1, 5, 9, 13) |
| 2 (0, 1, 2, 3) | 2 (2, 6, 10, 14) |
| 2 (0, 1, 2, 3) | 2 (3, 7, 11, 15) |
| 2 (0, 1, 2, 3) | 2 (0, 2, 4, 6) |
| 2 (0, 1, 2, 3) | 2 (0, 2, 8, 9) |
| 2 (0, 1, 2, 3) | 2 (1, 3, 5, 7) |
| 2 (0, 1, 2, 3) | 2 (1, 3, 10, 11) |

Even in the case where the Rank-4 codebook is configured, the following subsampling may be used. For example, two indicators (i1 and i2) constructing the above-mentioned Rank-3 codebook may be reduced as shown in the following Table 32.

TABLE 32

| I1 | I2 | Total bit size |
| --- | --- | --- |
| 2 | 3 | 5 |
| 1 | 3 | 4 |
| 2 | 2 | 4 |

In association with the Rank-4 codebook, the subsets of the i1 and i2 indexes can be selected in a similar way to the scheme for selecting the subset from among the above-mentioned Rank-3 codebook. The same parts may herein be omitted for convenience and clarity of description.

In the Rank-4 codebook, in case that one bit is assigned to 'i1' and 3 bits are assigned to 'i2', and in another case that 2 bits are assigned to 'i1' and 2 bits are assigned to 'i2', examples for constructing the i2 subset and the i2 subset can be represented by the following Table 33.

TABLE 33

| i1<br>Bit (index) | i2<br>Bit (index) |
| --- | --- |
| 1 (0, 1) | 3 |
| 1 (0, 2) | 3 |
| 2 (0, 1, 2, 3) | 2 (0, 1, 2, 3) |
| 2 (0, 1, 2, 3) | 2 (4, 5, 6, 7) |
| 2 (0, 1, 2, 3) | 2 (0, 1, 4, 5) |
| 2 (0, 1, 2, 3) | 2 (2, 3, 6, 7) |
| 2 (0, 1, 2, 3) | 2 (0, 2, 4, 6) |
| 2 (0, 1, 2, 3) | 2 (1, 3, 5, 7) |

On the other hand, the selected codebook subset may be used to report PUSCH. For example, during the mode for reporting a PMI for each subband as shown in the PUSCH report mode 1-2, the i1 and i2 subsets may be used to reduce PMI feedback overhead. In this case, in association with 'i1', one index may be reported at WB, and in association with 'i2', indexes for each SB may be reported.

In addition, the 3GPP LTE Release-10 system may use a specific mode for reporting SB CQI and SB PMI as a new PUSCH report mode. Even in the above-mentioned report mode, the codebook subset may be used to reduce the number of report bits for indicating the codebook. In this case, in association with 'i1', one index may be reported at WB, and in association with 'i2', indexes for each SB may be reported.

Exemplary PUCCH Report Modes

First of all, during periodic CQI/PMI/RI transmission, CQI, CQI/PMI, preferred subband selection and CQI information may be calculated on the basis of the last reported periodic RI, and subband selection and a CQI value may be calculated on the basis of the last reported periodic WB PMI and RI. In addition, two precoder indexes (I1 and I2) may be reported at different time points or at the same time point. Considering the above-mentioned situation, for example, the report modes shown in Table 34 may be considered for feedback information transmission.

TABLE 34

| | | T1 | T2 | T3 |
| --- | --- | --- | --- | --- |
| Mode 1-1-1 | | (RI + I1)_WB | (I2 + CQI)_WB | |
| Mode 1-1-2 | | (RI)_WB | (I1 + I2 + CQI)_WB | |
| Mode 2-1 | Mode 2-1(1) | (RI + PTI(0)) | (I1)_WB | (I2 + CQI)_WB |
| | Mode 2-1(2) | (RI + PTI(1)) | (I2 + CQI)_WB | (I2 + CQI)_SB |

In Table 34, I1 and I2 may indicate indexes of the codebook composed of precoder elements, and PTI may indicate a precoder type indication bit.

In Mode 1-1-1 shown in Table 34, the precoder index I1 may indicate a precoder index that is calculated/selected on the basis of RI transmitted in a current subframe. The precoder index I2 may indicate a precoder index that is calculated/selected on the basis of the last reported RI and the last reported I1. CQI may indicate a value that is calculated on the basis of the last reported RI, the last reported I1, and the current reported I2.

In Mode 1-1-2 shown in Table 34, the precoder indexes I1 and I2 may indicate prcoder indexes that are calculated/selected on the basis of the last reported RI. CQI may indicate a value that is calculated on the basis of the last reported RI and the current reported I1 and I2.

In Mode 2-1(1) shown in Table 34, the precoder index I1 may indicate a precoder index that is calculated/selected on the basis of the last reported RI. The precoder index I2 may indicate a precoder index that is calculated/selected on the basis of the last reported RI and the last reported I1. CQI may indicate a value that is calculated on the basis of the last reported RI, the last reported I1 and the current reported I2. When (I1) and (I2+CQI) are reported between (RI+PTI) transmission cycles, (I1) may be reported only once and (I2+CQI) may be reported several times. Alternatively, when (I1) and (I2+CQI) are reported between (RI+PTI) transmission cycles, (I1) may be reported two times and (I2+CQI) may be reported several times. In another example, (I1) may be successively reported as necessary, or (I1) and (I2+CQI) may be alternately reported. Otherwise, (I1) may be reported just after the (RI+PTI) report time, or may be reported just before the next (RI+PTI) report time.

In Mode 2-1(2) shown in Table 34, the precoder index I2 may indicate a precoder index that is calculated/selected on the basis of the last reported RI. The precoder index I2 may indicate a precoder index that is calculated/selected on the basis of the last reported RI and the last reported I1. SB CQI and SB I2 may indicate a value and index calculated/selected on the basis of the last reported RI and the last reported I1.

Mode 2-1 shown in Table 34 will hereinafter be described in detail.

Mode 2-1 [Mode 2-1(1) and Mode 2-1(2)] shown in Table 34 may correspond to a report mode configured in an extended form of the PUCCH report mode 2-1 shown in Table 5. The PUCCH report mode 201 shown in Table 5 may be a PUCCH report mode defined in the 3GPP LTE Release-8/9 system, and is defined as a mode for reporting WB PMI/CQI and SB CQI. In this case, SB CQI may be a CQI of an SB selected from among a BP. The term "BP" may indicate the subset of the system bandwidth. BP defined in the system bandwidth is cyclically selected in the order of time such that a CQI of the BP can be reported and a plurality of SB CQIs can also be reported. In other words, RI/PMI/CQI can be reported in the same time order of (RI)→(WB PMI/CQI)→(SB CQI at first BP)→(SB CQI at second BP)→ . . . →(SB CQI at n-th BP). In this case, if the report cycle and offset of PMI/CQI are determined through RRC signaling, WB PMI/CQI and SB CQI may be reported in response to the set report cycle. RI may be established to have a cycle corresponding to an integer multiple on the basis of the report cycle of WB PMI/CQI. Compared to WB PMI/CQI transmission time, RI may be reported prior to a subframe corresponding to the set offset using the offset indicator.

For the PUCCH report mode for use in the system (e.g., 3GPP LTE Release-9 system) supporting the extended antenna structure, the extended report mode of the PUCCH report mode 2-1 shown in Table 5 may be defined.

As the CQI/PMI/RI feedback types of the PUCCH report mode for use in the 3GPP LTE Release-8/9 system, four feedback types (Type-1, Type-2, Type-3, Type-4) may be defined. Type-1 is a CQI feedback for a UE-selected subband, Type-2 is a WB CQI feedback and a WB PMI feedback, Type-3 is an RI feedback, and Type-4 is a WB CQI feedback. Similar to the above-mentioned four types, four CQI/PMI/RI feedback types for use in the PUCCH report mode of the 3GPP LTE Release-10 system may be defined. For example, Report Type 1 is an RI/PTI feedback, Report Type 2 is a WB I1 feedback, Report Type 3 is a WB I1/CQI feedback, and Report Type 4 is an SB I2/CQI feedback. According to the Type-1 PTI setup, a report type may be decided. For example, if Type-1 PTI is set to zero (PTI=0), Type-1, Type-2 and Type-3 may be used for such report. If Type-1 PTI is set to 1 (PTI=1), Type-1, Type-3 and Type-4 may be used for such report. Accordingly, Mode 2-1(1) and Mode 2-1(2) shown in Table 34 may be defined.

If the precoder element is indicated using one precoder index in the same manner as in 2Tx antenna transmission or 4Tx antenna transmission, PTI is always set to 1, such that Type-1, Type-3, and Type-4 may be used for the report. Differently from the report scheme for use in the 3GPP LTE Release-8/9 system, SB PMI/CQI may be transmitted at Type-4. In order to enable Type-4 transmission for the 3GPP LTE Release-10 system to operate similarly to the 3GPP LTE Release-8/9 system, one or more BPs within the system bandwidth may be cyclically reported, and PMI/CQI for a preferred SB within BP(s) may be reported. In this case, the Type-3 or Type-4 report cycle may be determined in the same manner as in the PMI/CQI cycle setup of the 3GPP LTE Release-8/9 system. For example, Type-3 and Type-4 may be reported according to a cycle set for PMI/CQI. In addition, a cycle for Type-1 can also be determined in the same manner as in an RI cycle setup for the 3GPP LTE Release-8/9 system. For example, the Type-1 report cycle may be denoted by an integer multiple of the Type-3 report cycle. In addition, an offset value may be established in such a manner that Type-1 can be transmitted at a subframe located before a Type-3 report subframe by a predetermined distance corresponding to a predetermined number of subframes.

On the other hand, when the precoder element is indicated using two precoder indexes as in 8Tx antenna transmission, (Type 1-Type 2-Type 3) or (Type 1-Type 3-Type 4) may be reported according to the PTI value. When the set of two feedback types is selected according to the PTI value, the report cycle for individual feedback types must be decided.

Subsampling of PUCCH report modes will hereinafter be described in detail. PUCCH Report Mode-A and PUCCH Report Mode-B corresponding to the extended version of PUCCH Report Mode 1-1 will hereinafter be described.

In the case where no codebook sampling is applied to PUCCH Report Mode-A and PUCCH Report Mode-B, feedback overhead (i.e., the number of requested bits) for report types may be summarized according to Rank values as shown in Table 35.

TABLE 35

| | PUCCH Mode-A | | PUCCH Mode-B | |
|---|---|---|---|---|
| | Type-5 | | | |
| Rank | reporting (Joint of RI and W1) | Type-2a reporting (W2 + CQI) | Type-3 reporting (RI) | Type-2b reporting (W1 + W2 + CQI) |
| 1 | 6 | 8 (4 + 4) | 3 | 12 (4 + 4 + 4) |
| 2 | | 11 (4 + [4 + 3]) | | 15 (4 + 4 + [4 + 3]) |
| 3 | | 11 (4 + [4 + 3]) | | 13 (2 + 4 + [4 + 3]) |
| 4 | | 10 (3 + [4 + 3]) | | 12 (2 + 3 + [4 + 3]) |
| 5 | | 7 (0 + [4 + 3]) | | 9 (2 + 0 + [4 + 3]) |
| 6 | | 7 (0 + [4 + 3]) | | 9 (2 + 0 + [4 + 3]) |
| 7 | | 7 (0 + [4 + 3]) | | 9 (2 + 0 + [4 + 3]) |
| 8 | | 7 (0 + [4 + 3]) | | 7 (0 + 0 + [4 + 3]) |

In Table 35, some Type-2 Reports for PUCCH Mode-B exceed 11 bits, such that they can also exceed the limitation of PUCCH transmission bit. Therefore, codebook subsampling may be applied to Type-2 Report at PUCCH Mode-B as shown in Table 36.

TABLE 36

PUCCH Mode-B

| Rank | Type-3 reporting RI | Type-2b reporting (W1 + W2 + CQI) | | |
|---|---|---|---|---|
| 1 | 3 | 11 (4 + 3 + 4) | W1: All, W2: 0~7 | 32 PSK DFT vector (no overlapped) QPSK co-phasing |
| 2 | | 11 (3 + 1 + [4 + 3]) | W1: 2n(n: 0~7), W2: 0, 4 | 16 PSK DFT vector (no overlapped) BPSK co-phasing |
| 3 | | 11 (1 + 3 + [4 + 3]) | W1: 0, 2, W2: 2m(m: 0~7) | 16 PSK DFT vector (no overlapped) Two types of W(3) |
| 4 | | 11 (1 + 3 + [4 + 3]) | W1: 0, 2, W2: All | 16 PSK DFT vector (no overlapped) QPSK co-phasing |
| 5 | | 9 (2 + 0 + [4 + 3]) | W1: All | 16 PSK DFT vector (no overlapped) BPSK co-phasing |
| 6 | | 9 (2 + 0 + [4 + 3]) | W1: All | 16 PSK DFT vector (no overlapped) BPSK co-phasing |
| 7 | | 9 (2 + 0 + [4 + 3]) | W1: All | 16 PSK DFT vector (no overlapped) BPSK co-phasing |
| 8 | | 7 (0 + 0 + [4 + 3]) | | QPSK DFT vector (no overlapped) BPSK co-phasing |

As can be seen from Table 35, Type-2a Report does not exceed 11 bits such that subsampling need not be used, and Type-5 Report may require bits, the number of which is double that of Type-3 Report. Since Type-5 and Type-3 Reports carry rank information, the Type-5 and Type-3 types should have robust reliability. In the case where rank information has high priority for PUCCH report and several types need to be reported in the same subframe, CQI and PMI may drop from the RI transmission subframe. Considering the above-mentioned problem, the codebook subsampling may also be applied to Type-3 Report so as to increase the reliability of rank feedback.

Applying the subsampling to Type-5 Report may be represented, for example, by Tables 37 to 40. Tables 37 and 38 show the exemplary cases of the maximum Rank-2. Table 39 shows the exemplary case of the maximum Rank-4. Table 40 shows the exemplary case of the maximum Rank-8.

TABLE 37

PUCCH Mode-A

| Rank | Type-5 reporting Joint of RI andW1 | Type-2a reporting (W2 + CQI) | | |
|---|---|---|---|---|
| 1 | 5 (1 + 4) | 8 (4 + 4) | W1: All, W2: All | non-overlapped 32 oversampled beam QPSK co-phasing |
| 2 | | 11 (4 + [4 + 3]) | | non-overlapped 32 oversampled beam QPSK co-phasing |

TABLE 38

PUCCH Mode-A

| Rank | Type-5 reporting Joint of RI andW1 | Type-2a reporting (W2 + CQI) | |
|---|---|---|---|
| 1 | 4 (log2(8 + 8)) | 8 (4 + 4) | W1: 2n (n: 0~7), W2: All |
| 2 | | 11 (4 + [4 + 3]) | |

TABLE 39

PUCCH Mode-A

| Rank | Type-5 reporting Joint of RI andW1 | Type-2a reporting (W2 + CQI) | | |
|---|---|---|---|---|
| 1 | 5 (2 + 3) | 8 (4 + 4) | W1: 2n (n: 0~7), W2: All | non-overlapped 32 oversampled beam QPSK co-phasing |
| 2 | | 11 (4 + [4 + 3]) | | non-overlapped 32 oversampled beam QPSK co-phasing |
| 3 | | 11 (4 + [4 + 3]) | | non-overlapped 16 oversampled beam Two types of W(3) |
| 4 | | 10 (3 + [4 + 3]) | W1: All, W2: All | non-overlapped 16 oversampled beam QPSK co-phasing |

TABLE 40

PUCCH Mode-A

| Rank | Type-5 reporting Joint of RI andW1 | Type-2a reporting (W2 + CQI) | | |
|---|---|---|---|---|
| 1 | 5 (3 + 2) | 8 (4 + 4) | W1: 4n (n: 0~3), W2: All | QPSK co-phasing |
| 2 | | 11 (4 + [4 + 3]) | | QPSK co-phasing |
| 3 | | 11 (4 + [4 + 3]) | W1: All, W2: All | 16 PSK DFT vector (overlapped) Two types of W(3) |
| 4 | | 10 (3 + [4 + 3]) | | 16 PSK DFT vector (no overlapped) QPSK co-phasing |
| 5 | | 7 (0 + [4 + 3]) | | 16 PSK DFT vector (no overlapped) BPSK co-phasing |
| 6 | | 7 (0 + [4 + 3]) | | 16 PSK DFT vector (no overlapped) BPSK co-phasing |
| 7 | | 7 (0 + [4 + 3]) | | 16 PSK DFT vector (no overlapped) BPSK co-phasing |
| 8 | | 7 (0 + [4 + 3]) | | QPSK DFT vector (no overlapped) BPSK co-phasing |

In the example of Table 37, Type-5 bits for RI may be fixed to 5 bits, and W1 may be used as the fullset, resulting in increased system performance or throughput.

In the example of Table 38, Type-5 bits for RI may be used as 4 bits, such that RI can be transmitted much more robustly than the example of Table 36. On the other hand, since the subsampled W1 instead of the fullset of W1 is used, system performance or throughput of Table 38 is lower than that of Table 36. Meanwhile, as can be seen from Tables 38, 39 and 40, W1 and W2 of Rank-1 are identical to those of Rank-2 irrespective of the maximum rank, resulting in the implementation of nested characteristics.

Compared to the above-mentioned PUCCH Mode-A and PUCCH Mode-B, co-phase property can be maintained by the codebook subsampling for the PUCCH Mode-A, and at the same time beam granularity can be reduced. On the other hand, while more precise beam granularity than PUCCH Mode-A is provided by the codebook subsampling for PUCCH Mode-B, the co-phase property is unavoidably deteriorated.

PUCCH Report Mode-C corresponding to the extended version of the legacy PUCCH report mode 2-1 will hereinafter be described in detail.

Feedback overhead (the number of feedback bits) requested for PUCCH Mode-C can be represented by the following Table 41.

TABLE 41

| | PUCCH Mode-C (PTI = 0) | | | PUCCH Mode-C (PTI = 1) | | |
|---|---|---|---|---|---|---|
| Rank | Type-6 reporting (RI + PTI) | Type-7 reporting W1 | Type-2a reporting (wb-W2 + CQI) | Type-6 reporting (RI + PTI) | Type-2a reporting (wb-W2 + wb-CQ1) | Type-8 reporting (sb-W2 + sb-CQI + L-bit) |
| 1 | 4 (3 + 1) | 4 | 8 (4 + 4) | 4 (3 + 1) | 8 (4 + 4) | 10 (4 + 4 + 2) |
| 2 | | 4 | 11 (4 + [4 + 3]) | | 11 (4 + [4 + 3]) | 13 (4 + [4 + 3] + 2) |
| 3 | | 2 | 11 (4 + [4 + 3]) | | 11 (4 + [4 + 3]) | 13 (4 + [4 + 3] + 2) |
| 4 | | 2 | 10 (3 + [4 + 3]) | | 10 (3 + [4 + 3]) | 12 (3 + [4 + 3] + 2) |
| 5 | | 2 | 7 (0 + [4 + 3]) | | 7 (0 + [4 + 3]) | 9 (0 + [4 + 3] + 2) |
| 6 | | 2 | 7 (0 + [4 + 3]) | | 7 (0 + [4 + 3]) | 9 (0 + [4 + 3] + 2) |
| 7 | | 2 | 7 (0 + [4 + 3]) | | 7 (0 + [4 + 3]) | 9 (0 + [4 + 3] + 2) |
| 8 | | 2 | 7 (0 + [4 + 3]) | | 7 (0 + [4 + 3]) | 9 (0 + [4 + 3] + 2) |

As can be seen from Table 41, if PTI is set to 1 (i.e., PTI=1) for Type-6 Report, bits required for Type-8 Report at Ranks 2 to 4 exceed 11 bits, such that the codebook subsampling may be applied to the exceeded bits. The principle similar to that of the codebook subsampling used for the above-mentioned PUCCH Mode-B may be applied to W2 of Type-8. In addition, as shown in Table 41, RI feedback reliability of PUCCH Mode-C may be lower than that of the above-mentioned PUCCH Mode-B because of the PTI indication of one bit. In addition, the duty cycle of the W1 report is longer than the duty cycle of RI. Considering this property, the report time points and priorities of the reported types may be determined.

Embodiment 3

Embodiment 3 shows the codebook subsampling method that is capable of being applied to PUCCH report modes. As the extended version of the legacy PUCCH report mode of the system (e.g., 3GPP LTE Release-10 system) supporting the extended antenna structure, three PUCCH report modes [(Mode 1-1-1, Mode 1-1-2, Mode 2-1) or (Mode-A, Mode-B, Mode-C)] shown in Table 39 may be applied.

Mode 1-1-1 reports the joint coded RI and I1, and reports the wideband CQI and the wideband I2. Mode 1-1-2 is a mode for transmitting (RI)_WB and (I1+I2+CQI)_WB. Mode 2-1 may transmit different feedback information. If PTI is set to zero (PTI=0), (RI+PTI(0)), (I1)_WB, and (I2+CQI)_WB may be transmitted. If PTI is set to 1 (PTI=1), (RI+PTI(1)), (I2+CQI)_WB, and (I2+CQI)_SB can be transmitted. On the other hand, in the present embodiments, two precoder indexes I1 and I2 may also be represented by W1 and W2, respectively.

A method for implementing report bandwidth optimization by applying the codebook subsampling to each PUCCH report mode and at the same time maintaining the PUCCH feedback coverage as in the legacy 3GPP LTE Release-8/9 will hereinafter be described in detail.

Signaling overhead requested for PUCCH Report Modes 1-1-1 and 1-1-2 are shown in Table 35. In Table 35, Mode-A corresponds to PUCCH Report Mode 1-1-1, and Mode-B corresponds to PUCCH Report Mode 1-1-2.

As can be seen from Table 35, 6 bits are needed for Type-5 (joint coded RI and WI) at PUCCH Report Mode 1-1-1. Since 6 bits are assigned to RI and WI because of the joint-coded RI and WI, coverage for RI transmission is greatly lower than that of the legacy 3GPP LTE Release-8 system. As a result, RI detection failure or performance deterioration may be encountered. Therefore, WI subsampling may be used to increase RI coverage. In Mode 1-1-1, Type-2a (W2 and CQI) Report may be more frequently updated than Type-5 Report, such that it can be recognized that Type-2a need not always be protected. Therefore, in so far as the reported bandwidth does not exceed the size of one bit, W2 sampling need not be used.

In PUCCH Report Mode 1-1-2, RI is not joint-coded with other CSI information, such that RI coverage can be maintained in the same manner as in the legacy 3GPP LTE Release-8 system. However, as shown in Table 39, in case of Rank-1, Rank-2, Rank-3, and Rank-4, signaling overhead exceeding 11 bits are required for Type-2b (W1+W2+CQI) Report. Therefore, in order to reuse PUCCH format 2 of the 3GPP LTE Release-8 system, codebook sampling is needed.

First, the subsampling method capable of being applied to PUCCH Report Mode 1-1-1 will hereinafter be described in detail.

W1 candidates may be different in number according to transmission ranks. That is, as shown in Tables 11 to 18, the number of W1 candidates may be set to 16, 16, 4, 4, 4, 4, 4, and 1 for Ranks 1 to 8, respectively. If RI and W1 are joint-coded and reported, the requested signaling overhead is denoted by 6 bits (=ceiling(log 2(53))). In order to extend the RI coverage, signaling overhead may be reduced to 4 or 5 bits through W1 subsampling. Examples of the W1 subsampling are shown in the following Table 42.

TABLE 42

| | Alternative | W1 |
|---|---|---|
| Alt-1 | Rank-1 and 2 | 8 elements for each rank: (0, 2, 4, 6, 8, 10, 12, 14) |
| | Rank-3 and 4 | 4 elements for each rank: (0, 1, 2, 3) |
| | Rank-5, 6 and 7 | 2 elements for each rank: (0, 1) |
| | Rank-8 | 1 element: (0) |
| | Total number of element | 31 elements (5 bit) |
| Alt-2 | Rank-1 and 2 | 4 elements for each rank: (0, 4, 8, 12) |
| | Rank-3 and 4 | 2 elements for each rank: (0, 2) |
| | Rank-5, 6, 7 and 8 | 1 elements for each rank: (0) |

TABLE 42-continued

| Alternative | W1 |
|---|---|
| Total number of element | 16 elements (4 bit) |

In the dual-stage codebook structure, overlapped beams are present between beam groups. As can be seen from the Alt-1 scheme of Table 42, although subsampling is applied to W1 by excluding only the odd W1 values from the codebook, all the beams of the codebook can be maintained. However, W1 and W2 for constructing the entire codebook are transmitted from other subframes, such that performance deterioration may occur as compared to the use of the entire codebook to which no subsampling is applied. Meanwhile, as can be seen from the Alt-2 scheme of Table 42, if subsampling capable of excluding many more beams from the codebook is applied, it is impossible to use some beams of the codebook differently from the Alt-1 scheme in which all beams of the codebook can be maintained, resulting in the occurrence of performance deterioration.

Table 43 shows, in the 8×2 SU-MIMO transmission, the system level performance of PUCCH Report Mode 1-1-1 based on the codebook subsampling application. Table 43 shows that, under the condition that (4+4) is used as W1 and W2 bits for Rank-1 and Rank-2 and the Alt-1 and Alt-2 schemes are applied thereto, an average spectral efficiency (SE) and a cell-edge SE for a cross-polarized antenna structure and a co-polarized antenna structure. While the Alt-1 scheme of Table 43 generates marginal performance deterioration in all of the average SE and the cell-edge SE, the Alt-2 scheme generates relatively high performance deterioration in the cell-edge SE.

TABLE 43

| | Cross-polarized (4 λ) Antenna | | Co-polarized (0.5 λ) Antenna | |
|---|---|---|---|---|
| Feedback information (W1 + W2 for rank-1, W1 + W2 for rank-2) | Average SE (bps/Hz) | Cell Edge SE (bps/Hz) | Average SE (bps/Hz) | Cell Edge SE (bps/Hz) |
| Reference (4 + 4, 4 + 4) | 1.63 (0.00%) | 0.0436 (0.00%) | 1.72 (0.00%) | 0.0730 (0.00%) |
| Alt-1 (3 + 4, 3 + 4) | 1.59 (−2.00%) | 0.0436 (0.00%) | 1.71 (−1.00%) | 0.0730 (0.00%) |
| Alt-2 (2 + 4, 2 + 4) | 1.59 (−2.00%) | 0.0404 (−7.00%) | 1.68 (−2.00%) | 0.0714 (−2.00%) |

As can be seen from Table 43, while the subsampled codebook of 5 bits maintains system performance, the other subsampled codebook of 4 bits reduces the system performance by a predetermined amount corresponding to a maximum of 7%. Therefore, although RI coverage of the Alt-1 scheme is relatively lower than that of the Alt-2 scheme, the Alt-1 scheme is more preferable than the Alt-2 scheme from the viewpoint of system performance.

Hereinafter, the subsampling method capable of being applied to PUCCH Report Mode 1-1-2 will be described in detail.

In the (W1+W2+CQI) report of PUCCH Report Mode 1-1-2, W1 and W2 are reported in the same subframe. Therefore, subsampling may be used to maintain the report bandwidth of 11 bits or less. As described above, in case of the subsampling for reducing the W1 value by 1 bit (for example, in the case where 8 index subsets are selected from among 16 indexes), all the beams of the codebook can be maintained, such that system performance deterioration can be minimized. However, if the W1 value is subsampled by bits of more than 1 bit, a specific-directional beam group is excluded from the codebook, such that system performance may be greatly deteriorated. Therefore, it may be preferable that, in association with Rank-2 to Rank-4, 1-bit subsampling is performed at W1 and more bits are excluded at W2.

The following Table 44 shows exemplary subsampling methods capable of being applied to PUCCH Report Mode 1-1-2.

TABLE 44

| Alt | | W1 | W2 |
|---|---|---|---|
| Alt-1 | Rank1 | 3 bit: (0, 2, 4, 6, 8, 10, 12, 14) | 4 bit: (0, 1, 2, 3, 4, 5, 6, 7, 8, 9, 10, 11, 12, 13, 14, 15) |
| | Rank2 | 3 bit: (0, 2, 4, 6, 8, 10, 12, 14) | 1 bit: (0, 1) |
| | Rank3 | 1 bit: (0, 2) | 3 bit: (0, 2, 4, 6, 8, 10, 12, 14) |
| | Rank4 | 1 bit: (0, 2) | 3 bit: (0, 1, 2, 3, 4, 5, 6, 7) |
| | Rank5~7 | 2 bit | 0 bit |
| | Rank8 | 0 bit | 0 bit |
| Alt-2 | Rank1 | 3 bit: (0, 2, 4, 6, 8, 10, 12, 14) | 2 bit: (0, 1, 2, 3) |
| | Rank2 | 3 bit: (0, 2, 4, 6, 8, 10, 12, 14) | 1 bit: (0, 1) |
| | Rank3 | 1 bit: (0, 2) | 3 bit: (0, 2, 4, 6, 8, 10, 12, 14) |
| | Rank4 | 1 bit: (0, 2) | 3 bit: (0, 1, 2, 3, 4, 5, 6, 7) |
| | Rank5~7 | 2 bit | 0 bit |
| | Rank8 | 0 bit | 0 bit |

Referring to Table 44, according to the Alt-1 scheme and the Alt-2 scheme, only one bit is reduced at W1 for Rank-1 to Rank-4 so as to prevent all the beam groups from being lost. Therefore, W2 is subsampled according to the requested bandwidth.

Table 45 shows, in the 8×2 SU-MIMO transmission, the system level performance of PUCCH Report Mode 1-1-1 based on the codebook subsampling application. Table 45 shows that, under the condition that (4+4) is used as W1 and W2 bits for Rank-1 and Rank-2 and the Alt-1 and Alt-2 schemes are applied thereto, an average spectral efficiency (SE) and a cell-edge SE for a cross-polarized antenna structure and a co-polarized antenna structure.

TABLE 45

| | Cross-polarized (4 λ) Antenna | | Co-polarized (0.5 λ) Antenna | |
|---|---|---|---|---|
| Feedback information (W1 + W2 for rank-1, W1 + W2 for rank-2) | Average SE (bps/Hz) | Cell Edge SE (bps/Hz) | Average SE (bps/Hz) | Cell Edge SE (bps/Hz) |
| Reference (4 + 4, 4 + 4) | 1.63 (0.00%) | 0.0416 (0.00%) | 1.72 (0.00%) | 0.0736 (0.00%) |
| Alt-1 (3 + 4, 3 + 1) | 1.60 (−2.00%) | 0.0416 (0.00%) | 1.68 (−2.00%) | 0.0708 (−4.00%) |
| Alt-2 (3 + 2, 3 + 1) | 1.58 (−3.00%) | 0.0416 (0.00%) | 1.66 (−3.00%) | 0.0698 (−5.00%) |

As can be seen from Table 45, some steering vectors of 8 Tx antennas are excluded from W2 subsampling, such that performance deterioration of the co-polarized antenna structure is relatively larger than that of the cross-polarized antenna structure. On the other hand, there arises marginal performance deterioration in the cross-polarized antenna structure.

Therefore, it can be recognized that performance deterioration caused by the use of subsampled codebook under the condition that W1 subsampled by 3 bits is used can be accommodated. Therefore, it is preferable that the Alt-1 scheme is applied to PUCCH Report Mode 1-1-2.

Hereinafter, the subsampling scheme capable of being applied to PUCCH Report Mode 2-1 will be described in detail.

In PUCCH Report Mode 2-1, four report types [(RI+PTI), (W1)_WB, (W2+CQI)_WB, (W2+CQI)_SB] may be fed back. Each report type may be changed according to PTI selection. Table 41 shows signaling overhead required for each report type in case of PUCCH Mode 2-1 (denoted by Mode-C in Table 45). It is assumed that, in case of the (W2+CQI)_SB report at PTI=1, an L-bit indicator for a UE-selected subband is contained in Table 41.

In Table 41, in case of Rank-2, Rank-3, and Rank-3 on the condition that PTI=1 is indicated, overhead required for reporting the L-bit indicator for each of (W2+CQI)_SB and SB exceeds 11 bits. Associated signaling overhead must be reduced such that PUCCH Format 2 of the 3GPP LTE Release-8 can be reused. In order to reduce the signaling overhead, the following two methods (Option 1 and Option 2) can be used. Option 1 can newly define a predetermined SB cycling without using the selected band indicator of L bits. Option 2 performs W2 subsampling such that the L-bit selected band indicator can be reused.

In case of Option 1, SB CQI and SB W2 may be reported through PUCCH Format 2. However, according to Option 1, a CQI report cycle for each subband is increased, such that performance deterioration can be more sensitively generated at a time-selective channel using the predefined SB period. In addition, WB CQI and WB W2 should be reported between the periods of BP (Bandwidth Part) report duration, such that the CQI report cycle at each subband can be largely increased, resulting in increased performance deterioration.

In case of Option 2, SB CQI and SB W2 are reported along with the L-bit selected bandwidth indicator, such that the number of bits required for performing such report at Rank-2, Rank-3, and Rank-4 exceeds a specific value of 11. Therefore, W2 subsampling can be applied, and Table 46 shows the example of W2 subsampling.

TABLE 46

| Alternative | W2 |
|---|---|
| Rank-1 | 2 bit: (0, 1, 2, 3) |
| Rank-2 | 2 bit: (0, 1, 8, 9) |
| Rank-3 | 2 bit: (0, 2, 8, 10) |
| Rank-4 | 2 bit: (0, 1, 4, 5) |
| Rank-5~8 | 0 bit |

Table 47 shows, in the 8×2 SU-MIMO transmission, the system level performance of PUCCH Report Mode 2-1 for use in Option 1 and Option 2. Table 47 shows that, in case of two methods (Option 1 and Option 2), an average spectral efficiency (SE) and a cell-edge SE for a cross-polarized antenna structure and a co-polarized antenna structure. It is assumed that, in order to measure system performance, SB CQI and SB W2 are reported at every report cycle of 5 ms, and WB W1 is updated at intervals of 45 ms. In addition, it is assumed that 2-bit subsampled W2 is applied to Option 2.

TABLE 47

| | Cross-polarized (4 λ) Antenna | | Co-polarized (0.5 λ) Antenna | |
|---|---|---|---|---|
| Feedback information (W1 + W2 for rank-1) | Average SE (bps/Hz) | Cell Edge SE (bps/Hz) | Average SE (bps/Hz) | Cell Edge SE (bps/Hz) |
| Option-1: Predefined cycling (4 + 4) | 1.63 (0.00%) | 0.0472 (0.00%) | 2.24 (0.00%) | 0.0892 (0.00%) |
| Option-2: UE band selection with W2 subsampling (4 + 2) | 1.70 (4.00%) | 0.0480 (1.00%) | 2.30 (3.00%) | 0.0896 (0.00%) |

As can be seen from Table 47, the average SE of Option 1 is lower than that of Option 2 by a system performance deterioration of 3% to 4%, because the report operation period of WB CQI/WB W2 for Option 1 is longer than that of Option 2. For example, in the same manner as in the predefined SB cycling at the system bandwidth of 5 MHz, Option 1 reports CSIs of all subbands, such that the report cycle of WB CQI/WB W2 is longer than that of Option 2.

As described above, Option 2 has higher performance than Option 1, such that it is preferable that an L-bit indicator for a UE-selected band is included and W2 subsampling is applied to Option 2 in terms of system performance. In addition, the UE band selection function has already been used in the legacy system (3GPP LTE Release-8 system), such that complexity for Option 2 implementation is also reduced.

Therefore, according to the inventive codebook subsampling scheme applied to each PUCCH mode, the legacy PUCCH format 2 is reused and system performance deterioration can be minimized.

On the other hand, Table 48 shows parameters applied to simulation of system performances shown in Tables 43, 45, and 47. In addition, Tables 49, 50 and 51 show parameters applied to simulations of system performances of PUCCH Format 1-1-1, PUCCH Format 1-1-2, and PUCCH Format 2-1.

TABLE 48

| Parameter | Assumption |
|---|---|
| Number of cells | 57 |
| Deployment model | Hex grid, 3 sector sites |
| Inter site distance | 200 m |
| Average number of UEs per cell | 10 |
| Traffic model | Full buffer |
| UE speeds of interest | 3 km/h |
| Bandwidth | 5 MHz |
| Carrier frequency | 2.5 GHz |
| Control OFDM symbols per RB pair | 3 |
| Max number of HARQ retransmissions | 5 |
| Channel model | ITU Urban Micro |
| BS antenna configuration | Two closely spaced ±45° cross-poles with 0.5 λ separation ULA with 0.5 λ separation and vertical polarization |
| UE antenna configuration | 2 Rx: cross-polarized 0°/90°, 0.5 λ separation |
| Receiver | MMSE with no inter-cell interference suppression |
| Scheduler | Proportional fair in time and frequency |
| Channel estimation | Perfect channel estimation |
| Outer-loop link adaptation | Yes |
| Target BLER | 10% |
| Number of RBs per subband | 4 RBs |
| Number of Subband | 8 |
| Number of Bandwidth part | 2 |

TABLE 48-continued

| Parameter | Assumption |
|---|---|
| Frequency granularity for CQI reporting | 4 RBs |
| Feedback delay | 5 ms |
| Feedback codebook for 8Tx transmission | LTE-A 8Tx codebook |

TABLE 49

| | | |
|---|---|---|
| RI reporting periodicity | | 20 ms |
| CQI reporting periodicity/ frequency granularity | | 5 ms/Wideband |
| PMI reporting periodicity/ frequency granularity | W1 | 20 ms/Wideband |
| PMI reporting periodicity/ frequency granularity | W2 | 5 ms/Wideband |
| Transmission mode | | SU-MIMO (Rank adaptation - up to Rank-2) |

TABLE 50

| | | |
|---|---|---|
| RI reporting periodicity | | 20 ms |
| CQI reporting periodicity/ frequency granularity | | 5 ms/Wideband |
| PMI reporting periodicity/ frequency granularity | W1 | 5 ms/Wideband |
| PMI reporting periodicity/ frequency granularity | W2 | 5 ms/Wideband |
| Transmission mode | | SU-MIMO (Rank adaptation - up to Rank-2) |

TABLE 51

| | | |
|---|---|---|
| RI reporting periodicity | | 45 ms |
| CQI reporting periodicity/ frequency granularity | | 5 ms/Wideband |
| PMI reporting periodicity/ frequency granularity | W1 | 45 ms/Wideband |
| PMI reporting periodicity/ frequency granularity | W2 | 5 ms/Subband |
| Transmission mode | | MU-MIMO (Rank-1 per UE, Max 2-Layer pairing) ZF beamforming |
| Codebook subsampling | | For UE band selection, all codebook for W1 and subsampling for W2: 2 bit (0, 1, 2, 3) |

Embodiment 4

W1 and W1 subsampling methods capable of being applied to the case in which W1 and W2 are joint-coded will hereinafter be described in detail.

In PUCCH Report Mode 1-1-2 of Table 34, W1 and W2 are transmitted along with WB CQI. In Table 34, W1 and W2 are denoted by I1 and I2, respectively. In order to establish a feedback mode that can provide the same error generation probability as that of the legacy 3GPP LTE Release-8 PUCCH report scheme, the number of bits requisite for the precoder for each rank may be set to 4.

For example, the number of bits of W1 or W2 according to each rank may be determined as shown in Table 52. W1 and W2 indexes disclosed in Table 52 may respectively correspond to indexes (i1 and i2) of the codebook shown in Tables 11 to 14. Table 52 shows four examples of the W1 and W2 subsampling method.

TABLE 52

| | W1 | W2 |
|---|---|---|
| Rank-1 | 3 bit: {0, 2, 4, 6, 8, 10, 12, 14} | 1 bit: {0, 2} |
| Rank-2 | 3 bit: {0, 2, 4, 6, 8, 10, 12, 14} | 1 bit: {0, 1} |
| Rank-3 | 1 bit: {0, 2} | 3 bit: {0, 2, 4, 6, 8, 10, 12, 14} |
| Rank-4 | 1 bit: {0, 2} | 3 bit: {0, 1, 2, 3, 4, 5, 6, 7} |
| Rank-1 | 3 bit: {0, 2, 4, 6, 8, 10, 12, 14} | 1 bit: {0, 2} |
| Rank-2 | 3 bit: {0, 2, 4, 6, 8, 10, 12, 14} | 1 bit: {0, 1} |
| Rank-3 | 1 bit: {0, 2} | 3 bit: {2, 3, 6, 7, 10, 11, 14, 15} |
| Rank-4 | 1 bit: {0, 2} | 3 bit: {0, 1, 2, 3, 4, 5, 6, 7} |
| Rank-1 | 3 bit: {0, 2, 4, 6, 8, 10, 12, 14} | 1 bit: {0, 2} |
| Rank-2 | 3 bit: {0, 2, 4, 6, 8, 10, 12, 14} | 1 bit: {0, 1} |
| Rank-3 | 1 bit: {0, 2} | 3 bit: {0, 1, 2, 3, 8, 9, 10, 11} |
| Rank-4 | 1 bit: {0, 2} | 3 bit: {0, 1, 2, 3, 4, 5, 6, 7} |
| Rank-1 | 3 bit: {0, 2, 4, 6, 8, 10, 12, 14} | 1 bit: {0, 2} |
| Rank-2 | 3 bit: {0, 2, 4, 6, 8, 10, 12, 14} | 1 bit: {0, 1} |
| Rank-3 | 1 bit: {0, 2} | 3 bit: {2, 3, 4, 5, 10, 11, 12, 13} |
| Rank-4 | 1 bit: {0, 2} | 3 bit: {0, 1, 2, 3, 4, 5, 6, 7} |

Embodiment 5

Embodiment 5 shows the W2 subsampling method capable of being applied to PUCCH Report Mode 2-1.

In PUCCH Report Mode 2-1 of Table 34, if PTI is set to 1 (PTI=1) and SB CQI is transmitted, the SB CQI can be selected in a bandwidth part (BP). That is, WB CQI and WB W2 are reported at a first report time, and the selected SB CQI and the selected band index and SB W2 are reported within a certain BP of the second report time. In Table 38, W1 and W2 are denoted by I1 and I2, respectively. At a third report time, SB CQI selected in a BP different from that of the second report time, the selected band index and SB W2 are reported.

In this case, SB CQI is represented by 4 bits or 7 bits. The selected band index is denoted by 2 bits, and SB W2 is denoted by 4 bits. As a result, a total sum of bits to be transmitted in one report time (i.e., one subframe) is set to 10 or 13 bits. However, considering that the number of bits of feedback information capable of being transmitted over PUCCH (e.g., in case of using PUCCH Format 2) is limited to 11, a total number of bits must be reduced by 2 bits at Rank-2 or higher.

In order to reduce 2 bits at W2, the W2 subband report of Table 53 may be used. Table 53 shows two examples in which W2 subsampling is applied to Rank-2, Rank-3 and Rank-4 under 8Tx antenna transmission.

TABLE 53

| | W2 |
|---|---|
| Rank-2 | 2 bit: {0, 2, 4, 6} |
| Rank-3 | 2 bit: {0, 4, 8, 12} |
| Rank-4 | 2 bit: {0, 2, 4, 6} |
| Rank-2 | 2 bit: {0, 2, 4, 6} |
| Rank-3 | 2 bit: {2, 3, 10, 11} |
| Rank-4 | 2 bit: {0, 2, 4, 6} |

In case of the W2 subsampling, the precoder is specified through W1 and W2, such that subsampling may not be applied to W1 so as to prevent the precoder element from being lost.

As a detailed method for subsampling W2 by 2 bits according to Embodiment 5, the methods disclosed in various embodiments of the present invention can be used.

A method for reporting channel status information (CSI) according to an embodiment of the present invention will hereinafter be described with reference to FIG. 22.

In association with DL transmission from a BS (or eNB) to a UE, the UE measures a DL channel state and feeds back the measured result through uplink. For example, if 8 Tx antennas are applied to DL transmission of the BS, the BS can transmit CSI-RS (Channel status information—Reference Signal) through 8 antenna ports (Antenna port indexes 15 to 22). The UE may transmit the DL channel state measurement results (RI, PMI, CQI, etc.) through the CSI-RS. The above-mentioned various examples of the present invention can be applied to a detailed method for selecting/calculating RI/PMI/CQI. The BS may determine the number of DL transmission layers, the precoder, and MCS (Modulation Coding Scheme) level, etc. according to the received channel status information (RI/PMI/CQI), such that it can transmit a DL signal.

Figure 22:
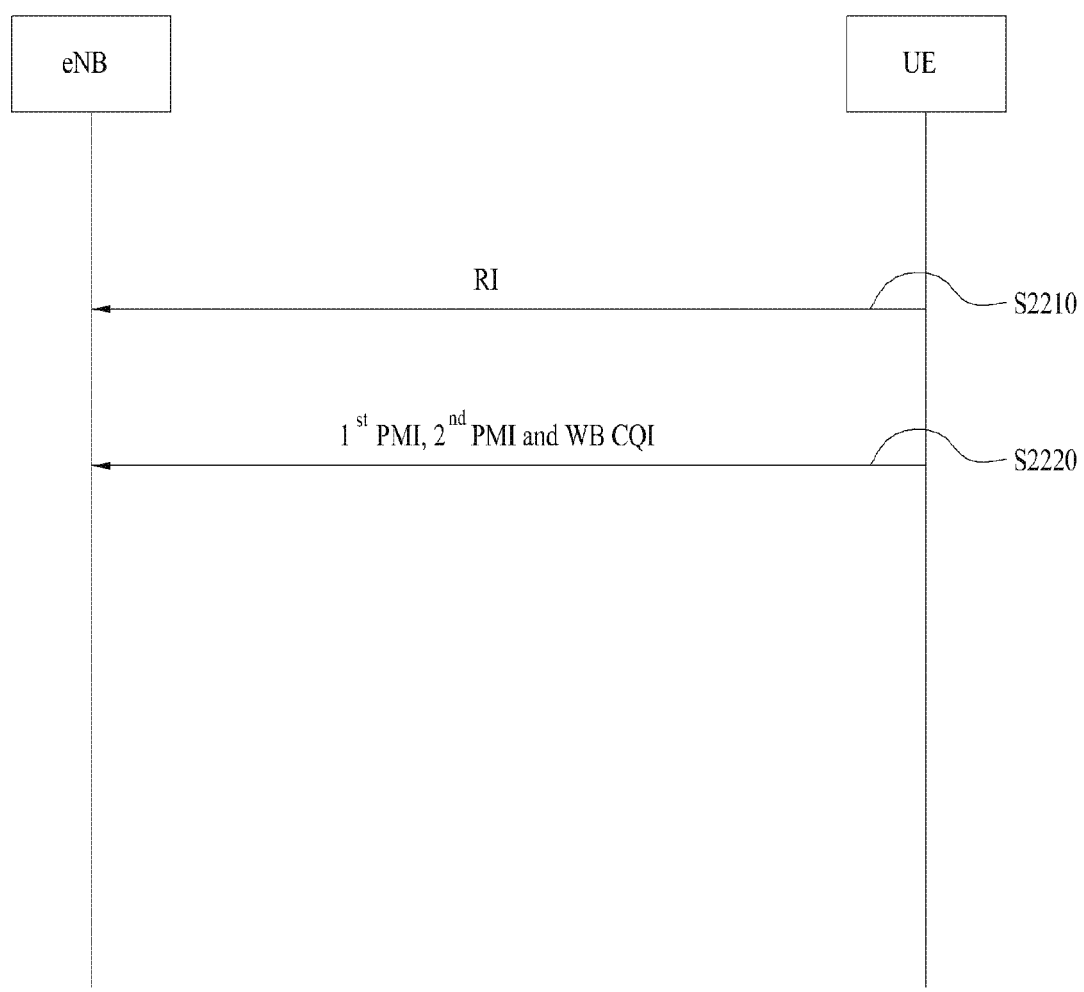
FIG. 22 is a flowchart illustrating a method for transmitting channel status information.

In step S2210 of FIG. 22, the UE may transmit an RI at a first subframe. In step S2220, the UE may transmit a first PMI, a second PMI, and a wideband (WB) CQI at a second subframe. By a combination of the first PMI and the second PMI, a UE-preferred precoding matrix can be indicated. For example, the first PMI may indicate candidates of the precoding matrix applied to the above-mentioned UL transmission, and the second PMI may indicate one precoding matrix from among the above-mentioned candidates.

The subsampled codebook may be applied to the first PMI (i1 or W1) and the second PMI (i2 or W2). The subsampled codebook may represent a codebook composed of only some indexes of the codebooks shown in Tables 11 to 18.

In case of Rank-1 and Rank-2 under the codebook acquired before the subsampling application, 4 bits are required for the first PMI and 4 bits are required for the second PMI. On the other hand, in case of Rank-2 to Rank-4 under the subsampled codebook according to the present embodiment, the sum of the first PMI and the second PMI is denoted by the length of 4 bits. In case of Rank-1 or Rank-2, the first PMI may have the length of 3 bits and the second PMI may have the length of 1 bit. In case of Rank-1, the first PMI may have any one of 0, 2, 4, 6, 8, 10, 12, and 14, and the second PMI may have one of 0 and 2. In case of Rank-2, the first PMI may have any one of 0, 2, 4, 6, 8, 10, 12, and 14, and the second PMI may have one of 0 and 1.

In Rank-3 or Rank-4, the first PMI may have the length of 1 bit and the second PMI may have the length of 3 bits. In Rank-3, the first PMI may have any one of 0 and 2, and the second PMI may have any one of 0, 1, 2, 3, 8, 9, 10 and 11. In Rank-4, the first PMI may have any one of 0 and 2, and the second PMI may have any one of 0, 1, 2, 3, 4, 5, 6, and 7.

The channel status information (CSI) (i.e., RI, first PMI, second PMI, and CQI) may be transmitted over a PUCCH within each UL subframe. In other words, CSI may be periodically transmitted, and each CSI (joint coded RI, first PMI/CQI, and second PMI) may be transmitted in response to each report cycle. The CSI report cycle may be determined according to the above-mentioned various examples of the present invention.

In accordance with the CSI transmission method shown in FIG. 22, each item disclosed in various embodiments of the present invention may be independently applied or two or more embodiments may be simultaneously applied. The same parts may herein be omitted for convenience and clarity of description.

The same principles proposed by the present invention can be applied not only to CSI feedback for one MIMO transmission between a base station (BS) and a relay node (RN) (i.e., MIMO transmission between backhaul uplink and backhaul downlink) but also to CSI feedback for another MIMO transmission between an RN and a UE (i.e., MIMO transmission between an access uplink and an access downlink).

Figure 23:
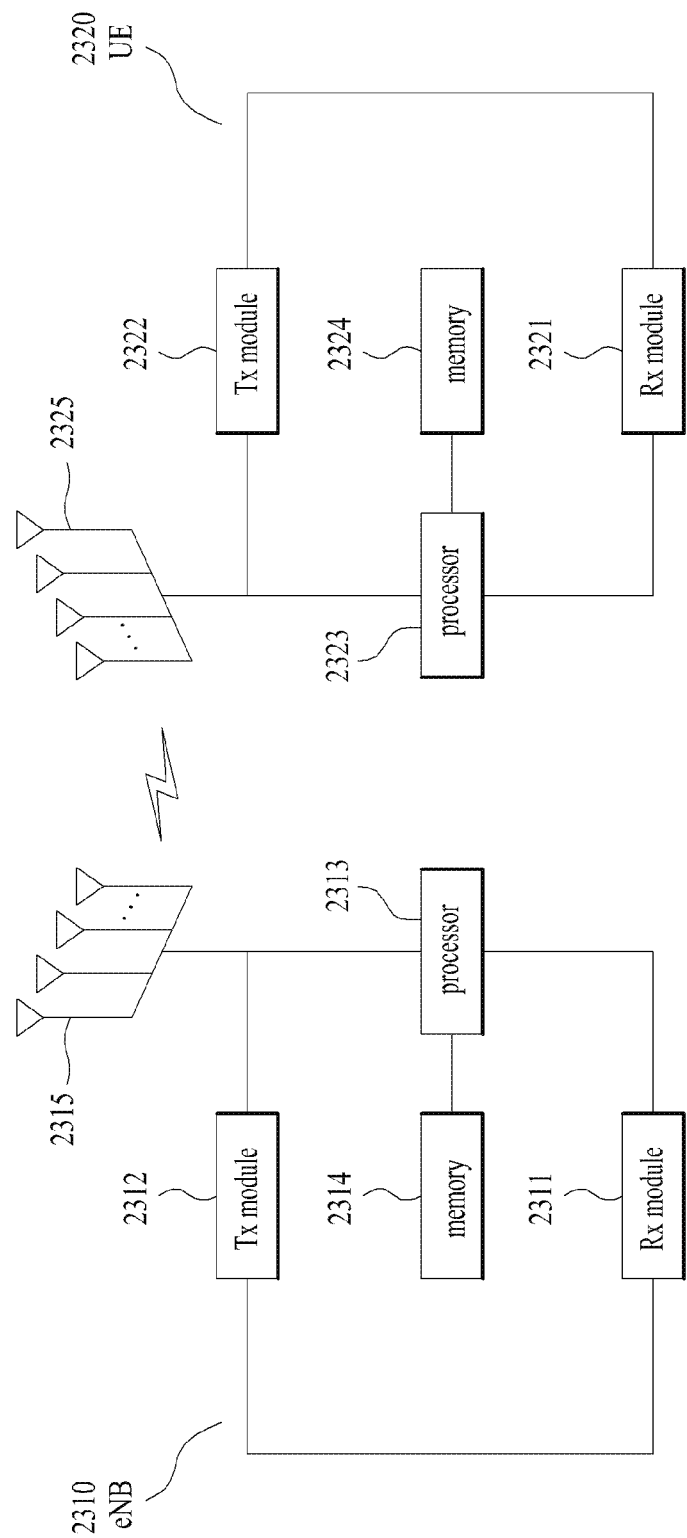
FIG. 23 is a block diagram illustrating an eNB apparatus and a user equipment (UE) apparatus according to an embodiment of the present invention.

FIG. 23 is a block diagram illustrating an eNB apparatus and a user equipment (UE) apparatus according to an embodiment of the present invention.

Referring to FIG. 23, an eNB apparatus 2310 may include a reception (Rx) module 2311, a transmission (Tx) module 2312, a processor 2313, a memory 2314, and a plurality of antennas 2315. The plurality of antennas 2315 may be contained in the eNB apparatus supporting MIMO transmission and reception. The reception (Rx) module 2311 may receive a variety of signals, data and information on uplink starting from the UE. The transmission (Tx) module 2312 may transmit a variety of signals, data and information on downlink for the UE. The processor 2313 may provide overall control to the eNB apparatus 2310.

The eNB apparatus 2310 according to one embodiment of the present invention may be configured to transmit DL transmission through a maximum of 8 Tx antennas as well as to receive CSI of the DL transmission from the UE apparatus 2320. The processor 2313 of the eNB apparatus 2310 may receive, by the Rx module 2311, a rank indicator (RI) at the first subframe, and may receive a first PMI, a second PMI, and a WB CQI at a second subframe. In this case, a UE preferred precoding matrix may be indicated by a combination of the first PMI and the second PMI. In addition, the subsampled codebook is applied to the first PMI and the second PMI, and the sum of the first PMI and the second PMI for each of Rank-1 to Rank-4 may be composed of 4 bits in the subsampled codebook.

Besides, the processor 1213 of the eNB apparatus 1210 processes information received at the eNB apparatus 1210 and transmission information. The memory 1214 may store the processed information for a predetermined time. The memory 1214 may be replaced with a component such as a buffer (not shown).

Referring to FIG. 23, the UE apparatus 2320 may include a reception (Rx) module 2321, a transmission (Tx) module 2322, a processor 2323, a memory 2324, and a plurality of antennas 2325. The plurality of antennas 2325 may be contained in the UE apparatus supporting MIMO transmission and reception. The reception (Rx) module 2321 may receive a variety of signals, data and information on downlink starting from the eNB. The transmission (Tx) module 2322 may transmit a variety of signals, data and information on uplink for the eNB. The processor 2323 may provide overall control to the UE apparatus 2320.

The UE apparatus 2320 according to one embodiment of the present invention may be configured to receive DL transmission through a maximum of 8 Tx antennas as well as to feed back CSI of the DL transmission to the eNB apparatus 2310. The processor 2323 of the UE apparatus 2320 may transmit, by the Tx module 2322, a rank indicator (RI) at the first subframe, and may transmit a first PMI, a second PMI, and a WB CQI at a second subframe. In this case, a UE preferred precoding matrix may be indicated by a combination of the first PMI and the second PMI. In addition, the subsampled codebook is applied to the first PMI and the second PMI, and the sum of the first PMI and the second PMI for each of Rank-1 to Rank-4 may be composed of 4 bits in the subsampled codebook.

Besides, the processor 2323 of the UE apparatus 2320 processes information received at the UE apparatus 2320 and transmission information. The memory 2324 may store the processed information for a predetermined time. The memory 1224 may be replaced with a component such as a buffer (not shown).

In association with the above-mentioned eNB and UE apparatuses, the contents described in the above-mentioned embodiments may be used independently of each other or two or more embodiments may be simultaneously applied, and the same parts may herein be omitted for convenience and clarity of description.

The eNB apparatus 2310 shown in FIG. 23 may also be applied to a relay node (RN) acting as a DL transmission entity or UL reception entity, and the UE apparatus 2320 shown in FIG. 23 may also be applied to a relay node (RN) acting as a DL reception entity or UL transmission entity.

The above-described embodiments of the present invention can be implemented by a variety of means, for example, hardware, firmware, software, or a combination of them.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

As apparent from the above description, exemplary embodiments of the present invention have the following effects. The embodiments of the present invention provide a method and apparatus for effectively reporting feedback information in a MIMO system. The embodiments of the present invention are applicable to a variety of mobile communication systems (for example, OFDMA, SC-FDMA, CDMA, and TDMA communication systems based on multiple access technology).

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for transmitting channel status information (CSI) via uplink in a wireless communication system, the method comprising:
   calculating a first precoding matrix indicator (PMI) and a second PMI; and
   transmitting the first PMI and the second PMI at a subframe,
   wherein:
   a subsampled codebook for each of a precoding codebook for Rank-1 and a precoding codebook for Rank-2 is determined based on at least the first PMI or the second PMI, and
   in case of the Rank-1 or the Rank-2, a number of elements for the first PMI is 8.

2. The method according to claim 1, wherein:
   in case of the Rank-1 or the Rank-2, the first PMI indicates one index of a subset having 8 indexes from among 16 indexes of the first PMI of the precoding codebook for Rank-1 or the precoding codebook for Rank-2.

3. The method according to claim 1, wherein:
   a subsampled codebook for each of a precoding codebook for Rank-3 and a precoding codebook for Rank-4 is determined based on at least the first PMI or the second PMI, and
   in case of the Rank-3 or the Rank-4, a number of elements for the first PMI is 2.

4. The method according to claim 1, wherein:
   a channel quality indicator (CQI) is transmitted at the subframe at which the first PMI and the second PMI are transmitted; and
   a rank indicator (RI) is transmitted at a subframe that is different from the subframe at which the first PMI and the second PMI are transmitted.

5. The method according to claim 2, wherein:
   in case of the Rank-1 or the Rank-2, a number of elements for the second PMI is 2.

6. The method according to claim 3, wherein:
   in case of the Rank-3 or the Rank-4, the first PMI indicates one index of a subset having 2 indexes from among 4 indexes of the first PMI of the precoding codebook for Rank-3 or the precoding codebook for Rank-4.

7. The method according to claim 3, wherein:
   a total bits of the first PMI and the second PMI for each of Rank-1 to Rank-4 is 4 bits.

8. The method according to claim 4, wherein:
   the RI is transmitted over a physical uplink control channel (PUCCH) according to a first report cycle, and
   the first PMI, the second PMI, and the CQI are transmitted over a PUCCH according to a second report cycle.

9. The method according to claim 5, wherein:
in case of the Rank-1 or the Rank-2, the second PMI indicates one index of a subset having 2 indexes from among 16 indexes of the second PMI of the precoding codebook for Rank-1 or the precoding codebook for Rank-2.

10. The method according to claim 6, wherein:
in case of the Rank-3 or the Rank-4, a number of elements for the second PMI is 8.

11. The method according to claim 9, wherein:
in case of the Rank-1 or the Rank-2, a size of the first PMI is 3 bits and a size of the second PMI is 1 bit.

12. The method according to claim 9, wherein the precoding codebook for Rank-1 is represented by the following table:

| | $i_2$ | | | |
|---|---|---|---|---|
| | 0 | 1 | 2 | 3 |
| $i_1$ | | | | |
| 0-15 | $W^{(1)}_{2i_1,0}$ | $W^{(1)}_{2i_1,1}$ | $W^{(1)}_{2i_1,2}$ | $W^{(1)}_{2i_1,3}$ |

| | $i_2$ | | | |
|---|---|---|---|---|
| | 4 | 5 | 6 | 7 |
| $i_1$ | | | | |
| 0-15 | $W^{(1)}_{2i_1+1,0}$ | $W^{(1)}_{2i_1+1,1}$ | $W^{(1)}_{2i_1+1,2}$ | $W^{(1)}_{2i_1+1,3}$ |

| | $i_2$ | | | |
|---|---|---|---|---|
| | 8 | 9 | 10 | 11 |
| $i_1$ | | | | |
| 0-15 | $W^{(1)}_{2i_1+2,0}$ | $W^{(1)}_{2i_1+2,1}$ | $W^{(1)}_{2i_1+2,2}$ | $W^{(1)}_{2i_1+2,3}$ |

| | $i_2$ | | | |
|---|---|---|---|---|
| | 12 | 13 | 14 | 15 |
| $i_1$ | | | | |
| 0-15 | $W^{(1)}_{2i_1+3,0}$ | $W^{(1)}_{2i_1+3,1}$ | $W^{(1)}_{2i_1+3,2}$ | $W^{(1)}_{2i_1+3,3}$ | where $W^{(1)}_{m,n} = \frac{1}{\sqrt{8}} \begin{bmatrix} v_m \\ \varphi_n v_m \end{bmatrix}$ where $\phi_n$ is denoted by $\phi_n = e^{j\pi n/2}$ and $v_m$ is denoted by $v_m = [1 \ e^{j2\pi m/32} \ e^{j4\pi m/32} \ e^{j6\pi m/32}]^T$,
where values 0 to 15 of $i_1$ correspond to the 16 indexes of the first PMI,
where values 0 to 15 of $i_2$ correspond to the 16 indexes of the second PMI, and
in case of the Rank-1, the first PMI indicates an index having a value of any one of 0, 2, 4, 6, 8, 10, 12 or 14, and the second PMI indicates an index having a value of any one of 0 or 2.

13. The method according to claim 9, wherein the precoding codebook for Rank-2 is represented by the following table:

| | $i_2$ | | | |
|---|---|---|---|---|
| $i_1$ | 0 | 1 | 2 | 3 |
| 0-15 | $W^{(2)}_{2i_1,2i_1,0}$ | $W^{(2)}_{2i_1,2i_1,1}$ | $W^{(2)}_{2i_1+1,2i_1+1,0}$ | $W^{(2)}_{2i_1+1,2i_1+1,1}$ |

| | $i_2$ | | | |
|---|---|---|---|---|
| $i_1$ | 4 | 5 | 6 | 7 |
| 0-15 | $W^{(2)}_{2i_1+2,2i_1+2,0}$ | $W^{(2)}_{2i_1+2,2i_1+2,1}$ | $W^{(2)}_{2i_1+3,2i_1+3,0}$ | $W^{(2)}_{2i_1+3,2i_1+3,1}$ |

| | $i_2$ | | | |
|---|---|---|---|---|
| $i_1$ | 8 | 9 | 10 | 11 |
| 0-15 | $W^{(2)}_{2i_1,2i_1+1,0}$ | $W^{(2)}_{2i_1,2i_1+1,1}$ | $W^{(2)}_{2i_1+1,2i_1+2,0}$ | $W^{(2)}_{2i_1+1,2i_1+2,1}$ |

| | $i_2$ | | | |
|---|---|---|---|---|
| $i_1$ | 12 | 13 | 14 | 15 |
| 0-15 | $W^{(2)}_{2i_1,2i_1+3,0}$ | $W^{(2)}_{2i_1,2i_1+3,1}$ | $W^{(2)}_{2i_1+1,2i_1+3,0}$ | $W^{(2)}_{2i_1+1,2i_1+3,1}$ | where $W^{(2)}_{m,m',n} = \frac{1}{4} \begin{bmatrix} v_m & v_{m'} \\ \varphi_n v_m & -\varphi_n v_{m'} \end{bmatrix}$ where $\phi_n$ is denoted by $\phi_n = e^{j\pi n/2}$ and $v_m$ is denoted by $v_m = [1 \ e^{j2\pi m/32} \ e^{j4\pi m/32} \ e^{j6\pi m/32}]^T$,
where values 0 to 15 of $i_1$ correspond to the 16 indexes of the first PMI,
where values 0 to 15 of $i_2$ correspond to the 16 indexes of the second PMI, and
in case of the Rank-2, the first PMI indicates an index having a value of any one of 0, 2, 4, 6, 8, 10, 12 or 14, and the second PMI indicates an index having a value of any one of 0 or 1.

14. The method according to claim 10, wherein:
in case of the Rank-3, the second PMI indicates one index of a subset having 8 indexes from among 16 indexes of the second PMI of the precoding codebook for Rank-3 or the precoding codebook for Rank-4.

15. The method according to claim 14, wherein:
in case of the Rank-3 or the Rank-4, a size of the first PMI is 1 bit, and a size of the second PMI is 3 bits.

16. The method according to claim 14, wherein the precoding codebook for Rank-3 is represented by the following table:

| | $i_2$ | | | |
|---|---|---|---|---|
| $i_1$ | 0 | 1 | 2 | 3 |
| 0-3 | $W^{(3)}_{8i_1,8i_1,8i_1+8}$ | $W^{(3)}_{8i_1+8,8i_1,8i_1+8}$ | $\tilde{W}^{(3)}_{8i_1,8i_1+8,8i_1+8}$ | $\tilde{W}^{(3)}_{8i_1+8,8i_1,8i_1}$ |

-continued

| | $i_2$ | | | |
|---|---|---|---|---|
| $i_1$ | 4 | 5 | 6 | 7 |
| 0-3 | $W^{(3)}_{8i_1+2,8i_1+2,4i_1+10}$ | $W^{(3)}_{8i_1+10,8i_1+2,8i_1+10}$ | $\tilde{W}^{(3)}_{8i_1+2,8i_1+10,8i_1+10}$ | $\tilde{W}^{(3)}_{8i_1+10,8i_1+2,8i_1+2}$ |

| | $i_2$ | | | |
|---|---|---|---|---|
| $i_1$ | 8 | 9 | 10 | 11 |
| 0-3 | $W^{(3)}_{8i_1+4,8i_1+4,8i_1+12}$ | $W^{(3)}_{8i_1+12,8i_1+4,8i_1+12}$ | $\tilde{W}^{(3)}_{8i_1+4,8i_1+12,8i_1+12}$ | $\tilde{W}^{(3)}_{8i_1+12,8i_1+4,8i_1+4}$ |

| | $i_2$ | | | |
|---|---|---|---|---|
| $i_1$ | 12 | 13 | 14 | 15 |
| 0-3 | $W^{(3)}_{8i_1+6,8i_1+6,8i_1+14}$ | $W^{(3)}_{8i_1+14,8i_1+6,8i_1+14}$ | $\tilde{W}^{(3)}_{8i_1+6,8i_1+14,8i_1+14}$ | $\tilde{W}^{(3)}_{8i_1+14,8i_1+6,8i_1+6}$ | where $W^{(3)}_{m,m',m''} = \frac{1}{\sqrt{24}} \begin{bmatrix} v_m & v_{m'} & v_{m''} \\ v_m & -v_{m'} & -v_{m''} \end{bmatrix}$, $\tilde{W}^{(3)}_{m,m',m''} = \frac{1}{\sqrt{24}} \begin{bmatrix} v_m & v_{m'} & v_{m''} \\ v_m & v_{m'} & -v_{m''} \end{bmatrix}$ where $\phi_n$ is denoted by $\phi_n = e^{j\pi n/2}$ and $v_m$ is denoted by $v_m = [1 \ e^{j2\pi m/32} \ e^{j4\pi m/32} \ e^{j6\pi m/32}]^T$, where values 0 to 3 of $i_1$ correspond to the 4 indexes of the first PMI, where values 0 to 15 of $i_2$ correspond to the 16 indexes of the second PMI, and in case of the Rank-3, the first PMI indicates an index having a value of any one of 0 or 2, and the second PMI indicates an index having a value of any one of 0, 1, 2, 3, 8, 9, 10 or 11.

17. The method according to claim 14, wherein the precoding codebook for Rank-4 is represented by the following table:

| | $i_2$ | | | |
|---|---|---|---|---|
| $i_1$ | 0 | 1 | 2 | 3 |
| 0-3 | $W^{(4)}_{8i_1,8i_1+8,0}$ | $W^{(4)}_{8i_1,8i_1+8,1}$ | $W^{(4)}_{8i_1+2,8i_1+10,0}$ | $W^{(4)}_{8i_1+2,8i_1+10,1}$ |

| | $i_2$ | | | |
|---|---|---|---|---|
| $i_1$ | 4 | 5 | 6 | 7 |
| 0-3 | $W^{(4)}_{8i_1+4,8i_1+12,0}$ | $W^{(4)}_{8i_1+4,8i_1+12,1}$ | $W^{(4)}_{8i_1+6,8i_1+14,0}$ | $W^{(4)}_{8i_1+6,8i_1+14,1}$ | where $W^{(4)}_{m,m',n} = \frac{1}{\sqrt{32}} \begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$ where $\phi_n$ is denoted by $\phi_n = e^{j\pi n/2}$ and $v_m$ is denoted by $v_m = [1 \ e^{j2\pi m/32} \ e^{j4\pi m/32} \ e^{j6\pi m/32}]^T$, where values 0 to 3 of $i_1$ correspond to the 4 indexes of the first PMI, where values 0 to 7 of $i_2$ correspond to the 8 indexes of the second PMI, and in case of the Rank-4, the first PMI indicates an index having a value of any one of 0 or 2, and the second PMI indicates an index having a value of any one of 0, 1, 2, 3, 4, 5, 6 or 7.

18. A method for receiving channel status information (CSI) via uplink in a wireless communication system, the method comprising:

receiving a first precoding matrix indicator (PMI) and a second PMI at a subframe; and determining a precoding matrix based on the received first PMI and the received second PMI wherein:

a subsampled codebook for each of a precoding codebook for Rank-1 and a precoding codebook for Rank-2 is determined based on at least the first PMI or the second PMI, and in case of the Rank-1 or the Rank-2, a number of elements for the first PMI is 8.

19. A user equipment (UE) for transmitting channel status information (CSI) via uplink in a wireless communication system, the UE comprising:

a reception module for receiving a downlink signal from a base station (BS);

a transmission module for transmitting an uplink signal to the BS; and a processor for controlling the UE including the reception module and the transmission module, wherein the processor is configured to calculate a first precoding matrix indicator (PMI) and a second PMI and to control the transmission module to transmit the first PMI and the second PMI at a subframe, wherein:

a subsampled codebook for each of a precoding codebook for Rank-1 and a precoding codebook for Rank-2 is determined based on at least the first PMI or the second PMI, and in case of the Rank-1 or the Rank-2, a number of elements for the first PMI is 8.

20. A base station (BS) for receiving channel status information (CSI) via uplink in a wireless communication system, the BS comprising:

a reception module for receiving an uplink signal from a user equipment (UE);

a transmission module for transmitting a downlink signal to the UE; and a processor for controlling the BS including the reception module and the transmission module, wherein the processor is configured to control the reception module to receive a first precoding matrix indicator (PMI) and a second PMI at a subframe and to determine a precoding matrix based on the received first PMI and the received second PMI, wherein:

a subsampled codebook for each of a precoding codebook for Rank-1 and a precoding codebook for Rank-2 is determined based on at least the first PMI or the second PMI, and in case of the Rank-1 or the Rank-2, a number of elements for the first PMI is 8.

* * * * *